United States Patent
Horie et al.

(10) Patent No.: US 7,848,580 B2
(45) Date of Patent: Dec. 7, 2010

(54) IMAGE ENCODING METHOD, IMAGE DECODING METHOD, MOVING-IMAGE COMPRESSION METHOD, MOVING-IMAGE EXPANSION METHOD, IMAGE ENCODING PROGRAM, IMAGE DECODING DEVICE, IMAGE ENCODING DEVICE, IMAGE ENCODING/DECODING SYSTEM, AND EXTENDED IMAGE COMPRESSION/EXPANSION SYSTEM

(75) Inventors: Kenichi Horie, Machida (JP); Seiichiro Sakata, Akiruno (JP)

(73) Assignee: Olympus Corporation, Tokyo (JP)

( * ) Notice: Subject to any disclaimer, the term of this patent is extended or adjusted under 35 U.S.C. 154(b) by 954 days.

(21) Appl. No.: 11/646,022

(22) Filed: Dec. 27, 2006

(65) Prior Publication Data
US 2007/0133889 A1    Jun. 14, 2007

Related U.S. Application Data

(63) Continuation of application No. PCT/JP2005/012269, filed on Jun. 27, 2005.

(30) Foreign Application Priority Data

Jun. 29, 2004   (JP) .............................. 2004-192110
Sep. 22, 2004   (JP) .............................. 2004-275753

(51) Int. Cl.
G06K 9/36      (2006.01)
(52) U.S. Cl. .................................................... 382/232
(58) Field of Classification Search ................. 382/232, 382/276, 274–275, 166, 268–269; 375/240.01–240.29; 348/390.1–425.1; 708/400–405
See application file for complete search history.

(56) References Cited

U.S. PATENT DOCUMENTS

| 6,052,490 | A | * | 4/2000 | Haskell et al. ............... 382/268 |
| EP 1 052 848 A2 | | | 11/2000 | |
| GB 2 378 072 A | | | 1/2003 | |

(Continued)

FOREIGN PATENT DOCUMENTS

EP    0859 517 A2    8/1998

(Continued)

OTHER PUBLICATIONS

Vetterli M. et al. : Algorithmes De Transformations De Fourier Et En Cosinus Mono et Bidimensionnnels Algorithms for the Mono-and Bi-Dimensional Fourier and Cosine Transforms, Sep. 1985, pp. 466-476.
Typical Huffman Tables for the DC Coefficient Differences, 1992, pp. 149-157.

*Primary Examiner*—Sherali Ishrat
(74) *Attorney, Agent, or Firm*—Volpe and Koenig, P.C.

(57) ABSTRACT

The present image encoding method and the like represents a pixel block prior to performing spatial frequency transformation in processing such as JPEG or the like as a matrix, calculates sum data sc (i) of pixel values in a column i in the matrix and sum data sr (j) of pixel values in a row j in the matrix, calculates nc (i) and nr (j) such that the sc (i) and sc (j) are arrayed in descending order respectively, and when a predetermined condition that permutation is considered reasonable is satisfied, performs permutation of the matrix, generates header information Ph (n) including the nc (i) and nr (j) necessary for subjecting the matrix to permutation in the original state, and adds this to the header of a compressed image file such as JPEG or the like.

41 Claims, 42 Drawing Sheets

U.S. PATENT DOCUMENTS

| | | | |
|---|---|---|---|
| 6,460,061 B1 * | 10/2002 | Dick | 708/401 |
| 6,529,927 B1 * | 3/2003 | Dunham | 708/400 |
| 7,302,104 B2 * | 11/2007 | Suino | 382/240 |
| 7,428,338 B2 * | 9/2008 | Berkner et al. | 382/235 |
| 7,551,796 B2 * | 6/2009 | Ohyama et al. | 382/274 |
| 7,676,102 B2 * | 3/2010 | Sakai et al. | 382/238 |

FOREIGN PATENT DOCUMENTS

| | | |
|---|---|---|
| JP | 07-184208 | 7/1995 |
| JP | 08-163375 | 6/1996 |
| JP | 2000-308058 | 11/2000 |
| JP | 2003067362 | 10/2002 |
| WO | 98/37513 | 8/1998 |

* cited by examiner

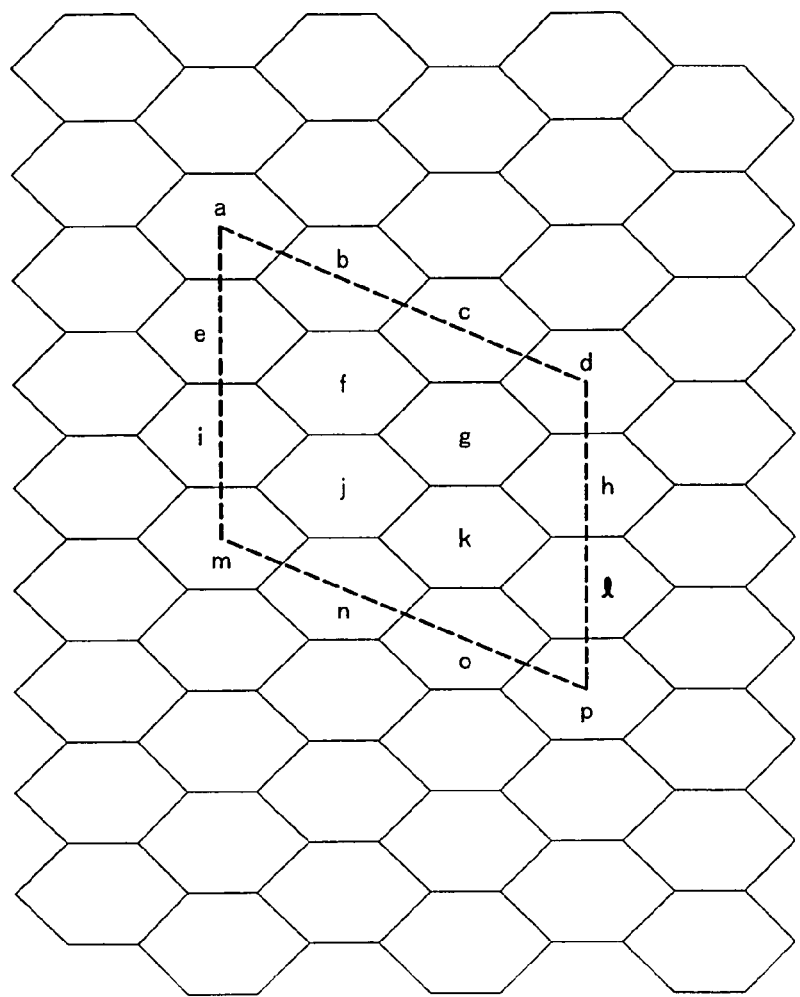

FIG.11

| i | 0 | 1 | 2 | 3 | 4 | 5 | 6 | 7 |
|---|---|---|---|---|---|---|---|---|
| nc(i) | 4 | 2 | 1 | 3 | 0 | 6 | 7 | 5 |
| BIT EXPRESSION OF nc(i) | 100 | 010 | 001 | 011 | 000 | 110 | 111 | 101 |
| \|nc(i)-i\| | 4 | 1 | 1 | 0 | 4 | 1 | 1 | 2 |

FIG.12

| i | n c (i) | n c (i) |
|---|---|---|
| 0 | 4 | 1 |
| 1 | 1 | 0 |
| 2 | 2 | 3 |
| 3 | 3 | 2 |
| 4 | 0 | 5 |
| 5 | 5 | 4 |
| 6 | 6 | 7 |
| 7 | 7 | 6 |
| C h c (w=1) | 8 | 8 |
| C h c (w=4) | ~4.8 | ~1.7 |

FIG.13

$$M = \begin{pmatrix} \cdots & & \cdots & & \cdots \\ \cdots & a & \cdots & b & \cdots \\ \cdots & & \cdots & & \cdots \end{pmatrix}$$

FIG.14

| STEP | VALUE | BASIS MATRIX |
|---|---|---|
| 0 | (a, b) | - |
| 1 | (a, -b) | $\cdot F_l(-1)$ |
| 2 | (a, a-b) | $\cdot F_{kl}$ |
| 3 | (a, b-a) | $\cdot F_l(-1)$ |
| 4 | (b, b-a) | $\cdot F_{lk}$ |
| 5 | (b, a-b) | $\cdot F_l(-1)$ |
| 6 | (b, a) | $\cdot F_{kl}$ |

FIG.15

|   | 0 | 1 | 2 | 3 | 4 | 5 | 6 | 7 |
|---|---|---|---|---|---|---|---|---|
| 0 | 128 | 168 | 186 | 182 | 140 | 124 | 142 | 170 |
| 1 | 164 | 146 | 142 | 122 | 184 | 144 | 140 | 104 |
| 2 | 106 | 130 | 132 | 178 | 72 | 152 | 154 | 226 |
| 3 | 80 | 220 | 255 | 214 | 222 | 6 | 58 | 72 |
| 4 | 108 | 196 | 210 | 182 | 198 | 42 | 90 | 92 |
| 5 | 154 | 196 | 230 | 152 | 230 | 76 | 106 | 54 |
| 6 | 160 | 208 | 230 | 140 | 255 | 34 | 78 | 2 |
| 7 | 208 | 124 | 88 | 104 | 174 | 224 | 188 | 138 |

FIG.16

| | 0 | 1 | 2 | 3 | 4 | 5 | 6 | 7 | ROW TOTAL sr(j) |
|---|---|---|---|---|---|---|---|---|---|
| 0 | 128 | 168 | 186 | 182 | 140 | 124 | 142 | 170 | 1240 |
| 1 | 164 | 146 | 142 | 122 | 184 | 144 | 140 | 104 | 1146 |
| 2 | 106 | 130 | 132 | 178 | 72 | 152 | 154 | 226 | 1150 |
| 3 | 80 | 220 | 255 | 214 | 222 | 6 | 58 | 72 | 1127 |
| 4 | 108 | 196 | 210 | 182 | 198 | 42 | 90 | 92 | 1118 |
| 5 | 154 | 196 | 230 | 152 | 230 | 76 | 106 | 54 | 1198 |
| 6 | 160 | 208 | 230 | 140 | 255 | 34 | 78 | 2 | 1107 |
| 7 | 208 | 124 | 88 | 104 | 174 | 224 | 188 | 138 | 1248 |
| COLUMN TOTAL sc(i) | 1113 | 1393 | 1478 | 1279 | 1480 | 807 | 961 | 863 | |

FIG.17

| | 0 | 1 | 2 | 3 | 4 | 5 | 6 | 7 | | nr(j) | INVERSE nr(j) |
|---|---|---|---|---|---|---|---|---|---|---|---|
| | | | | | | | | | | 0 | 0 |
| | | | | | | | | | | 1 | 1 |
| | | | | | | | | | | 2 | 2 |
| | | | | | | | | | | 3 | 3 |
| | | | | | | | | | | 4 | 4 |
| | | | | | | | | | | 5 | 5 |
| | | | | | | | | | | 6 | 6 |
| | | | | | | | | | | 7 | 7 |

| | 0 | 1 | 2 | 3 | 4 | 5 | 6 | 7 |
|---|---|---|---|---|---|---|---|---|
| 0 | 140 | 186 | 168 | 182 | 128 | 142 | 170 | 124 |
| 1 | 184 | 142 | 146 | 122 | 164 | 140 | 104 | 144 |
| 2 | 72 | 132 | 130 | 178 | 106 | 154 | 226 | 152 |
| 3 | 222 | 255 | 220 | 214 | 80 | 58 | 72 | 6 |
| 4 | 198 | 210 | 196 | 182 | 108 | 90 | 92 | 42 |
| 5 | 230 | 230 | 196 | 152 | 154 | 106 | 54 | 76 |
| 6 | 230 | 230 | 208 | 140 | 160 | 78 | 2 | 34 |
| 7 | 174 | 88 | 124 | 104 | 208 | 188 | 138 | 224 |

| nc(i) | 4 | 2 | 1 | 3 | 0 | 6 | 7 | 5 |
|---|---|---|---|---|---|---|---|---|
| INVERSE nc(i) | 4 | 2 | 1 | 3 | 0 | 7 | 5 | 6 |

FIG.18

|   | 0 | 1 | 2 | 3 | 4 | 5 | 6 | 7 |
|---|---|---|---|---|---|---|---|---|
| 0 | 143 | 255 | -18 | -13 | -2 | -1 | -5 | -2 |
| 1 | 0 | -98 | -9 | -41 | -61 | 64 | -58 | -38 |
| 2 | 33 | -174 | 27 | 51 | 54 | -56 | 53 | 36 |
| 3 | 5 | 163 | -12 | -4 | -9 | -24 | -5 | -1 |
| 4 | 16 | -3 | -3 | -16 | -13 | 37 | -13 | -14 |
| 5 | -8 | 136 | -25 | -38 | -37 | 21 | -39 | -22 |
| 6 | 32 | -167 | 4 | -12 | -28 | 24 | -25 | -18 |
| 7 | -13 | -76 | -15 | -12 | -29 | 29 | -23 | -8 |

FIG.19

|   | 0 | 1 | 2 | 3 | 4 | 5 | 6 | 7 |
|---|---|---|---|---|---|---|---|---|
| 0 | 9 | 23 | -2 | -1 | 0 | 0 | 0 | 0 |
| 1 | 0 | -8 | -1 | -2 | -2 | 1 | -1 | -1 |
| 2 | 2 | -13 | 2 | 2 | 1 | -1 | 1 | 1 |
| 3 | 0 | 10 | -6 | 0 | 0 | 0 | 0 | 0 |
| 4 | 1 | 0 | 0 | 0 | 0 | 0 | 0 | 0 |
| 5 | 0 | 4 | 0 | -1 | 0 | 0 | 0 | 0 |
| 6 | 1 | -3 | 0 | 0 | 0 | 0 | 0 | 0 |
| 7 | 0 | -1 | 0 | 0 | 0 | 0 | 0 | 0 |

FIG.20

|   | 0 | 1 | 2 | 3 | 4 | 5 | 6 | 7 |
|---|---|---|---|---|---|---|---|---|
| 0 | 158 | 170 | 178 | 165 | 145 | 143 | 144 | 146 |
| 1 | 161 | 161 | 138 | 148 | 127 | 139 | 133 | 95 |
| 2 | 73 | 124 | 125 | 176 | 130 | 167 | 214 | 189 |
| 3 | 220 | 255 | 223 | 218 | 79 | 47 | 59 | 11 |
| 4 | 202 | 213 | 174 | 185 | 118 | 102 | 92 | 38 |
| 5 | 228 | 214 | 199 | 170 | 147 | 105 | 72 | 64 |
| 6 | 255 | 221 | 229 | 135 | 143 | 60 | 0 | 48 |
| 7 | 166 | 90 | 134 | 80 | 222 | 196 | 142 | 219 |

FIG.21

|   | 0 | 1 | 2 | 3 | 4 | 5 | 6 | 7 |
|---|---|---|---|---|---|---|---|---|
| 0 | 145 | 178 | 170 | 165 | 158 | 146 | 143 | 144 |
| 1 | 127 | 138 | 161 | 148 | 161 | 95 | 139 | 133 |
| 2 | 130 | 125 | 124 | 176 | 73 | 189 | 167 | 214 |
| 3 | 79 | 223 | 255 | 218 | 220 | 11 | 47 | 59 |
| 4 | 118 | 174 | 213 | 185 | 202 | 38 | 102 | 92 |
| 5 | 147 | 199 | 214 | 170 | 228 | 64 | 105 | 72 |
| 6 | 143 | 229 | 221 | 135 | 255 | 48 | 60 | 0 |
| 7 | 222 | 134 | 90 | 80 | 166 | 219 | 196 | 142 |

FIG.22

|   | 0 | 1 | 2 | 3 | 4 | 5 | 6 | 7 |
|---|---|---|---|---|---|---|---|---|
| 0 | 17 | 10 | -16 | -17 | 18 | 22 | 1 | -26 |
| 1 | -37 | -8 | 19 | 26 | -23 | -49 | -1 | 29 |
| 2 | 24 | -5 | -8 | -2 | 1 | 37 | 13 | -12 |
| 3 | -1 | 3 | 0 | 4 | -2 | 5 | -11 | -13 |
| 4 | 10 | -22 | 3 | 3 | 4 | -4 | 12 | 0 |
| 5 | -7 | 3 | -16 | 18 | -2 | -12 | -1 | 18 |
| 6 | -17 | 21 | -9 | -5 | 0 | 14 | -18 | -2 |
| 7 | 14 | 10 | 2 | -24 | -8 | -5 | 8 | 4 |

FIG.24

| SOI | FF DD8 | START OF COMPRESSED DATA |
|---|---|---|
| DQT | FF DB | DEFINITION OF QUANTIZATION TABLE |
| | | QUANTIZATION TABLE DATA |
| DHT | FF C4 | DEFINITION OF HUFFMAN TABLE |
| | | HUFFMAN TABLE DATA |
| DRI | FF DD | RESTART INTERVAL |
| | | DEFINE RESTART MARKER INSERTION INTERVAL |
| SOF | FF C0 | START OF FRAME SEGMENT |
| | | REPRESENTS VARIOUS PARAMETERS RELATING TO FRAME<br>NUMBER OF VERTICAL LINES<br>NUMBER OF HORIZONTAL PIXELS<br>SPECIFICATION OF QUANTIZATION TABLE |
| SOS | FF DA | SCAN HEADER |
| | | REPRESENTS VARIOUS PARAMETERS RELATING TO SCAN |
| COM | FF FE | COMMENTS |
| | xx xx | SIZE OF COMMENTS (2-65535) |
| | 4A 45 58 | JEX : EXTENDED DATA HEADER |
| | | EXTENDED DATA<br>Ph (n) |
| RST | FF D0 | RESTART MARKER |
| | | COMPRESSED DATA |
| EOI | FF D9 | END OF COMPRESSED DATA |

FIG.25

| Ind | Pc | Pr | Ph (n) | | | | | | |
|---|---|---|---|---|---|---|---|---|---|
| | | | nc (0) | nc (1) | nc (2) | nc (3) | nc (4) | nc (5) | nc (6) |
| 1 | 1 | 0 | 100 | 010 | 001 | 011 | 000 | 110 | 111 |

FIG.30

|   | 0 | 1 | 2 | 3 | 4 | 5 | 6 | 7 |
|---|---|---|---|---|---|---|---|---|
| 0 | 143 | 166 | -123 | -75 | 12 | -57 | -64 | 100 |
| 1 | 0 | -86 | 43 | -85 | 3 | 24 | 23 | -80 |
| 2 | 33 | -94 | 89 | 149 | -14 | 38 | 47 | -29 |
| 3 | 5 | 114 | -70 | -45 | -6 | -29 | -32 | 76 |
| 4 | 16 | -16 | -7 | -35 | 11 | -4 | -9 | -22 |
| 5 | -8 | 86 | -64 | -103 | 3 | -23 | -29 | 29 |
| 6 | 32 | -116 | 79 | -3 | -8 | 41 | 44 | -82 |
| 7 | -13 | -52 | 47 | -27 | 4 | 21 | 11 | -48 |

FIG.31

|   | 0 | 1 | 2 | 3 | 4 | 5 | 6 | 7 |
|---|---|---|---|---|---|---|---|---|
| 0 | 9 | 15 | -12 | -5 | 1 | -1 | -1 | 2 |
| 1 | 0 | -7 | 3 | -4 | 0 | 0 | 0 | -1 |
| 2 | 2 | -7 | 6 | 6 | 0 | 1 | 1 | -1 |
| 3 | 0 | 7 | -35 | -2 | 0 | 0 | 0 | 1 |
| 4 | 1 | -1 | 0 | -1 | 0 | 0 | 0 | 0 |
| 5 | 0 | 2 | -1 | -2 | 0 | 0 | 0 | 0 |
| 6 | 1 | -2 | 1 | 0 | 0 | 0 | 0 | -1 |
| 7 | 0 | -1 | 0 | 0 | 0 | 0 | 0 | 0 |

FIG.32

|   | 0 | 1 | 2 | 3 | 4 | 5 | 6 | 7 |
|---|---|---|---|---|---|---|---|---|
| 0 | 130 | 149 | 200 | 188 | 131 | 122 | 142 | 187 |
| 1 | 189 | 139 | 142 | 109 | 182 | 126 | 131 | 83 |
| 2 | 83 | 154 | 107 | 163 | 140 | 152 | 174 | 226 |
| 3 | 90 | 221 | 255 | 209 | 190 | 0 | 62 | 85 |
| 4 | 98 | 172 | 234 | 157 | 244 | 34 | 110 | 75 |
| 5 | 169 | 207 | 218 | 175 | 203 | 72 | 91 | 64 |
| 6 | 171 | 157 | 252 | 160 | 226 | 55 | 74 | 6 |
| 7 | 215 | 123 | 86 | 108 | 168 | 217 | 186 | 146 |

FIG.33

|   | 0 | 1 | 2 | 3 | 4 | 5 | 6 | 7 |
|---|---|---|---|---|---|---|---|---|
| 0 | 2 | -19 | 14 | 6 | -9 | -2 | 0 | 17 |
| 1 | 25 | -7 | 0 | -13 | -2 | -18 | -9 | -21 |
| 2 | -23 | 24 | -25 | -15 | 68 | 0 | 20 | 0 |
| 3 | 10 | 1 | 0 | -5 | -32 | -6 | 4 | 13 |
| 4 | -10 | -24 | 24 | -25 | 46 | -8 | 20 | -17 |
| 5 | 15 | 11 | -12 | 23 | -27 | -4 | -15 | 10 |
| 6 | 11 | -51 | 22 | 20 | -29 | 21 | -4 | 4 |
| 7 | 7 | -1 | -2 | 4 | -6 | -7 | -2 | 8 |

FIG.39

| SF η | 1 | 7/8 | 6/8 | 5/8 | 4/8 | 3/8 |
|---|---|---|---|---|---|---|
| 0 | ○ | − | − | − | − | − |
| 1/8 | □ | ○ | □ | △ | △ | △ |
| 1/6 | □ | □ | ○ | □ | △ | △ |
| 1/5 | △ | □ | □ | ○ | □ | □ |
| 1/4 | △ | △ | △ | □ | □ | ○ |

FIG.44

| i | 1 | 2 | 3 | 4 | 5 | 6 | 7 | 8 |
|---|---|---|---|---|---|---|---|---|
| Mode(i) | 1 | 1 | 1 | 2 | 1 | 1 | 1 | 2 |
| Pos(i) | 1 | 2 | 4 | 4 | 1 | 2 | 4 | 4 |
| BIT EXPRESSION | 001 | 010 | 100 | 100 | 001 | 010 | 100 | 100 |

FIG.45

| | Phℓ(n) | | |
|---|---|---|---|
| Ind | Mode(i) | Separator | Pos(i) |
| 1 | 010101100101 0110 | 000 | 001···100 |

FIG.46

| "JEX" | CATEGORY | GLOBAL PARAMETERS | HEADER FOR ALL BLOCKS | FILLER |
|---|---|---|---|---|
| BINARY | 4-bit | 8-bit × 3 | PhI(n) | "0 ··· 0" |

FIG.47

| CATEGORY | CORRESPONDING PRE-PROCESSING |
|---|---|
| 0000 | − |
| 0001 | PERMUTATION |
| 0010 | REVERSIBLE LPF |
| 0011 | USE PERMUTATION IN COMBINATION WITH REVERSIBLE LPF |
| ⋮ | ⋮ |

FIG.48

| BIT VALUE | $\eta$ |
|---|---|
| 00000000 | 0 |
| 00000001 | 1/8 |
| 00000010 | 1/6 |
| 00000011 | 1/5 |
| 00000100 | 1/4 |
| ... | ... |

FIG.49

| BIT VALUE | SF |
|---|---|
| 00000000 | 1 |
| 00000001 | 7/8 |
| 00000010 | 6/8 |
| 00000011 | 5/8 |
| 00000100 | 4/8 |
| 00000101 | 3/8 |
| ... | ... |

FIG.50

|   | 0 | 1 | 2 | 3 | 4 | 5 | 6 | 7 |
|---|---|---|---|---|---|---|---|---|
| 0 | 222 | 222 | 10 | 10 | 10 | 222 | 222 | 222 |
| 1 | 222 | 222 | 10 | 10 | 10 | 222 | 222 | 222 |
| 2 | 222 | 222 | 10 | 10 | 10 | 222 | 222 | 222 |
| 3 | 222 | 222 | 10 | 10 | 10 | 222 | 222 | 222 |
| 4 | 222 | 222 | 10 | 10 | 10 | 222 | 222 | 222 |
| 5 | 10 | 10 | 10 | 222 | 222 | 222 | 222 | 222 |
| 6 | 10 | 10 | 10 | 222 | 222 | 222 | 222 | 222 |
| 7 | 10 | 10 | 10 | 222 | 222 | 222 | 222 | 222 |

FIG.51

|   | 0 | 1 | 2 | 3 | 4 | 5 | 6 | 7 |
|---|---|---|---|---|---|---|---|---|
| 0 | 116 | -370 | 314 | 223 | -53 | -11 | -73 | -209 |
| 1 | 0 | 227 | 396 | 80 | -177 | -53 | 28 | -45 |
| 2 | 0 | -89 | -154 | -31 | 69 | 21 | -11 | 18 |
| 3 | 0 | -33 | -58 | -12 | 26 | 8 | -4 | 7 |
| 4 | 0 | 68 | 118 | 24 | -53 | -16 | 8 | -14 |
| 5 | 0 | -22 | -38 | -8 | 17 | 5 | -3 | 4 |
| 6 | 0 | -37 | -64 | -13 | 29 | 9 | -5 | 7 |
| 7 | 0 | 45 | 79 | 16 | -35 | -11 | 6 | -9 |

FIG.52

|   | 0 | 1 | 2 | 3 | 4 | 5 | 6 | 7 |
|---|---|---|---|---|---|---|---|---|
| 0 | 7 | -34 | 31 | 14 | -2 | 0 | -1 | -3 |
| 1 | 0 | 19 | 28 | 4 | -7 | -1 | 0 | -1 |
| 2 | 0 | -7 | -10 | -1 | 2 | 0 | 0 | 0 |
| 3 | 0 | -2 | -3 | 0 | 1 | 0 | 0 | 0 |
| 4 | 0 | 3 | 3 | 0 | -1 | 0 | 0 | 0 |
| 5 | 0 | -1 | -1 | 0 | 0 | 0 | 0 | 0 |
| 6 | 0 | -1 | -1 | 0 | 0 | 0 | 0 | 0 |
| 7 | 0 | 0 | 1 | 0 | 0 | 0 | 0 | 0 |

FIG.53

|   | 0 | 1 | 2 | 3 | 4 | 5 | 6 | 7 |
|---|---|---|---|---|---|---|---|---|
| 0 | 204 | 216 | 4 | 15 | 22 | 231 | 220 | 224 |
| 1 | 247 | 232 | 9 | 12 | 11 | 206 | 204 | 216 |
| 2 | 207 | 208 | 6 | 0 | 10 | 229 | 244 | 233 |
| 3 | 217 | 229 | 42 | 4 | 2 | 218 | 235 | 190 |
| 4 | 233 | 190 | 17 | 15 | 12 | 187 | 239 | 243 |
| 5 | 17 | 4 | 13 | 210 | 231 | 249 | 207 | 205 |
| 6 | 25 | 0 | 7 | 219 | 232 | 223 | 208 | 238 |
| 7 | 9 | 0 | 32 | 211 | 216 | 228 | 220 | 222 |

FIG.54

|   | 0 | 1 | 2 | 3 | 4 | 5 | 6 | 7 |
|---|---|---|---|---|---|---|---|---|
| 0 | -18 | -6 | -6 | 5 | 12 | 9 | -2 | 2 |
| 1 | 25 | 10 | -1 | 2 | 1 | -16 | -18 | -6 |
| 2 | -15 | -14 | -4 | -10 | 0 | 7 | 22 | 11 |
| 3 | -5 | 7 | 32 | -6 | -8 | -4 | 13 | -32 |
| 4 | 11 | -32 | 7 | 5 | 2 | -35 | 17 | 21 |
| 5 | 7 | -6 | 3 | -12 | 9 | 27 | -15 | -17 |
| 6 | 15 | -10 | -3 | -3 | 10 | 1 | -14 | 16 |
| 7 | -1 | -10 | 22 | -11 | -6 | 6 | -2 | 0 |

FIG.55

|   | kc | ℓr | mode |
|---|----|----|------|
| 1 | 1 |   | 1 |
| 2 | 2 |   | 1 |
| 3 | 4 |   | 1 |
| 4 |   | 4 | 2 |
| 5 | 1 |   | 1 |
| 6 | 2 |   | 1 |
| 7 | 4 |   | 1 |
| 8 |   | 4 | 2 |

FIG.56

|   | 0 | 1 | 2 | 3 | 4 | 5 | 6 | 7 |
|---|---|---|---|---|---|---|---|---|
| 0 | 222.0 | 162.1 | 56.0 | 23.9 | 68.9 | 163.1 | 222.0 | 222.0 |
| 1 | 222.0 | 162.1 | 56.0 | 23.9 | 68.9 | 163.1 | 222.0 | 222.0 |
| 2 | 222.0 | 162.1 | 56.0 | 23.9 | 68.9 | 163.1 | 222.0 | 222.0 |
| 3 | 222.0 | 162.1 | 56.0 | 23.9 | 68.9 | 163.1 | 222.0 | 222.0 |
| 4 | 163.1 | 121.5 | 58.2 | 62.3 | 111.4 | 179.5 | 222.0 | 222.0 |
| 5 | 68.9 | 56.5 | 61.8 | 123.7 | 179.5 | 205.6 | 222.0 | 222.0 |
| 6 | 10.0 | 15.9 | 64.0 | 162.1 | 222.0 | 222.0 | 222.0 | 222.0 |
| 7 | 10.0 | 15.9 | 64.0 | 162.1 | 222.0 | 222.0 | 222.0 | 222.0 |

FIG.57

|   | 0 | 1 | 2 | 3 | 4 | 5 | 6 | 7 |
|---|---|---|---|---|---|---|---|---|
| 0 | 116 | -358 | 258 | 153 | -7 | 2 | -23 | -10 |
| 1 | 0 | 204 | 310 | 51 | -64 | -2 | -2 | -7 |
| 2 | 0 | -70 | -106 | -17 | 22 | 1 | 1 | 2 |
| 3 | 0 | -20 | -31 | -5 | 6 | 0 | 0 | 1 |
| 4 | 0 | 28 | 43 | 7 | -9 | 0 | 0 | -1 |
| 5 | 0 | -5 | -7 | -1 | 1 | 0 | 0 | 0 |
| 6 | 0 | -2 | -3 | 0 | 1 | 0 | 0 | 0 |
| 7 | 0 | -3 | -4 | -1 | 1 | 0 | 0 | 0 |

FIG.58

|   | 0 | 1 | 2 | 3 | 4 | 5 | 6 | 7 |
|---|---|---|---|---|---|---|---|---|
| 0 | 7 | -33 | 26 | 10 | 0 | 0 | 0 | 0 |
| 1 | 0 | 17 | 22 | 3 | -2 | 0 | 0 | 0 |
| 2 | 0 | -5 | -7 | -1 | 1 | 0 | 0 | 0 |
| 3 | 0 | -1 | -1 | 0 | 0 | 0 | 0 | 0 |
| 4 | 0 | 1 | 1 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |

FIG.59

|   | 0 | 1 | 2 | 3 | 4 | 5 | 6 | 7 |
|---|---|---|---|---|---|---|---|---|
| 0 | 232 | 204 | 16 | 8 | 22 | 211 | 213 | 227 |
| 1 | 225 | 200 | 22 | 7 | 22 | 220 | 216 | 223 |
| 2 | 228 | 208 | 26 | 0 | 10 | 226 | 219 | 222 |
| 3 | 221 | 202 | 29 | 0 | 10 | 228 | 222 | 225 |
| 4 | 217 | 202 | 31 | 0 | 8 | 231 | 224 | 226 |
| 5 | 17 | 11 | 23 | 199 | 204 | 239 | 222 | 217 |
| 6 | 15 | 8 | 20 | 208 | 212 | 230 | 218 | 222 |
| 7 | 4 | 0 | 17 | 232 | 231 | 215 | 212 | 229 |

FIG.61

| Ind | Cat | Pc | Pr | nc (0) | ... | nc (6) |
|---|---|---|---|---|---|---|
| 1 | 0 | 1 | 0 | 100 | ... | 111 |

FIG.62

| Ind | Cat | Mode (1) ~Mode (8) | Separator | Pos (i) |
|---|---|---|---|---|
| 1 | 1 | 0101011001010110 | 000 | 001···100 |

FIG.63

| Ind | Cat | Mode |
|---|---|---|
| 1 | 1 | 11 |

IMAGE ENCODING METHOD, IMAGE DECODING METHOD, MOVING-IMAGE COMPRESSION METHOD, MOVING-IMAGE EXPANSION METHOD, IMAGE ENCODING PROGRAM, IMAGE DECODING DEVICE, IMAGE ENCODING DEVICE, IMAGE ENCODING/DECODING SYSTEM, AND EXTENDED IMAGE COMPRESSION/EXPANSION SYSTEM

CROSS REFERENCE TO RELATED APPLICATION

This application is a continuation application of PCT/JP2005/012269 filed on Jun. 27, 2005 and claims the benefit of Japanese Applications No. 2004-192110 filed in Japan on Jun. 29, 2004 and No. 2004-275753 filed in Japan on Sep. 22, 2004, the entire contents of which are incorporated herein by this reference.

BACKGROUND OF THE INVENTION

1. Field of the Invention

The present invention relates to an image encoding method, image decoding method, moving-image compression method, moving-image expansion method, image encoding program, image encoding device, image decoding device, image encoding/decoding system, and extended image compression/expansion system, which subject still images or moving images to encoding for compression, or/and subject them to decoding for expansion.

2. Description of the Related Art

In the information processing field, various types of techniques for compressing data have been developed. Of data, particularly with regard to image data, examples of well-known compression techniques include JPEG, JPEG 2000, and the like for still images, and MPEG, MPEG 2, MPEG 4, and the like for moving images.

For example, the aforementioned compression with JPEG is described in CCIT Recommendations T.81, "Information technology—digital compression and coding of continuous-tone still images—requirements and guidelines", ITU, 1992. Nevertheless, the outline of JPEG process will be explained for convenience.

Taking a color image as an example, first, the image made up of three colors (a luminance signal Y, and two color-difference signals Cb and Cr, for example) is divided into 8×8 pixel blocks for each color respectively. Next, the pixel block of the luminance signal Y and each pixel block of the two color-difference signals Cb and Cr are transformed into frequency space using DCT (Discrete Cosine Transform) individually (i.e., three times). Subsequently, the DCT coefficients of respective pixel blocks are quantized with a luminance signal quantization table or a color-difference signal quantization table (common to Cb and Cr), and entropy encoded with a luminance signal Huffman table or a color-difference signal Huffman table (common to Cb and Cr).

JPEG 2000 for compression of still image data is still not popular in spite of improvements of conventional JPEG (such as scalability of reversible/non-reversible compression/image quality, reduction of mosquito noise, and the like, for example). JPEG is considered to survive as the first candidate of techniques to be employed for image compression in the future.

Now, the number of image pickup pixels used in digital cameras or cellular phones has markedly increased in recent years. Moreover, familiar apparatuses (apparatuses frequently continuously being carried with) represented by cellular phones and the like have been widely used, thereby increasing opportunity for photographing, and also increasing the number of digital images possessed by individuals. Clearly then, the amount of image data should be preferably small for the sake of handling such increase in the amount of information.

However, with the conventional JPEG, the only way to reduce the size of compressed image data is to employ a coarser quantization table, i.e., to enlarge the quantization width. It is well known, that this will enhance the aforementioned mosquito noise and the like, and consequently deteriorates image quality.

Heretofore, techniques for preventing such noise from occurring even when a compression ratio is set high have been proposed.

For example, with Japanese Unexamined Patent Application Publication No. 2000-308058, a technique has been described wherein mosquito noise, which readily occurs on an edge portion of an image, can be reduced by performing pre-processing so as to reduce signal level difference in the edge portion of the image prior to JPEG procession.

Also, with Japanese Unexamined Patent Application Publication No. 8-163375, a technique has been described wherein a pixel block is divided into multiple regions according to a pixel value distribution, scarce pixels are compensated for each divided region so as to obtain each pixel block size, and each pixel block is subjected to the JPEG conversion.

However, with the technique described in the aforementioned Japanese Unexamined Patent Application Publication No. 2000-308058, it is necessary to store information related to the pre-processing of the edge portion of the image prior to the JPEG encoding on the device side which performed this pre-processing, and accordingly, the original image cannot be reproduced from the compressed image file alone. Moreover, with the pre-processing, the entire pixel blocks of image data are subjected to low-bit conversion, so that quantization error increases, and consequently, image quality deteriorates.

Also, because the technique described in the aforementioned Japanese Unexamined Patent Application Publication No. 8-163375 generates multiple pixel blocks from a single pixel block, an attempt to perform decoding processing with a conventional JPEG decoder will cause error and the processing cannot be done.

As just described, a compression format that enables decoding in outline a compressed image file alone with a JPEG decoder, and thereby perform compression with a small amount of codes even if quantization table is set fine, or thereby prevent mosquito noise even if the quantization table is set coarse, has not been provided.

The present invention has been made in light of the aforementioned situation, and it is an object of the present invention to provide, with respect to encoding methods using spatial frequency transformation, an image encoding method, image decoding method, moving-image compression method, moving-image expansion method, image encoding program, image encoding device, image decoding device, image encoding/decoding system, and extended image compression/expansion system, which can reduce the amount of codes and/or can suppress noise and/or can subject coded data to decoding.

SUMMARY OF THE INVENTION

In order to achieve the aforementioned object, an image encoding method according to the present invention comprises: applying a spatial frequency transformation to an image data to obtain transform coefficients; encoding the transform coefficients as coded data; generating a header portion of the coded data which comprises information related to the image data; wherein, prior to applying the spatial frequency transformation, applying to the image data a reversible spatial transformation adapted to the image data; and adding into the header portion header information necessary for inverse transforming the reversible spatial transformation.

An image encoding method according to the present invention, is applicable to a JPEG encoding process, and includes partitioning of an image into a plurality of 8×8 image blocks; applying a discrete cosine transform to each of the 8×8 image blocks to thereby obtain DCT coefficients including a DC coefficient indicative of a mean value of the 8×8 image block, low-frequency AC coefficients and high-frequency AC coefficients; quantizing the DCT coefficients using a quantization table; encoding the quantized DCT coefficients using run-length coding and a subsequent Huffman coding; and generating a header portion; and the method comprises: applying a reversible spatial transformation to at least one 8×8 image block prior to applying the discrete cosine transform, whereby the reversible spatial transformation is selected adaptively in response to the at least one 8×8 image block; extracting spatial transformation parameters necessary for inverse transforming the spatial transformation; and adding header information indicative of the spatial transformation parameters into the header portion.

An image decoding method for decoding encoded image data according to the present invention, which comprises a header portion and a coded data portion, comprises: reading out the header portion of the encoded image data to extract information related to an image data; decoding the coded data to obtain transform coefficients in spatial frequency domain; applying an inverse spatial frequency transformation to the transform coefficients to thereby obtain a second image data; and the decoding method further comprises: extracting information necessary for inverse transforming a reversible spatial transformation; applying the inverse transformation of the reversible spatial transformation to the second image data to obtain the image data.

A moving-image compression method for encoding moving image data according to the present invention comprises image frames in a time-series-like relation using intra-frame compression based on image data within one image frame and inter-frame compression based on multiple image frames, wherein the intra-frame compression includes partitioning an image frame into image blocks; applying a spatial frequency transformation to the image blocks to obtain transform coefficients; and generating a header portion which comprises information related to the image frame, and the intra-frame compression further comprises: applying a reversible spatial transformation to at least one of the image blocks prior to applying the spatial frequency transformation; and adding into the header portion header information which comprises spatial transformation parameters necessary for inverse transforming the reversible spatial transformation.

A moving-image compression method for encoding moving image data according to the present invention comprises image frames in a time-series-like relation using intra-frame compression based on image data within one image frame and inter-frame compression based on multiple image frames, wherein the inter-frame compression includes partitioning an image frame into pixel blocks; generating an image block by obtaining difference between at least one of the pixel blocks and a corresponding pixel block related to an image frame to be compared with; applying a spatial frequency transformation to the image block to obtain transform coefficients; and generating a header portion which comprises information related to the image frame, and the inter-frame compression further comprises: applying a reversible spatial transformation to at least one of the image blocks prior to applying the spatial frequency transformation; and adding into the header portion header information which comprises spatial transformation parameters necessary for inverse transforming the reversible spatial transformation.

A moving-image decoding method for decoding encoded moving-image data according to the present invention, which comprises a header portion and a coded data portion, to obtain a moving-image data comprises: reading out the header portion to extract information related to an image data related to an image frame; decoding the coded data portion to obtain transform coefficients related to the image frame; applying an inverse spatial frequency transformation to the transform coefficients to thereby obtain a second image data; and the decoding method further comprises: extracting header information necessary for inverse transforming a reversible spatial transformation from the header portion; applying the inverse transformation of the reversible spatial transformation to the second image data to obtain the image data related to the image frame.

An image encoding program according to the present invention, which can be executed by a computing device, comprises operation instructions for: applying a spatial frequency transformation to an image data to obtain transform coefficients; encoding the transform coefficients as coded data; generating a header portion of the coded data which comprises information related to the image data; wherein, prior to applying the spatial frequency transformation, applying to the image data a reversible spatial transformation adapted to the image; and adding into the header portion header information necessary for inverse transforming the reversible spatial transformation.

An image decoding program for decoding encoded image data according to the present invention including a header portion and a coded data portion, which can be executed by a computing device, comprises operation instructions for: reading out the header portion of the encoded image data to extract information related to an image data; decoding the coded data to obtain transform coefficients; applying an inverse spatial frequency transformation to the transform coefficients to thereby obtain second image data; and the decoding program further comprises operation instructions for: extracting information necessary for inverse transforming a reversible spatial transformation; applying the inverse transformation of the reversible spatial transformation to the second image data to obtain the image data.

An image encoding device according to the present invention comprises: a spatial transforming unit for applying to an image data a reversible spatial transformation adapted to the image data; a spatial frequency transformation unit for applying a spatial frequency transformation to the image data to thereby obtain transform coefficients; a header portion generator for creating a header portion which comprises information related to the image data; and a header information addition unit for adding information which comprises spatial transformation parameters necessary for inverse transforming the spatial transformation to the header portion.

An image decoding device for decoding encoded image data including a header portion and a coded data portion according to the present invention comprises: an inverse spatial frequency transformation unit for applying to transform coefficients resulting from the encoded image data an inverse spatial frequency transformation to thereby obtain second image data; a header interpreter for reading out spatial transformation parameters from the header portion; and an inverse spatial transformation unit for applying to the second image data an inverse spatial transformation based on the spatial transformation parameters to thereby obtain an image data.

An image encoding-decoding system according to the present invention comprises: an image encoding device which comprises a spatial transforming unit for applying to an image data a reversible spatial transformation adapted to the image data, a spatial frequency transformation unit for applying a spatial frequency transformation to the image data to thereby obtain transform coefficients, a header portion generator for creating a header portion which comprises information related to the image data, and a header information addition unit for adding information which comprises spatial transformation parameters necessary for inverse transforming the spatial transformation to the header portion; and an image decoding device for decoding encoded image data including a header portion and a coded data portion which comprises an inverse spatial frequency transformation unit for applying to transform coefficients resulting from the encoded image data an inverse spatial frequency transformation to thereby obtain second image data, a header interpreter for reading out spatial transformation parameters from the header portion, and an inverse spatial transformation unit for applying to the second image data an inverse spatial transformation based on the spatial transformation parameters to thereby obtain an image data; wherein the image decoding device is capable of decoding an encoded image data encoded via the image encoding device.

An image encoding-decoding system according to the present invention comprises: a first image encoding device which comprises: dividing unit for partitioning an original image data into image blocks; spatial frequency transformation unit for acquiring transform coefficients by applying to the image blocks a spatial frequency transformation; quantizer for quantizing the transform coefficients to generate integral values of transform coefficients; encoder for encoding these integral values of transform coefficients; and encoded image file generating means for generating a first encoded image file by combining a header portion with a data obtained based on results of the encoder; a second image encoding device for generating a second encoded image file obtained by adding to the first image encoding device, which comprises: spatial transformation unit for applying a reversible spatial transformation identifiable with spatial transformation parameters to at least one of the image blocks prior to the spatial frequency transformation being performed; and header information adding unit for adding the spatial transformation parameters into the header portion; a first image decoding device which comprises: header reader for reading out a header portion from the first encoded image file; decoder for acquiring integral values of transform coefficients by decoding codes obtained from the first encoded image file; inverse quantizer for de-quantizing the integral values of transform coefficients generated by the decoder to thereby obtain transform coefficients; inverse spatial frequency transformation unit for acquiring an image data in units of image block by applying inverse spatial frequency transformation to the transform coefficients from the inverse quantizer; and rendering means for generating an original image data from the image data in units of image blocks; and a second image decoding device for acquiring an original image data from the second encoded image file obtained by adding to the first image decoding device, which comprises: additional header information reader for reading out the spatial transformation parameters from the header portion; and inverse spatial transformation unit for inverse transforming the spatial transformation based on the spatial transformation parameters read out by this additional header information reader; wherein in the event that an encoded image file to be decoded is the second encoded image file, the first image decoding device is able, without error, to restore data different from the original image data by ignoring spatial transformation parameters described in the header portion of the second compressed image file; and wherein in the event that spatial transformation parameters cannot be read out from the header portion by the additional header information reader, the second image decoding device restores an original image data by processing decoding by a portion given by the first image decoding device alone without processing the inverse spatial transformation unit.

BRIEF DESCRIPTION OF THE DRAWINGS

FIG. 9 is a diagram illustrating an example of an image to be subjected to 2-D shaped rendering by padding hexangular pixels with the first embodiment of the present invention.

FIG. 10 is a diagram illustrating an example wherein the pixel data disposed in FIG. 9 is arrayed in the row direction and in the column direction.

FIG. 11 is a chart illustrating an example of each element necessary for calculating a decision value Chc to be obtained as to a permutation nc(i) with the first embodiment of the present invention.

FIG. 12 is a chart illustrating how the decision value changes by changing a weight w with the first embodiment of the present invention.

FIG. 13 is a diagram illustrating an example of a matrix M with the first embodiment of the present invention.

FIG. 14 is a chart illustrating the interaction sequence of a basis matrix for realizing primitive permutation between columns with the first embodiment of the present invention.

FIG. 15 is a chart illustrating data example of an original 8×8 pixel block extracted from image data with the first embodiment of the present invention.

FIG. 16 is a chart illustrating each calculation result of the sum in the row direction and the sum in the column direction regarding 8×8 pixel block data with the first embodiment of the present invention.

FIG. 17 is a chart illustrating pixel block data subjected to permutation with the first embodiment of the present invention.

FIG. 18 is a chart illustrating data subjected to level shift and DCT with the first embodiment of the present invention.

FIG. 19 is a chart illustrating 8×8 block data subjected to quantization with the first embodiment of the present invention.

FIG. 20 is a chart illustrating data obtained by subjecting data subjected to quantization as shown in FIG. 19 to inverse quantization and inverse DCT (IDCT) in decoding process such as illustrated in FIG. 4, and subjecting the data to level shift so as to be rounded off within a range between 0 to 255.

FIG. 21 is a chart illustrating a pixel block permutated by applying inverse permutation to the data shown in FIG. 20.

FIG. 22 is a chart illustrating results obtained by subtracting the original pixel block data shown in FIG. 15 from the decoded pixel block data shown in FIG. 21.

FIG. 24 is a diagram illustrating the basic configuration of the JPEG compression data file in more detail with the first embodiment of the present invention.

FIG. 25 is a chart illustrating the configuration of header information Ph(n) and specific data example with the first embodiment of the present invention.

FIG. 30 is a chart illustrating results obtained by subjecting the original 8×8 pixel block data shown in FIG. 15 to DCT.

FIG. 31 is a chart illustrating results obtained by subjecting the block data shown in FIG. 30 to quantization.

FIG. 32 is a chart illustrating results obtained by subjecting the block data shown in FIG. 31 to inverse quantization and inverse DCT, and subjecting the block data to level shift so as to be rounded off within data having a range between 0 to 255.

FIG. 33 is a chart illustrating results obtained by subtracting the original pixel block data shown in FIG. 15 from the decoded pixel block data shown in FIG. 32.

FIG. 39 is a chart illustrating a pair (η, SF) of control parameters to be selected depending on a setting item Choice with the second embodiment of the present invention.

FIG. 44 is a chart illustrating examples of a Mode vector and Pos vector according to the second embodiment of the present invention.

FIG. 45 is a chart illustrating an example of header information Phl(n) according to the second embodiment of the present invention.

FIG. 46 is a chart illustrating an example of a global header according to the entire image with the second embodiment of the present invention.

FIG. 47 is a chart illustrating examples of bit values to be recorded in the category of the global header with the second embodiment of the present invention.

FIG. 48 is a chart illustrating examples of the first 8-bit value of the global parameter shown in FIG. 46.

FIG. 49 is a chart illustrating examples of the second 8-bit value of the global parameter shown in FIG. 46.

FIG. 50 is a chart illustrating data example of an original 8×8 pixel block extracted from image data with the second embodiment of the present invention.

FIG. 51 is a chart illustrating results obtained by subjecting the original 8×8 pixel block data shown in FIG. 50 to level shift and DCT.

FIG. 52 is a chart illustrating results obtained by quantizing the block data shown in FIG. 51.

FIG. 53 is a chart illustrating results obtained by subjecting the block data shown in FIG. 52 to inverse quantization and inverse DCT, and subjecting the block data to level shift so as to be rounded off within data having a range between 0 to 255.

FIG. 54 is a chart illustrating results obtained by subtracting the original pixel block data shown in FIG. 50 from the pixel block data subjected to decoding shown in FIG. 53.

FIG. 55 is a chart illustrating examples of mode information and filter position information extracted from header information with the second embodiment of the present invention.

FIG. 56 is a chart illustrating results obtained by subjecting the original 8×8 pixel block data shown in FIG. 50 to 8-time low-pass filter processing such as shown in FIG. 55.

FIG. 57 is a chart illustrating results obtained by subjecting the 8×8 pixel block data subjected to the low-pass filter processing shown in FIG. 56 to level shift and DCT.

FIG. 58 is a chart illustrating results obtained by subjecting the block data shown in FIG. 57 to quantization.

FIG. 59 is a chart illustrating results obtained by subjecting the block data shown in FIG. 58 to inverse quantization and inverse DCT, and subjecting the block data to level shift and inverse LPF processing so as to be rounded off within data having a range between 0 to 255.

FIG. 61 is a chart illustrating an example of header information to be generated in Step S137 in FIG. 60.

FIG. 62 is a chart illustrating an example of header information to be generated in Step S136 in FIG. 60.

FIG. 63 is a chart illustrating an example of header information when another low-pass filter is employed with the third embodiment of the present invention.

DETAILED DESCRIPTION OF THE PREFERRED EMBODIMENT(S)

Figure 1:
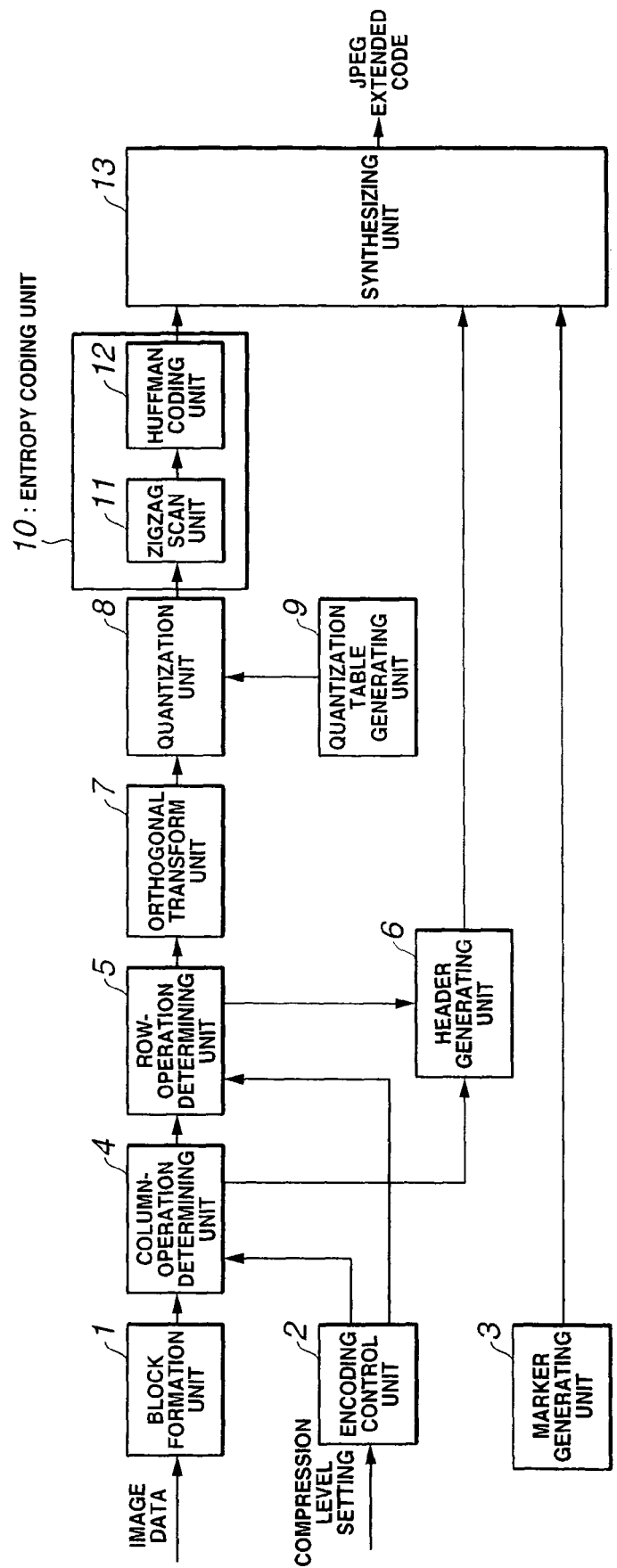
FIG. 1 is a block diagram illustrating the configuration of an extended JPEG encoder according to a first embodiment of the present invention.

With regard to terms employed in the following description, the definitions thereof will be made clear here prior to description of specific embodiments of the present invention.

First, the term "pixel" means an element making up an image, and includes information indicating a spatial position within an image (pixel position), and a value in the spatial position (pixel value). Note that an image described here is not restricted to an image to be defined by disposing pixels within a 2-D Euclidean space in a discrete manner, but rather may be an image to be defined by disposing pixels within a 2-D Riemann space in a discrete manner, and more generally, may be an image to be defined by pixels within a 2-D compact manifold K in a discrete manner.

The term "group of pixel" means a set of pixels. In practice, group of pixels is used as a set of pixels of which spatial position is adjacent to each other, but is not restricted to this. A group of pixels can be represented as a matrix or vector in a mathematical aspect as described later, and may also be handled as a 2-D array or 1-D array in information processing.

The terms "pixel signal" and "pixel data" mean a pixel value described above. The expression pixel signal indicates that a pixel value is handled as an electrical signal in an actual circuit and the like. Also, pixel data expresses the fact that a pixel value is handled as an information in a computer or the like at the time of processing.

The term "image space" means a space configured by disposing pixels in the 2-D compact manifold K in a discrete manner. Specific examples of this image space include an entire image, and an 8×8 pixel block (this is a unit to be processed in the JPEG encoding/decoding) serving as a subset of images obtained by dividing an image. Further, a minimum pixel block unit to be processed in encoding/decoding such as MPEG, MPEG 2, MPEG 4, H. 264, and the like can be taken as another example.

The term "image space transformation" means mapping from an image space A to an image space B, and can be defined as a discrete function f. Within the following embodiments, reversible image space transformation, i.e., those to which an inverse function of f can be defined, will be of primary concern. Specific examples of image space transformation include linear reversible mapping, and specific examples of linear reversible mapping include linear permutation. With regard to specific mathematical representations of reversible linear mapping and linear permutation, these will be described later with examples. In the following examples, this image space transformation is performed prior to performing spatial frequency transformation (pre-processing) when encoding, and also is performed following inverse transformation (post-processing) when decoding, respectively.

The term "spatial frequency transformation" means mapping from an image space to a frequency space.

The term "orthogonal transform" means transformation from the space A for which an inner product is defined to a space B for which an inner product is defined, and inner product values remains invariant under the transformation. Examples of spatial frequency transformation serving as orthogonal transform include DCT (Discrete Cosine Transform). Also, the Hadamard transformation is another example of spatial frequency transformation serving as orthogonal transform, which is expressible as an integer arithmetic operation.

The term "permutation" means replacement of pixels within an image space (pixel block, for a specific example), and becomes a function within image space. As described above, a pixel is obtained by relating information of the pixel value thereof with the pixel position thereof. A permutation is achieved by suspending the pairing between the pixel value and the pixel position within the image space once and creating a new paring. For example, for a pixel-wise permutation, pixel value of a certain pixel position is replaced by a pixel value of another position. Note that a minimum set of pixels subject to permutation is referred to as a permutation unit, which in general is equivalent to a pixel itself. An exchange of two permutation units is performed using primitive permutation.

Other terms will be described within the following examples, or general term definitions will be employed.

Description will be made below regarding examples of the present invention with reference to the drawings.

First Embodiment

Figure 27:
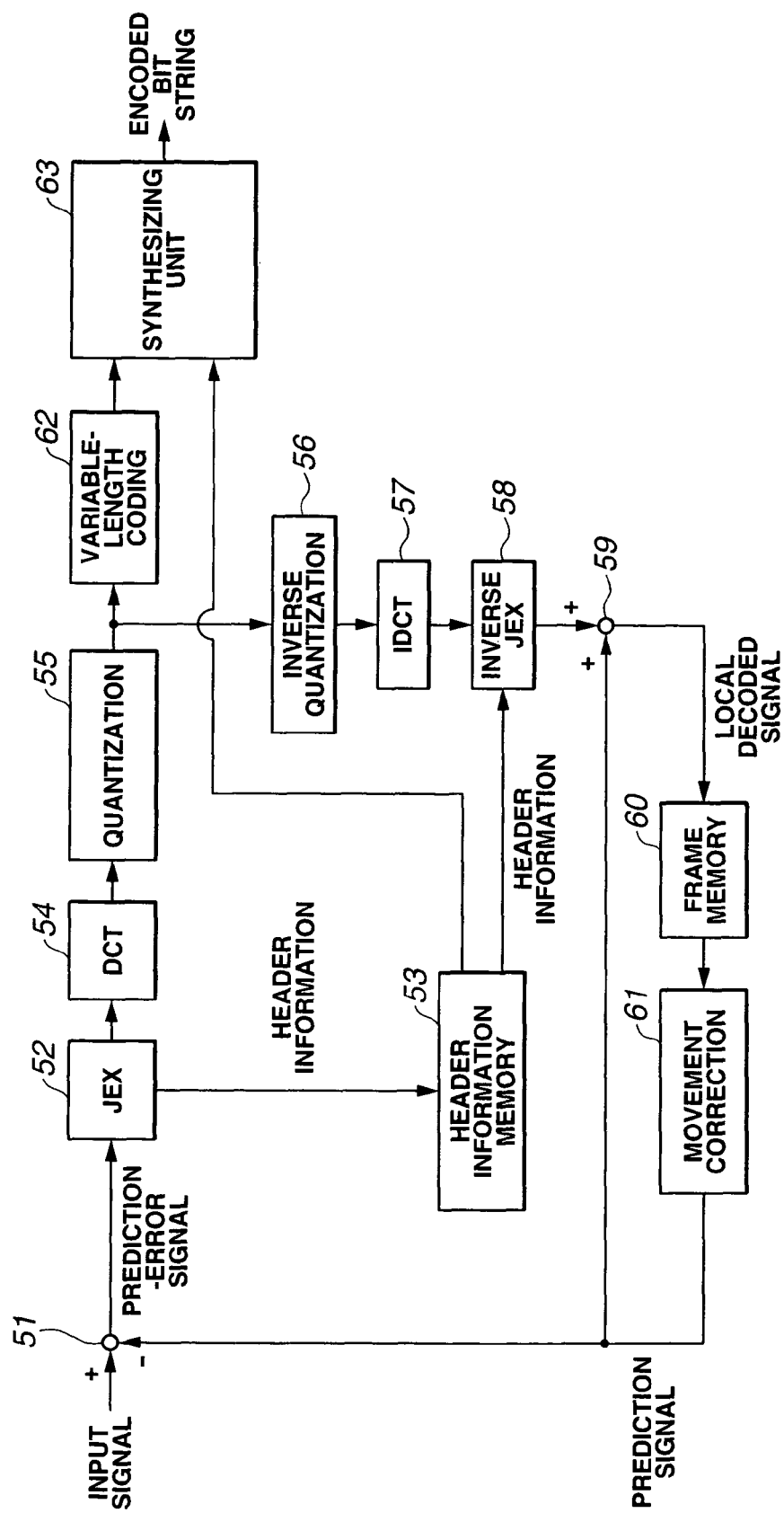
FIG. 27 is a block diagram illustrating the configuration of an encoder which can apply JEX to moving images with the first embodiment of the present invention.
Figure 28:
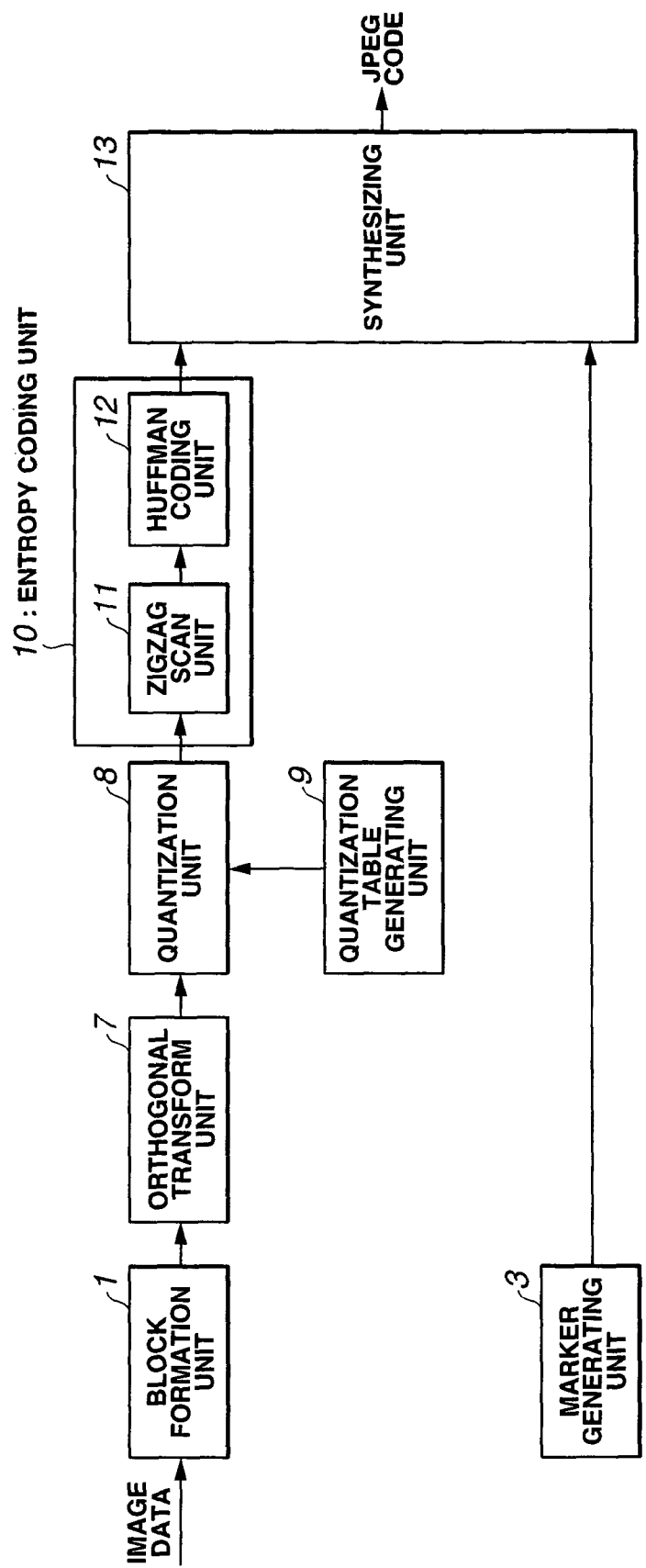
FIG. 28 is a block diagram illustrating the configuration of a conventional JPEG encoder.

FIG. 1 through FIG. 27 illustrate a first embodiment of the present invention, FIG. 1 is a block diagram illustrating the configuration of an extended JPEG encoder, and FIG. 28 is a block diagram illustrating the configuration of a conventional JPEG encoder.

Note that the extended JPEG is referred to as JPEGext, JPEGe, JEX, or the like in appropriate cases.

We remark that the present embodiment can be applied to any one of an image encoding method, image decoding method, moving-image compression method, moving-image expansion method, image encoding program, image encoding device, image decoding device, image encoding/decoding system, and extended image compression/expansion system.

This extended JPEG encoder comprises a block formation unit 1 serving as dividing means, encoding control unit 2, marker generating unit 3, column-operation determining unit 4 serving as spatial transforming means, row-operation determining unit 5 serving as spatial transforming means, header generating unit 6 serving as header information adding means, orthogonal transform unit 7 serving as spatial frequency transforming means, quantization unit 8 serving as quantization means, quantization table generating unit 9 serving as quantization means, entropy coding unit 10, and synthesizing unit 13 serving as compressed-image file generating means and also as header information generating means.

Thus, the extended JPEG encoder illustrated in FIG. 1 is equivalent to the conventional JPEG encoder illustrated in FIG. 28 to which the encoding control unit 2, column-operation determining unit 4, row-operation determining unit 5, and header generating unit 6 have been added. Also, the conventional synthesizing unit 13 illustrated in FIG. 28 has been for synthesizing encoding data and markers, but the synthesizing unit 13 illustrated in this FIG. 1 further synthesizes the JEX header information as well as encoding data and markers, as described later.

The entropy coding unit 10 further comprises a zigzag scan unit 11, and Huffman coding unit 12.

The block formation unit 1 is for inputting image data, and dividing this into block units made up of 8×8 pixels.

The encoding control unit 2 is for reading setting values related to a compression level when encoding, and transmitting setting values necessary for the column-operation determining unit 4 and row-operation determining unit 5 respectively.

The marker generating unit 3 is for generating markers necessary for synthesizing files at the synthesizing unit 13.

The column-operation determining unit 4 determines whether or not a predetermined reversible operation should be applied to the pixel data array in the column direction of 8×8 pixel block image data read from the block formation unit 1 using setting values transmitted from the encoding control unit 2, and performs the operation if determination is made that it should be performed.

The row-operation determining unit 5 determines whether or not a predetermined reversible operation should be applied to the pixel data array in the row direction of 8×8 pixel block image data transmitted from the column-operation determining unit 4 using setting values transmitted from the encoding control unit 2, and performs the operation if determination is made that it should be performed.

With the aforementioned processing sequence, the row-operation determining unit 5 performs a predetermined operation following the column-operation determining unit 4 performing a predetermined operation, but as described later, an operation relating to rows and an operation relating to columns are exchangeable, so a processing sequence may be employed wherein the column-operation determining unit 4 performs a predetermined operation following the row-operation determining unit 5 performing a predetermined operation.

The header generating unit 6 is for generating header information necessary for restoring change in an image by operation of the column-operation determining unit 4 and change in the image by operation of the row-operation determining unit 5 to the original state for subsequent decoding.

The orthogonal transform unit 7 performs a level shift of 8×8 pixel block data transmitted from the row operation determining unit 5, so that the dynamic range of the pixel data is centered around 0 (zero). Then, a DCT (discrete cosine transform) is applied to the pixel block. Note that performing level shift causes the mean value of the pixel block data to approach 0, thereby providing an advantage wherein the so-called DC coefficient can be reduced at the time of performing DCT. Subsequently to the transformation, the orthogonal transform unit 7 outputs 64 sets of data again as 8×8 array block data.

The quantization unit 8 is for performing quantization with a different quantization width for each pixel by dividing each element of 8×8 array block data transmitted from the orthogonal transform unit 7 by each element of a quantization table data made up of same 8×8 array size, and discarding fractions thereof. This quantization table is a table made up of 8×8 quantization coefficients for subjecting each element within 8×8 blocks subjected to spatial frequency transformation to quantization.

The quantization table generating unit 9 generates quantization table data to be employed by the quantization unit 8. As is well known, it generates relatively small-valued data for DC coefficient and low-frequency AC coefficients, and relatively large-valued data for high-frequency AC coefficients.

The zigzag scan unit 11 is for scanning 8×8 array block data transmitted from the quantization unit 8 from the DC coefficient to the high-frequency side of AC coefficients in a zigzag manner, and reading out the data as 64 sets of 1-D array data.

The Huffman coding unit 12 is for performing variable-length coding based on results scanned by the zigzag scan unit 11 with reference to a predetermined Huffman coding table so as to compress the amount of data.

The synthesizing unit 13 is for synthesizing image data subjected to encoding by the Huffman coding unit 12, header information generated by the header generating unit 6, and markers generated by the marker generating unit 3 as one image file (image file subjected to the JPEG extended encoding) and outputting the file.

Figure 2:
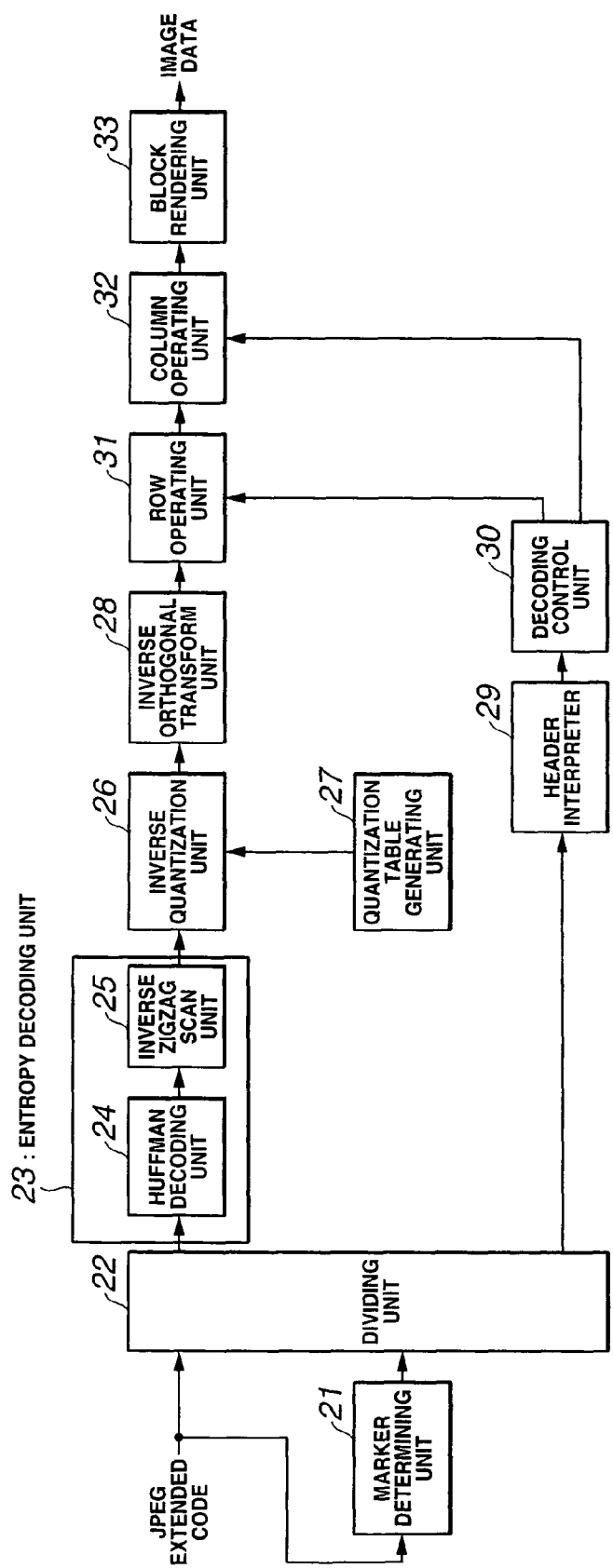
FIG. 2 is a block diagram illustrating the configuration of an extended JPEG decoder according to the first embodiment.
Figure 29:
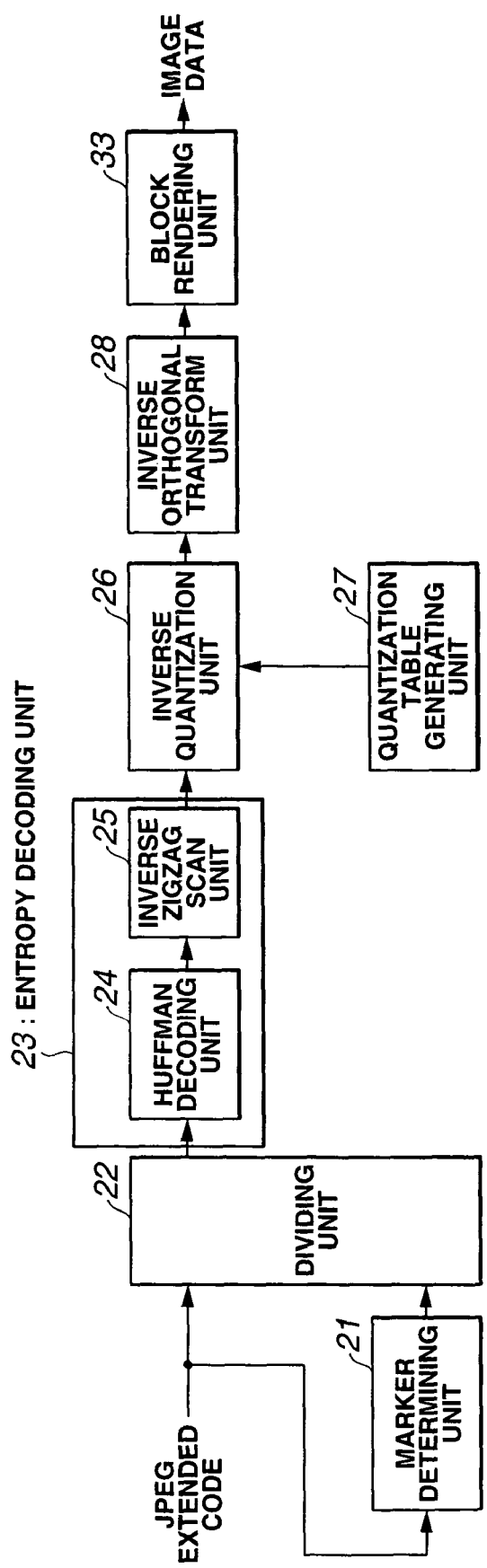
FIG. 29 is a block diagram illustrating the configuration of a conventional JPEG decoder.

Next, FIG. 2 is a block diagram illustrating the configuration of an extended JPEG decoder, and FIG. 29 is a block diagram illustrating the configuration of a conventional JPEG decoder.

This extended JPEG decoder comprises a marker determining unit 21 serving as header information reading means, dividing unit 22, entropy decoding unit 23 serving as entropy decoding means, inverse quantization unit 26 serving as inverse quantization means, quantization table generating unit 27 serving as inverse quantization means, inverse orthogonal transform unit 28 serving as inverse spatial frequency transformation means, header interpreter 29 serving as additional header information readout means, decoding control unit 30, row operating unit 31 serving as inverse spatial transformation means, column operating unit 32 serving as inverse spatial transformation means, and block rendering unit 33 serving as rendering means.

Thus, the extended JPEG decoder illustrated in FIG. 2 is equivalent to the conventional JPEG decoder illustrated in FIG. 29 to which the header interpreter 29, decoding control unit 30, row operating unit 31, and column operating unit 32 are added. Also, the conventional dividing unit 22 illustrated in FIG. 29 has been for dividing encoded data into portions corresponding to pixel blocks, but the dividing unit 22 illustrated in this FIG. 2 further outputs the JEX header information to the header interpreter 29, as described later.

The entropy decoding unit 23 further comprises a Huffman decoding unit 24, and inverse zigzag scan unit 25.

The marker determining unit 21 is for determining all markers included in an image file subjected to the JPEG extended encoding.

The dividing unit 22 is for extracting an encoded portion corresponding to the aforementioned 8×8 pixel blocks based on results determined by the marker determining unit 21.

The Huffman decoding unit 24 is for subjecting a decoding portion output from the dividing unit 22 to decoding with reference to the Huffman coding table.

The inverse zigzag scan unit 25 is for obtaining 8×8 array block data by subjecting data subjected to decoding by the Huffman decoding unit 24 to rendering in a zigzag manner.

The inverse quantization unit 26 is for performing inverse quantization by multiplying each element of 8×8 array block data output from the inverse zigzag scan unit 25 by each element of quantization table data made up of the same 8×8 array size.

The quantization table generating unit 27 is for generating quantization table data to be employed by the inverse quantization unit 26, and the quantization table generated here is the same quantization table as that generated by the quantization table generating unit 9 illustrated in FIG. 1.

The inverse orthogonal transform unit 28 is for generating 8×8 pixel block image data by subjecting 8×8 array block data subjected to inverse quantization by the inverse quantization unit 26 to inverse DCT serving as inverse spatial frequency transformation.

The header interpreter 29 is for determining whether or not header information related to the extended JPEG is recorded within a header.

The decoding control unit 30 is for effecting control by reading out header information necessary for restoring an image, and outputting the header information to the row operating unit 31 or column operating unit 32, when the header interpreter 29 determines that header information according to the extended JPEG has been recorded. More specifically, the decoding control unit 30, in the event that header information necessary for restoring change in an image by a certain operation of the column-operation determining unit 4 is recorded, outputs the header information to the column operating unit 32, but in the event that header information necessary for restoring change in an image by a certain operation of the row-operation determining unit 5 is recorded, outputs the header information to the row operating unit 31.

With the aforementioned processing sequence, the column operating unit 32 performs operation following the row operating unit 31 performing operation, but as described above, an operation relating to rows and an operation relating to columns are exchangeable, so a processing sequence may be employed wherein the row operating unit 31 performs operation following the column operating unit 32 performing operation.

The block rendering unit 33 is for subjecting image data subjected to decoding for each block to rendering as the original one sheet of image data.

Figure 3:
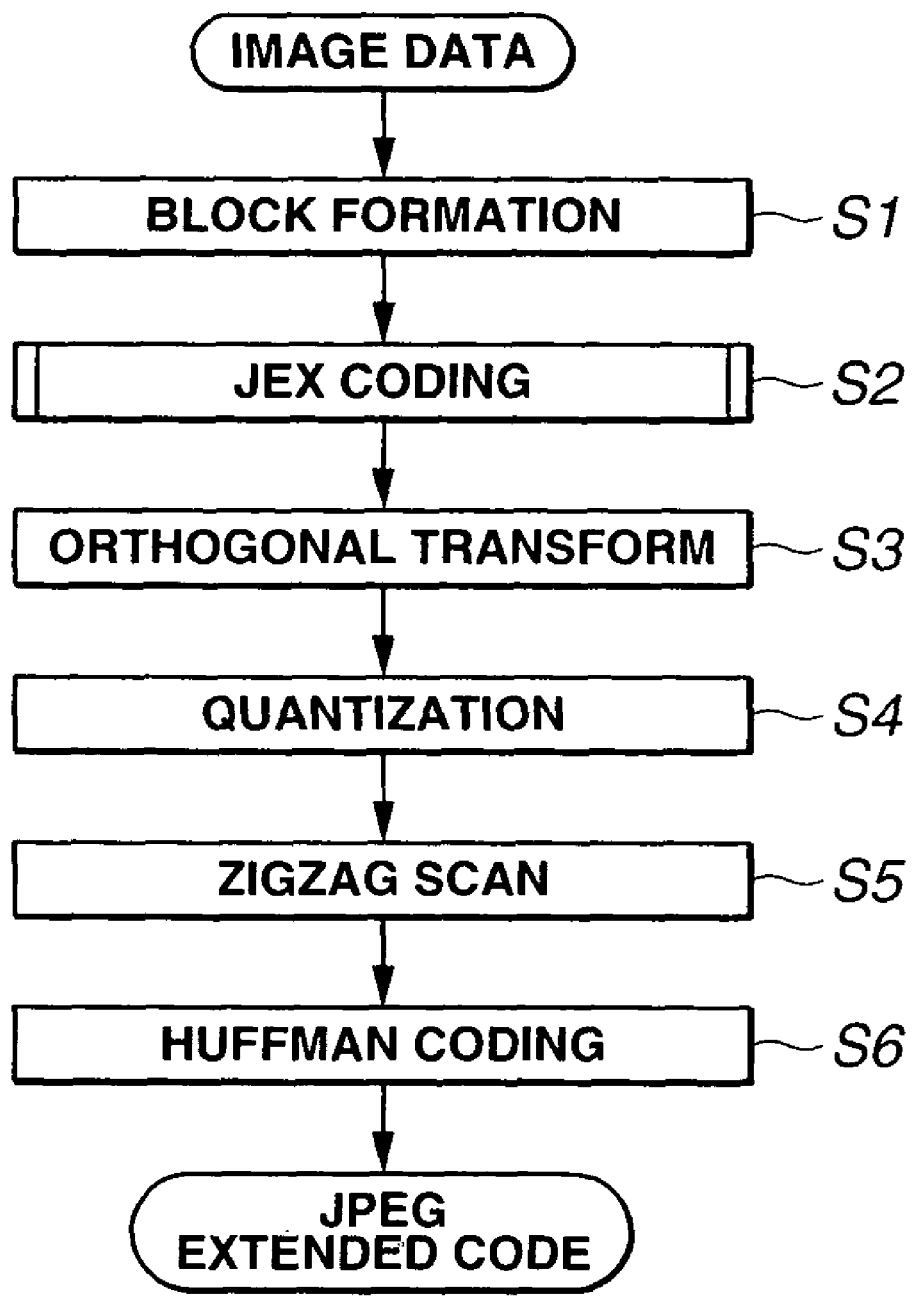
FIG. 3 is a flowchart illustrating encoding process according to the first embodiment of the present invention.

Next, FIG. 3 is a flowchart illustrating encoding process. The process illustrated in FIG. 3 may be hardware-like processing using an encoder having a configuration such as illustrated in FIG. 1, but is not restricted to this, or rather software-like processing may be employed by executing an encoding program using a computer or the like.

Figure 7:
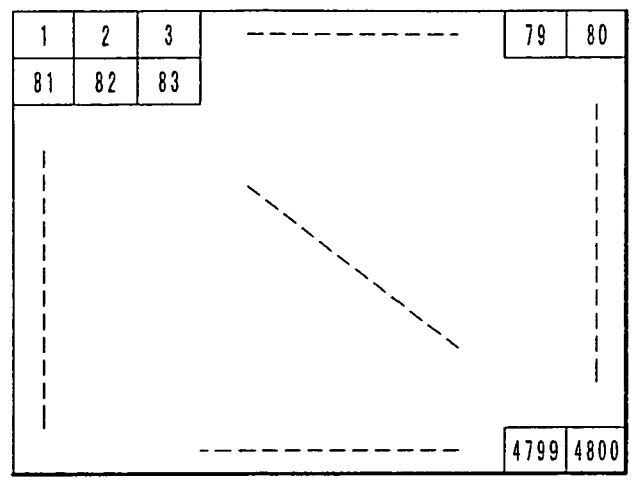
FIG. 7 is a diagram illustrating an example wherein a VGA image is divided into blocks with the first embodiment of the present invention.

Upon this processing being started, first, image data to be processed is divided into some blocks (Step S1). FIG. 7 is a diagram illustrating an example wherein a VGA image is divided into some blocks. With the example illustrated in FIG. 7, a VGA image made up of 640×480 pixels is divided into 8×8 pixel blocks, thereby generating 8×8 pixel blocks of 80×60=4800 in total.

Figure 8:
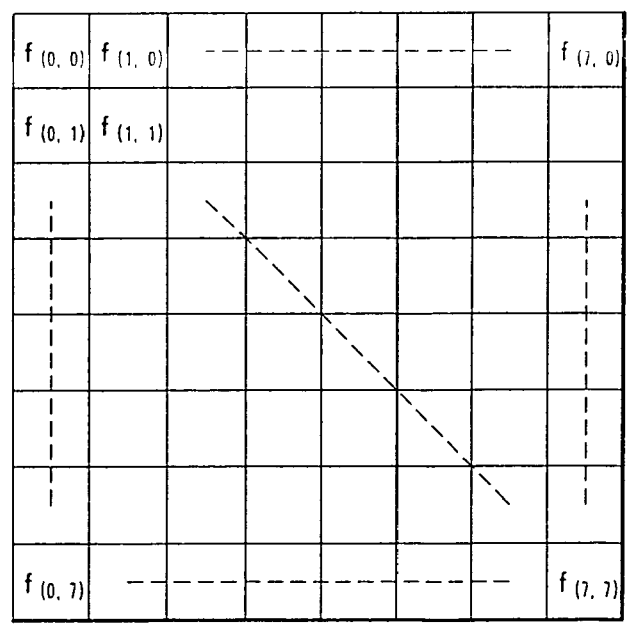
FIG. 8 is a diagram illustrating the pixel configuration of an 8×8 pixel block with the first embodiment of the present invention.

FIG. 8 is a diagram illustrating the pixel configuration of an 8×8 pixel block. With regard to an 8×8 pixel block generated, pixel coordinates are represented as (column number, row number) by assigning row numbers of 0th through 7th row, and column numbers of 0th through 7th column. At this time, the coordinates of a pixel positioned in the upper left corner is represented with (0, 0), the coordinates of a pixel positioned in the upper right corner is represented with (7, 0), the coordinates of a pixel positioned in the lower left corner is represented with (0, 7), and the coordinates of a pixel positioned in the lower right corner is represented with (7, 7). We will represent pixel data in coordinates (k, l) as f (k, l).

Note that while images on which square shaped or rectangular shaped pixels are arrayed in the vertical direction and in the horizontal direction have been shown as examples, images that can be handled with the present embodiment are not restricted to these.

FIG. 9 is a diagram illustrating an example of an image to be subjected to 2-D shaped rendering by padding hexangular pixels. Even with the image shown in FIG. 9, taking pixel positions a through p such as illustrated in FIG. 9 enables pixel data arrayed in the row direction and in the column direction such as illustrated in FIG. 10 to be acquired, thereby enabling various types of processing as described later. FIG. 10 is a diagram illustrating an example wherein the pixel data disposed in FIG. 9 is arrayed in the row direction and in the column direction.

Further, in more general, pixels arrayed on a curved surface, e.g., pixels arrayed such as an insect compound eye for example, may be employed, and also each pixel does not need to have the same shape. That is to say, pixels disposed in a 2-D compact manifold in a discrete manner can be handled with a widespread arrangement.

Description will be back to FIG. 3 again, next, the extended JPEG coding (JEX coding) processing as described later with reference to FIG. 5 in detail is performed (Step S2). Here, permutation of pixel data is performed such that high-frequency coefficients resulting from orthogonal transform at a subsequent stage are reduced. This permutation processing is reversible as described above, so data is never lost when the data is subjected to decoding.

Subsequently, orthogonal transform using DCT is performed (Step S3). First, pixel data f (k, l) is represented as $f_{kl}$ as shown in the following Expression 1. Here, let us assume that the pixel data $f_{kl}$ is made up of 8-bit data having a value between 0 and $2^8-1$.

$$f_{kl}=f(k,l) \quad f_{kl} \in [0,\ldots,2^8-1] \qquad \text{[Expression 1]}$$

DCT is performed by transforming this pixel data $f_{kl}$ into expression D in frequency domain with an arithmetic operation such as shown in Expression 2 using a factor K.

$$D^{uv} = \sum_{k=0}^{7}\sum_{l=0}^{7} K_k^u f_{kl} K_l^v \qquad \text{[Expression 2]}$$

Here, of suffixes appended to each variable, superscript suffixes represent frequencies, and subscript suffixes represent spaces.

Also, the factor K employed for orthogonal transform is represented with the following Expression 3 and Expression 4.

$$K_k^u = \frac{1}{2}C(u)\cdot\cos\frac{(2k+1)u\pi}{16} \qquad \text{[Expression 3]}$$

$$C(u) = \begin{cases} \frac{1}{\sqrt{2}} & (u=0) \\ 1 & (u>0) \end{cases}$$

$$K_l^v = \frac{1}{2}C(v)\cdot\cos\frac{(2l+1)v\pi}{16} \qquad \text{[Expression 4]}$$

$$C(v) = \begin{cases} \frac{1}{\sqrt{2}} & (v=0) \\ 1 & (v>0) \end{cases}$$

Note that Expression 2 can be represented as the following matrix operation by employing a matrix expression.

$$D=KfK^T \qquad \text{[Expression 5]}$$

Here, the superscript [T] appended to the right of the last K of the right side means the usual matrix transposition of K.

More specifically, the coefficient $D^{00}$ may be calculated in the following manner (Expression 6) by exploiting the fact that the angle in the cosine function becomes 0.

$$D^{00} = \sum_{k=0}^{7}\sum_{l=0}^{7} K_k^0 f_{kl} K_l^0 = \frac{1}{8}\sum_{k=0}^{7}\sum_{l=0}^{7} f_{kl} \qquad \text{[Expression 6]}$$

Thus, the coefficient $D^{00}$ can be obtained by multiplying the mean value of image data within an 8×8 pixel block by 8.

As for coefficients other than $D^{00}$, the angular terms in the cosine functions corresponding to frequencies are non-zero in general, so that these coefficients correspond to extracting changes within the 8×8 pixel block for each frequency component. More specifically, for example, the coefficient $D^{10}$ is calculated with the following Expression 7.

$$D^{10} = \sum_{k=0}^{7} \sum_{l=0}^{7} K_k^1 f_{kl} K_l^0 = \quad \text{[Expression 7]}$$

$$\frac{1}{4\sqrt{2}} \cdot \sum_{k=0}^{7} \cos\frac{(2k+1)\pi}{16} \sum_{l=0}^{7} f_{kl} = \overline{V} \cdot \overline{W}$$

Here, each vector V and W represent the following portions in Expression 7 respectively.

$$\overline{V} = (V_0, \ldots, V_7), \quad \text{[Expression 8]}$$
$$V_k = \frac{1}{4\sqrt{2}} \cos\frac{(2k+1)\pi}{16}$$

$$\overline{W} = (W_0, \ldots, W_7), \quad \text{[Expression 9]}$$
$$W_k = \sum_{l=0}^{7} f_{kl}$$

As can be understood with reference to these Expression 8 and Expression 9, the k-th element of the vector W is the sum of pixel data of the k-th column. Also, the k-th element of the vector V is a strictly monotonously decreasing discrete function. In this way, the coefficient $D^{10}$, and, by similar arguments, coefficient $D^{01}$, of which an expression is not explicitly shown, can be represented as vector inner products.

The 64 DCT coefficients from $D^{00}$ to $D^{77}$ can be calculated by performing such an arithmetic operation sequentially.

Back to FIG. 3, following orthogonal transform, the DCT coefficients are quantized (Step S4). This quantization is performed by dividing the 64 DCT coefficients by different coefficient (Q coefficient) each, and discarding fractions thereof. Preselected values can be employed as the coefficients employed for this quantization, and a set of desired coefficients need to be prepared as a quantization table. In general, DC coefficients such as the $D^{00}$, and relatively low-frequency AC coefficients such as the $D^{10}$, $D^{01}$ include the outline of information regarding an image, so the information needs to be stored as precise as possible by performing quantization with relatively small Q coefficients. On the other hand, high-frequency AC coefficients such as the $D^{77}$ for example have only limited influence on the visual effects of the entire image even if such information is omitted. Thus these are quantized with relatively large Q coefficients.

The DCT quantized coefficients are converted into 64 entries within a 1-D array data by scanning from the component 00 to component 77 in a zigzag manner (Step S5).

Subsequently, variable-length coding is performed using the so-called Huffman coding (Step S6). Huffman coding compresses data by giving a short-bit length code to values having high-frequency of appearance, and giving a long-bit length code to values having low-frequency of appearance, but the method thereof is somewhat complicated, and does not directly relate to the first embodiment of the present invention, so details thereof are omitted. Not withstanding this general remark, let us still mention that DC coefficients and AC coefficients are encoded in a different manner, and that AC coefficients of consecutive zeros are taken as a run length, and an AC coefficient after a run of zeros is encoded as a category value of any one of 10 categories classified respectively.

Data encoded through such processing becomes JPEG extended code data, which is made into a file along with markers and header information by the synthesizing unit 13. Note that the aforementioned quantization table, a DC Huffman coding table, an AC Huffman coding table, and so forth are recorded in the header as well as the header information according to the JEX coding.

Figure 4:
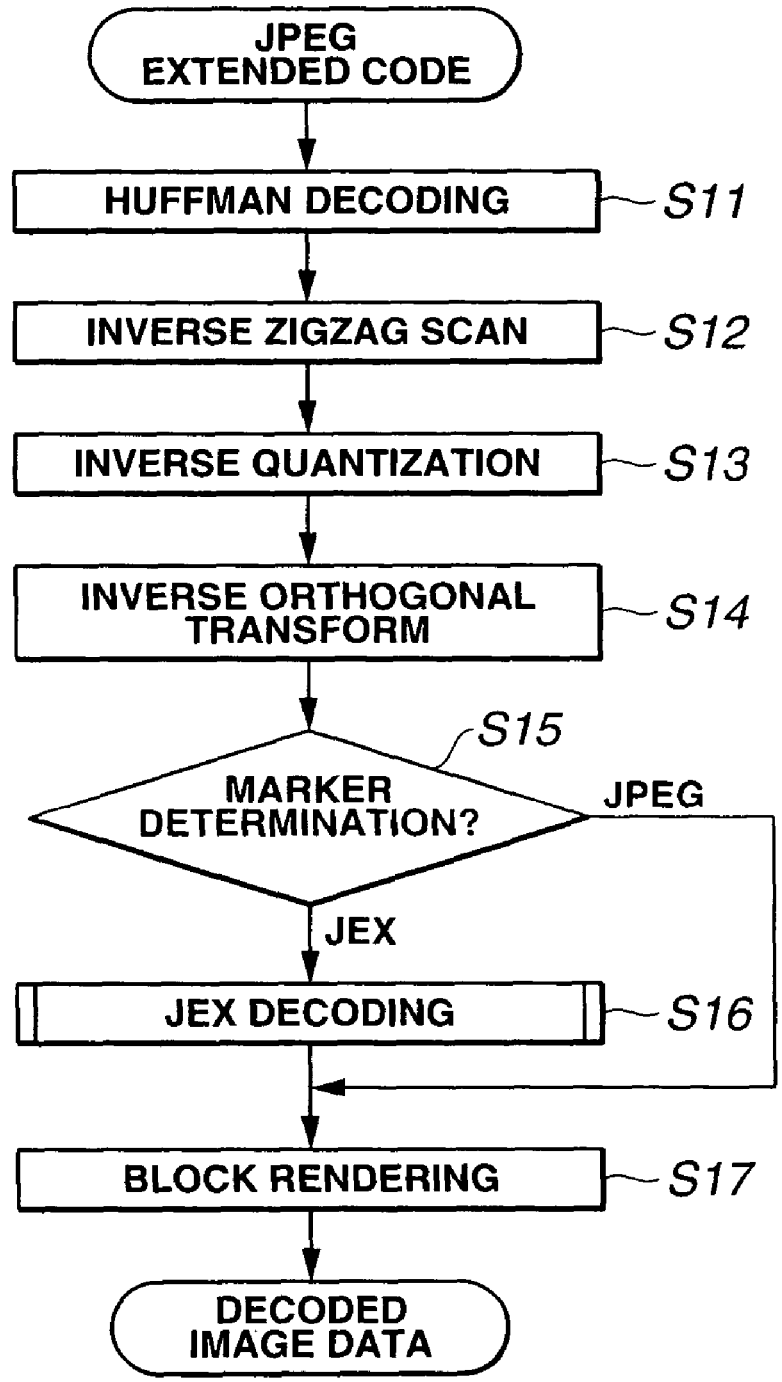
FIG. 4 is a flowchart illustrating decoding process according to the first embodiment of the present invention.

FIG. 4 is a flowchart illustrating decoding process. The process illustrated in FIG. 4 may be hardware-like processing using a decoder having a configuration such as illustrated in FIG. 2, or software-like processing may be employed by executing an decoding program using a computer or the like.

Upon starting this process, the JPEG extended codes to be processed are divided into code portions corresponding to pixel data of an 8×8 pixel block with the help of markers, following which each code portion is subjected to the Huffman decoding with reference to the Huffman coding table recorded in the header (Step S11).

Subsequently, 64 1-D array coefficients are subjected to inverse zigzag scanning to be transformed into 8×8 array of coefficients (Step S12).

Subsequently, inverse quantization is performed with reference to the quantization table recorded in the header (Step S13).

Subsequently, the frequency coefficients are transformed into pixel values in image space by performing inverse DCT (IDCT) (Step S14). At this time, inverse level-shift processing is performed wherein positive and negative image data centered about 0 as the center of a dynamic range is transformed into positive 8-bit data between 0 and $(2^8-1)$.

Next, markers are referenced to determine whether or not the image file to be processed is an image file subjected to the JEX coding (Step S15).

Here, in the event that determination has been made that the image file to be processed is an image file subjected to the JEX coding, the JEX decoding processing such as described later in detail is performed (Step S16).

In the event that the processing in this Step S16 has been completed, or in the event that determination has been made in Step S15 that the image file to be processed is a normal JPEG image file having not been subjected to the JEX coding, processing for rendering 8×8 pixel block image data to a predetermined position in the original image file is performed (Step S17). Upon this block rendering being performed regarding all of the 8×8 pixel blocks, one sheet of an image is restored.

Figure 5:
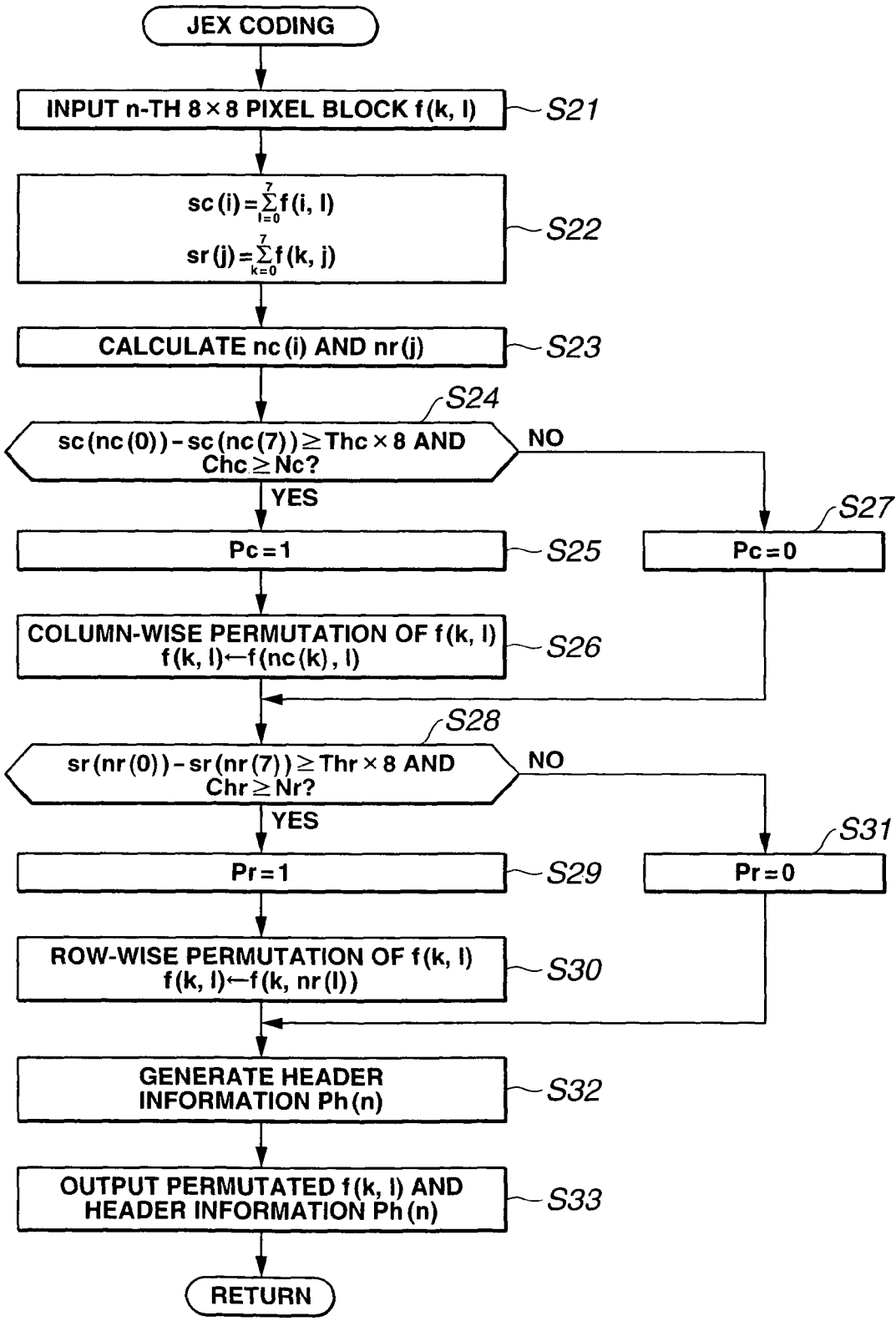
FIG. 5 is a flowchart illustrating JEX coding process according to the first embodiment of the present invention.

FIG. 5 is a flowchart illustrating the JEX coding process. This FIG. 5 illustrates the details of process to be performed in Step S2 in FIG. 3.

When the process starts, the pixel data f (k, l) of the 8×8 pixel blocks divided in Step S1 is input (Step S21). As described in Step S1 in FIG. 3, this process is performed, by dividing one image into multiple blocks. Here the process is performed for the n-th pixel block within the divided pixel blocks, but it is understood that the process is to be performed for all of the pixel blocks by changing this n sequentially.

Next, pixel data f(k,l) is added within each column (in the direction of changing row numbers) to yield a sum data sc(i) for each i-th column as shown in Expression 10, and likewise pixel data f(k,l) is added within each row (in the direction of changing column numbers) to yield a sum data sr(j) for each j-th row as shown in Expression 11:

$$sc(i) = \sum_{l=0}^{7} f(i, l)$$ [Expression 10]

$$sr(j) = \sum_{k=0}^{7} f(k, j)$$ [Expression 11]

Subsequently, a permutation nc (i) of i for sorting 8 sets of the sum data sc(i) in descending order is calculated, and also a permutation nr(j) of j for sorting 8 sets of the sum data sr(j) in descending order is calculated (Step S23). More specifically, for example, let a data array sc(0) through sc(7) and an array of values 0 through 7 be provided in a region on the memory of a computer. By applying any of the sorting algorithm well-known in programming to the data array sc(0) through sc(7), the data can be sorted in descending order. When applying this sorting process of the data array sc(0) through sc(7) to the array of numbers 0 to 7 in the same fashion, the reordered numbers will yield the desired permutation nc(i) of i. The permutation nr(j) of j is also obtained by performing a similar process.

Note that while the sum data sc(i) and sum data sr(j) are sorted in descending order here, ascending-order sorting may be employed instead. Further, any sorting may be employed as long as sorting can reduce the frequencies of an image, regardless of descending-order or ascending-order.

Subsequently, determination is made regarding whether or not the processing for sorting the column data in the 8×8 pixel block is necessary. More specifically, it is determined whether or not the following Expression 12 using a threshold value Thc $sc(nc(0))\text{-}sc(nc(7)) \geq Thc \times 8$ [Expression 12]

is satisfied, and the following Expression 13 using a threshold value Nc (4, for a typical example value)

$Chc \geq Nc$ [Expression 13]

is satisfied (Step S24).

The permutation nc(i) of i is a permutation for sorting the sum data sc(i) in descending order, so sc(nc(0)) is always greater than or equal to sc(nc(7)), i.e., the left side of Expression 12 is always 0 or positive. The left side of this Expression 12 becomes an index indicating how uneven the sum of a pixel signal within a column changes at the maximum when a column changes to another column. Accordingly, in the event that the left side of this Expression 12 is small, there is almost no unevenness of signals between different columns (the sum within different columns), so determination is made that exchange between columns does not need to be performed.

Also, the threshold value Thc is determined such as shown in the following Expression 14, for example.

$Thc = 2^{n-3}$ $Thr = Thc$ [Expression 14]

Here, n represents a bit value indicating the dynamic range of pixel data, so that n=8 in the event of 8-bit pixel data, for example. Also, the number to be subtracted from n is 3 here, but this is because the pixel block is configured with 8×8 pixels, and the pixel line in the column direction is 8 pixels, i.e., $2^3$ pixels. Accordingly, in the event of employing a 16×16 pixel block for example, the number to be subtracted from n becomes 4. However, this describes Dust an example of a method for obtaining the threshold value Thc, the method is not restricted to this.

Note that with a later-described threshold value Thr to be employed in Step S28, the same value as the threshold value Thc is usually employed as shown in this Expression 14, but this is also an example, a value different from the threshold value Thc may be employed. For example, in the event of an image having correlation in a specific direction, it can be conceived that the threshold value Thc and threshold value Thr are set differently.

Further, the same threshold value Thc or the same threshold value Thr is employed regarding all of the pixel blocks here, but a threshold value to be employed here is not restricted to this. Rather, a different threshold value may be employed for each pixel block.

Subsequently, the decision value Chc (and a later-described decision value Chr) is calculated with the following Expression 15.

$$Chc = \sqrt[w]{\sum_{i=0}^{7} |nc(i) - i|^w}$$ [Expression 15]

$$Chr = \sqrt[w]{\sum_{i=0}^{7} |nr(i) - i|^w}$$

This decision value Chc (and decision value Chr) can be referred to as an index for the degree of activity of permutation. For example, in the event of the decision value Chc=0, the pixel value added within a column (in the direction of changing row numbers) are already such that it becomes smaller when changing columns from left to right, so that exchange of columns is not necessary. Also, it may be inferred that the greater the decision value Chc is, the greater the number of columns to be exchanged or difference between an exchange destination and an exchange source will be.

The threshold value Nc represents the lower limit value of degree of activity. For example, suppose that a permutation nc(i) such as shown in FIG. 11 is obtained. FIG. 11 is a chart that illustrates necessary elements for a calculation of the decision value Chc to be obtained for a permutation nc(i). As shown in the drawing, in the event that movement is made to a farther column, a greater value is obtained. In the event that the decision value Chc is calculated using a weight w set to 1, $Chc=4+1+1+0+4+1+1+2=14$ is obtained.

Note that the value of the decision value Chc changes depending on the value of this weight w. More specifically, as shown in FIG. 12, when the weight w is set to 1, the two types of nc (i) can obtain the same decision value Chc=8, but when the weight w is set to 4, one of the decision value Chc becomes around 4.8, and the other of the decision value Chc becomes around 1.7, thus difference appears. FIG. 12 is a chart illustrating regarding how the decision value changes when the weight w changes. Thus, in the event of w=1, the total number of columns to be exchanged and difference of the column numbers between an exchange destination and an exchange source are handled on an equal footing. On the other hand, when the weight w is set to a greater value, difference of the column numbers between the exchange destination and the exchange source is handled with more emphasis than the total number of columns to be exchanged. Thus, when the weight w is set to a greater value, a permutation of farther-apart columns will lead to a larger decision value Chc than a permutation between merely closer columns. The greater the difference of the column numbers between the exchange destination and the exchange source is, the greater the deformation of the picture is due to exchange of columns, so increasing the weight w corresponds to handling determination as to picture deformation with more emphasis. This weight w can be set by means of compression level setting to the encoding control unit 2 as necessary. If the weight is set to "1" for example, an advantage is provided wherein an arithmetic operation is simplified, resulting in reduction of processing load.

Note that with Step S24, only the lower limit has been determined as to the two decision values, but determination regarding the upper limit may be further performed. That is to say, when the aforementioned two decision values become too great, picture within a pixel block will be greatly deformed after permutation. In this case, if a JEX file is restored with a conventional JPEG decoder, the image will be reproduced almost only on block-level. Accordingly, in the event of giving importance to general compatibility with the conventional JPEG decoding, proving an upper limit is preferable. Providing such an upper limit enables picture within a pixel block to be reproduced to some extent when a JEX file is restored with a conventional JPEG decoder.

In Step S24, in the event that condition is satisfied, a 1 indicating that permutation regarding columns is performed is substituted for data Pc (Step S25). This data Pc is data to be recorded later in the header of an image file as header information.

Subsequently, column-wise permutation of the f(k,l) is actually performed (Step S26). Here, the data of the f(k,l) is retreated to another memory region or the like once, and then the data of the f(nc(k),l) is written into the data position of the f(k,l). Permutation is performed by repeatedly performing such processing such that the data array of 8×8 pixel block becomes f(nc(0),l), f(nc(1),l), . . . , f(nc(7),l)

This permutation is a specific example of linear permutation as described below.

First, pixel data f(0,0) through f(7,7) of an 8×8 pixel block such as shown in FIG. 8 is represented as an 8×8 matrix M such as shown in the following Expression 16.

$$M = \begin{pmatrix} f(0,0) & f(1,0) & \ldots & f(7,0) \\ f(0,1) & f(1,1) & & \vdots \\ \vdots & & \ddots & \vdots \\ f(0,7) & \ldots & \ldots & f(7,7) \end{pmatrix}$$ [Expression 16]

Note that the 8×8 pixel block has been represented as an 8×8 square matrix by naturally interpreting this as it is, but a matrix representation is not restricted to this. For example, this may be represented as a 4×16 non-square matrix M' such as shown in the following Expression 17.

$$M' = \begin{pmatrix} f(0,0) & f(1,0) & \ldots & f(7,0) & f(0,1) & f(1,1) & \ldots & f(7,1) \\ f(0,2) & f(1,2) & \ldots & f(7,2) & f(0,3) & f(1,3) & \ldots & f(7,3) \\ f(0,4) & f(1,4) & \ldots & f(7,4) & f(0,5) & f(1,5) & \ldots & f(7,5) \\ f(0,6) & f(1,6) & \ldots & f(7,6) & f(0,7) & f(1,7) & \ldots & f(7,7) \end{pmatrix}$$ [Expression 17]

The matrix representation shown in this Expression 17 is a representation for dividing pixel data into even rows and odd rows, which is advantageous when interlace image data of which one frame is divided into even fields and odd fields is handled. In other words, adjacent pixels should preferably have high correlation in order to compress an image with high-efficiency in this method. Accordingly, it can be conceived that more effective data encoding can be realized by handling pixel data for each field which is assumed to have high correlation. A matrix operation on a 4×16 non-square matrix shown in Expression 17 is performed as follows: a row arithmetic operation is performed by multiplying a 4×4 matrix from the left, and a column arithmetic operation is performed by multiplying a 16×16 matrix from the right. Performing such a matrix representation enables column transformation between a column made up of 4 pixels made up of odd rows (odd lines) and a column made up of 4 pixels made up of even rows (even lines).

Further, examples of another matrix representation include a matrix M" such as shown in the following Expression 18.

M"=(f(0,0)f(1,0) . . . f(7,0)f(0,1) . . . f(7,1)f(0,2) . . . 
    f(7,2) . . . f(7,7)) [Expression 18]

The matrix representation shown in this Expression 18 is a matrix having one row and 64 columns, i.e., a 64-D vector. Performing a matrix arithmetic operation as to the vector using such a representation causes a huge matrix operation of 64 rows and 64 columns to be performed, and this provides a disadvantage wherein arithmetic operation processing becomes heavy and time-consuming. On the other hand, this matrix operation enables the highest degree of freedom in arithmetic operation acting on pixels.

An arbitrary reversible matrix operation acting on a matrix M is represented as shown in the following Expression 19.

$M \rightarrow A \cdot M \cdot B$ [Expression 19]

Here, A and B are matrices having an inverse matrix respectively. In the event of performing an arithmetic operation in reverse direction, the inverse matrix of A may be multiplied from the left, and the inverse matrix of B may be multiplied from the right. Note that this matrix operation is applicable regardless of whether the matrix M is a square matrix or non-square one.

In order to apply this matrix operation shown in Expression 19 to a pixel block of image data, and in particular apply this as pre-processing of JPEG in a reliable manner, the matrix components after the matrix operation need to be in the dynamic range [0 through $2^8-1$] of a pixel value. This condition and the condition that matrix A and matrix B be reversible, which is a necessary condition, are summarized together as sufficient conditions as follows.

First, with regard to the matrix A, (A1) The matrix A has an inverse matrix (is invertible).

(A2) Each element a of the matrix A satisfies $1 \geq a \geq 0$.

(A3) The sum Suma in the row direction of each element a of the matrix A satisfies $1 \geq \text{Suma} \geq 0$.

Next, with regard to the matrix B, (B1) The matrix B has an inverse matrix (is invertible).

(B2) Each element b of the matrix B satisfies $1 \geq b \geq 0$.

(B3) The sum Sumb in the column direction of each element b of the matrix B satisfies $1 \geq \text{Sumb} \geq 0$.

With regard to the condition A3 and condition B3, the smaller the sum is, i.e., the farther away from 1 closer to 0 the sum is, the more suppressed the signal values of the entire pixel blocks are, thereby reducing difference between the signals, i.e., intensifying a low-pass filter (LPF) effect. However, when suppressing the signal values of the entire pixel block, DCT coefficients are also suppressed over the entire frequency components, so that error due to quantization step increases.

In the case of JPEG, the quantization step is larger for higher frequency coefficients, and accordingly, the influence due to such quantization error increases for higher frequency components. (See description of quantization error regarding Japanese Unexamined Patent Application Publication No. 2000-308058 described later. Note that, in order to facilitate the explanation, this description of quantization error is exemplified with a simple division operation of a pixel block, but the conclusion regarding the quantization error can be applied to understand the increase of quantization error due to decrease of common element values of the matrices A and B.) Accordingly, the sum Suma shown in the condition A3 and the sum Sumb shown in the condition B3 are preferably set to values as close as possible to 1, respectively.

Further, the smaller the values of the matrix elements a and b in the conditions A2 and B2 are, the greater the arithmetic error of the results due to series of encoding and decoding procedures will be. This is because actual pixel signals are digitized regardless of the matrix A and matrix B being reversible. More specifically, as the matrix elements a and b approach 0, the elements of the inverse matrix will have a value comparable to 1/a or 1/b (these are all greater than 1), i.e., increase. Accordingly, the smaller the matrix element a or b becomes, the greater the arithmetic error due to rounding off the matrix operation results to the nearest integer number after performing the inverse matrix operation.

Due to such a reason, it can be concluded that the sum within a column and the sum within a row in a matrix serving as an operator are preferably set to a value as close to 1 as possible, and also when the matrix elements a and b themselves are set to a value as close to 1 as possible, the accuracy of digital arithmetic operation improves.

Some examples of matrices that satisfy conditions like the aforementioned conditions A1 through A3 or conditions B1 through B3 can be shown. A first example is a permutation matrix, and a second example is a matrix of which all the elements of the lower left triangular array portion excluding diagonal elements become 0 (more precise description will be given below). Description will be made regarding these two examples in brief.

As for the first example, in a permutation matrix, each element is set to a value of either 0 or 1, the sum of elements of each row is constantly 1, and also the sum of elements of each column is constantly 1. An example of a typical permutation matrix is shown in the following Expression 20.

$$P = \begin{pmatrix} 1 & 0 & 0 & 0 & 0 & 0 & 0 & 0 \\ 0 & 0 & 1 & 0 & 0 & 0 & 0 & 0 \\ 0 & 1 & 0 & 0 & 0 & 0 & 0 & 0 \\ 0 & 0 & 0 & 0 & 0 & 0 & 1 & 0 \\ 0 & 0 & 0 & 1 & 0 & 0 & 0 & 0 \\ 0 & 0 & 0 & 0 & 0 & 0 & 0 & 1 \\ 0 & 0 & 0 & 0 & 0 & 1 & 0 & 0 \\ 0 & 0 & 0 & 0 & 1 & 0 & 0 & 0 \end{pmatrix}$$ [Expression 20]

Accordingly, for a linear reversible transformation using such a permutation matrix, it can be concluded that the aforementioned LPF effect and occurrence of a quantization error with this are minimum. Since this permutation matrix has a configuration wherein a single non-zero coefficient 1 exists for each row and for each column, in the event of actually performing an arithmetic operation that multiplies a matrix representing a pixel block by the permutation matrix, matrix operation should be performed as exchange of a column and row within the matrix representing the pixel block. Note that this permutation matrix is a matrix to be employed as the pre-processing of DCT with the present first embodiment, so will be described later in more detail.

Next, the matrix of the second example is as follows. This matrix is a matrix of which all the elements of the lower left triangular array portion other than the diagonal elements are 0, the elements of the upper right triangular portion including the diagonal elements are selected so as to satisfy the condition A2 and condition A3, and also the diagonal elements are all non-zero. Such a matrix is shown in the following Expression 21.

$$B = \begin{pmatrix} a_0 & b_{10} & \ldots & \ldots & b_{70} \\ 0 & \ddots & & b_{ij} & \vdots \\ \vdots & & \ddots & & \vdots \\ \vdots & 0 & & \ddots & b_{76} \\ 0 & \ldots & \ldots & 0 & a_7 \end{pmatrix}$$ [Expression 21]

Here, $a_i$ satisfies $1 \geq a_i > 0$ ($i=0, \ldots, 7$), $b_{ij}$ satisfies $1 > b_{ij} \geq 0$ ($i=1, \ldots, 7, j=, \ldots, 6, j<i$), and further, in the case of the matrix B, the elements satisfy Expression 22, and in the case of the matrix A, the elements satisfy Expression 23 respectively.

$$0 < a_i + \sum_{j<i} b_{ij} \leq 1$$ [Expression 22]

$$0 < a_l + \sum_{i>l} b_{il} \leq 1$$ [Expression 23]

A specific example of this matrix is shown in the following Expression 24.

$$B = \begin{pmatrix} 1 & 0 & & & & & & & 0 \\ 0 & \ddots & & & & & & & \\ & & 1 & & & & & & \\ & & & 1 & 0 & \cdots & 0 & 0.5 & \\ & & & & 1 & & & 0 & \\ \vdots & & & & & \ddots & & \vdots & \vdots \\ & & & & & & 1 & 0 & \\ & & & & & & & 0.5 & \\ & & 0 & & & & & 1 & \\ & & & & & & & & \ddots & 0 \\ 0 & & & \cdots & & & & 0 & 1 \end{pmatrix}$$ [Expression 24]

It has been known that with such a matrix of which diagonal elements are all non-zero, and also the elements of the lower left triangular array portion are all zero, the determinant thereof becomes the product of all of the diagonal elements, i.e., the determinant is non-zero, so that the matrix is invertible.

Since such a matrix is invertible and has a function for reducing high frequency coefficients in general, it may be concluded that it has a reversible LPF function. When performing a spatial transformation based on such a matrix to the matrix M representing a pixel block, the matrix operation as represented mathematically must be actually performed, so that it is preferable to perform this matrix operation in an integrated circuit (IC) to enable high-speed arithmetic processing. Further, in the event of operating such a matrix in combination with the aforementioned permutation matrix, performing this as a matrix operation is the most effective way.

Next, the matrix A or matrix B shown in Expression 19 has an inverse matrix, so has a feature like that shown in the following.

That is to say, it has been mathematically shown that with the product in combination of a basis matrix $F_{kl}$ such as shown in the following Expression 25 and a basis matrix $F_k(\alpha)$ such as shown in Expression 26, an arbitrary matrix having an inverse matrix can be represented as $$A = \ldots F_{kl} \ldots F_j(\alpha) \ldots F_{mn} \ldots F_i(\beta) \ldots$$

(see Max Koecher, "Lineare Algebra und analytische Geometrie", Springer Verlag (Berlin), 1985, for example).

$$F_{kl} = \begin{pmatrix} 1 & 0 & & & & & 0 \\ 0 & \ddots & & & & & \\ & & 1 & 0 & \cdots & 0 & 1 \\ & & & & & & 0 \\ \vdots & & & \ddots & & \vdots & \vdots \\ & & & & & & 0 \\ & & & & & 1 & \\ & & & & & & \ddots & 0 \\ 0 & & & \cdots & & & 0 & 1 \end{pmatrix}$$ [Expression 25]

$$F_k(\alpha) = \begin{pmatrix} 1 & 0 & \cdots & & & 0 \\ 0 & \ddots & & & & \\ & & 1 & & & \\ \vdots & & & \alpha & & \vdots \\ & & & & 1 & \\ & & & & & \ddots & 0 \\ 0 & & & \cdots & & 0 & 1 \end{pmatrix}$$ [Expression 26]

Note that the non-diagonal component 1 in $F_{kl}$ shown in Expression 25 is an element of the k-th row and l-th column (note that of the two suffixes, the left-side suffix represents a row number, the right-side suffix represents a column number, so this representation is reverse of the suffix representation of other matrix portions), the diagonal component $\alpha$ in $F_k(\alpha)$ shown in Expression 26 is an element of the k-th row and k-th column. Further, $F_k(\alpha)$ needs to have an inverse matrix, so $\alpha$ is a non-zero real number.

Multiplying the matrix M by the basis matrix $F_{kl}$ shown in Expression 25 from the right side (i.e., $M \cdot F_{kl}$) generates an arithmetic operation wherein the elements of the l-th column of the matrix M are added to the corresponding elements of the k-th column of the matrix M respectively, the result of which are taken to be the new l-th column.

Also, multiplying the matrix M by the basis matrix $F_{kl}$ from the left side (i.e., $F_{kl} \cdot M$) generates an arithmetic operation wherein the elements of the k-th row of the matrix M are added to the corresponding elements of the l-th row of the matrix M respectively, and the obtained results are taken as the new k-th row.

On the other hand, multiplying the matrix M by the basis matrix $F_k(\alpha)$ shown in Expression 26 from the right side (i.e., $M \cdot F_k(\alpha)$) generates an arithmetic operation wherein each element of the k-th column of the matrix M is multiplied by $\alpha$, and the obtained results are taken as the new k-th column.

Further, multiplying the matrix M by the basis matrix $F_k(\alpha)$ shown in Expression 26 from the left side (i.e., $F_k(\alpha) \cdot M$) generates an arithmetic operation wherein each element of the k-th row of the matrix M is multiplied by $\alpha$, and the obtained results are taken as the new k-th row.

The inverse matrices of the base matrices $F_{kl}$ and $F_k(\alpha)$ are represented in the following Expression 27 using the combination of the basis matrices $F_{kl}$ and $F_k(\alpha)$ themselves.

$$F_{kl}^{-1} = F_l(-1) F_{kl} F_l(-1),$$

$$F_{kl} F_{kl}^{-1} = E$$

$$F_l(\alpha)^{-1} = F_l(\alpha^{-1}),$$

$$F_l(\alpha) F_l(\alpha^{-1}) = E$$ [Expression 27]

Here, E is the unit matrix as shown in the following Expression 28.

$$E = \begin{pmatrix} 1 & 0 & \cdots & \cdots & 0 \\ 0 & \ddots & & & \vdots \\ \vdots & & 1 & & \vdots \\ \vdots & & & \ddots & 0 \\ 0 & \cdots & \cdots & 0 & 1 \end{pmatrix}$$ [Expression 28]

Also, the matrix operation shown in Expression 19 is a linear operation. That is to say, if the matrix M is represented as the sum of a matrix $M_1$ and matrix $M_2$, then the following Expression 29 holds, $$A \cdot M \cdot B = A \cdot (M_1 + M_2) \cdot B = A \cdot M_1 \cdot B + A \cdot M_2 \cdot B \qquad \text{[Expression 29]}$$

showing that linearity is satisfied. Accordingly, the matrix operation shown in Expression 19 is a linear invertible operation, and in the event of employing this for changing image space distribution, this can be referred to as linear invertible mapping. In other words, we can say that in the event of pixels being represented as a matrix, linear invertible mapping is image space transformation obtained by subjecting this matrix to an invertible linear matrix operation.

Thus, linear invertible mapping is a mapping obtained by subjecting the matrix M successively to 1. An arithmetic operation for adding the second row or column to the first row or column 2. An arithmetic operation for multiplying one row or column by a non-zero coefficient.

Note that combing linear invertible image space transformation as shown in Expression 19 with DCT as shown in Expression 5 generates a matrix representation such as shown in the following Expression 30.

$$M \rightarrow KAMBK^T \qquad \text{[Expression 30]}$$

On the other hand, a matrix operation corresponding to level shift is a non-linear operation. A level shift is an arithmetic operation, wherein to the matrix M of pixel data is added a matrix A, whose elements are given by the amount of level shift. As shown in the following Expression 31, $$M + A = (M_1 + M_2) + A = (M_1 + A) + (M_2 + A) - A \qquad \text{[Expression 31]}$$

linearity is not satisfied.

Also, the technique described in Japanese Unexamined Patent Application Publication No. 2000-308058 in the Background Art is for performing transformation such as shown in the following Expression 32, $$M \rightarrow (\tfrac{1}{2}) \cdot M + 128 N \qquad \text{[Expression 32]}$$

prior to performing DCT. Here, N is a matrix of which all elements are 1. This transformation is for compressing the pixel values into half of the dynamic range so as to shift them to the medium value within the original dynamic range. Thus, this transformation includes a level shifting equivalent to the above-mentioned level shift, and it is easy to show that linearity is not satisfied. Combining this transformation with DCT to be performed subsequently, the total transformation can be represented such as shown in the following Expression 33.

$$M \rightarrow \frac{1}{2} K M K^T + 1024 \overline{D}^{00} \qquad \text{[Expression 33]}$$

Here, the matrix $D^{00}$ serving as the second item of the right side (substitutive representation) is a matrix wherein only the (0, 0) coefficient of DCT becomes a value of 1, i.e. simply, a matrix wherein a component (0, 0) alone is 1, and components other than this become 0.

Note that the technique described in this Japanese Unexamined Patent Application Publication No. 2000-308058 is a transformation wherein quantization error generally increases as compared with not only the JEX described in the present first embodiment, but also with respect to the conventional JPEG.

That is to say, if we express the absolute value of a DCT coefficient in the conventional JPEG as w, as shown in the following Expression 34, $$w = |(KMK^T)^{uv}| \qquad \text{[Expression 34]}$$

then the quantization error $\Delta 1$ after quantization and inverse quantization becomes the following Expression 35:

$$\Delta_1 = \left[\frac{w}{q}\right] \cdot q \qquad \text{[Expression 35]}$$

Here, q is q=Q (u, v), which represents a quantization width.

On the other hand, it is easy to show that when the processing using the technique described in Japanese Unexamined Patent Application Publication No. 2000-308058 is employed, followed by a DCT, and a subsequent quantization and inverse quantization, the quantization error $\Delta 2$ becomes the following Expression 36.

$$\Delta_2 = \left[\frac{w}{2q}\right] \cdot 2q \qquad \text{[Expression 36]}$$

The absolute value w of the DCT coefficient may be divided by 2q into a quotient $\zeta$ ($\zeta$ is an integer satisfying $\zeta \geq 0$) and a first remainder, and the latter can be further divided by q into a quotient $\xi$ ($\xi = 0$ or 1) and a second remainder $\eta$ ($\eta$ is an integer satisfying $q > \eta \geq 0$), i.e., the absolute value w of the DCT coefficient is decomposed such as shown in the following Expression 37.

$$w = \zeta \cdot 2q + \xi \cdot q + \eta \qquad \text{[Expression 37]}$$

Consequently, if the difference between $\Delta 1$ and $\Delta 2$ is evaluated, as shown in the following Expression 38, $$\Delta 1 - \Delta 2 = [w/q] \cdot q - [w/(2q)] \cdot 2q \qquad \text{[Expression 38]}$$
$$= (2\zeta + \xi) \cdot q - \zeta \cdot 2q$$
$$= \xi \cdot q \geq 0$$

it can be understood that the quantization error is 0 or q (quantization width), thus is equal to each other or increases.

Next, as a particular example of linear invertible mapping as described above, let us consider linear permutation. This linear permutation is transformation that can be realized by combining exchanges of rows with exchanges of columns in a pixel block. Accordingly, arbitrary linear permutation is represented as the product of primitive permutations made up of exchange of rows or exchange of columns. For a transformation based on such linear permutation, a pixel value within a pixel block can be found in a certain position within the pixel block after transformation. Accordingly, the mean value of pixel values within the pixel block is unchanged even after transformation, so linear permutation has no influence on statistics such as the frequency of appearance of a pixel with a certain pixel value and so forth.

Such a linear permutation is of the type of the aforementioned linear invertible mapping, and thus can be represented as a product of the aforementioned basis matrices. In particular, concerning the basis matrix $F_k(\alpha)$, we may use $F_k(-1)$ by substituting $\alpha = -1$.

Next, let us consider primitive permutation for exchanging the k-th column having a value a with the l-th column having a value b, as in FIG. 13 illustrating an example of the matrix M. A basis matrix is sequentially applied to such a matrix in the order as shown in FIG. 14. FIG. 14 is a chart illustrating the application sequence of a basis matrix for realizing primitive permutation between columns.

First, picking up only the aforementioned predetermined value portion in the first state yields the representation (a, b).

Next, as a first step, if the basis matrix $F_l(-1)$ is applied to the matrix M from the right side, (a, -b) is obtained.

As a second step, if the basis matrix $F_{kl}$ is applied to the matrix M from the right, (a, a-b) is obtained.

As a third step, if the basis matrix $F_l(-1)$ is applied to the matrix M from the right, (a, b-a) is obtained.

As a fourth step, if the basis matrix $F_{lk}$ is applied to the matrix M from the right, (b, b-a) is obtained.

As a fifth step, if the basis matrix $F_{lk}(-1)$ is applied to the matrix M from the right, (b, a-b) is obtained.

As a sixth step, if the basis matrix $F_{kl}$ is applied to the matrix M from the right, (b, a) is obtained, and accordingly, primitive permutation between columns has been performed.

Accordingly, the primitive permutation $P_{kl}$ corresponding to an exchange between columns is represented such as shown in the following Expression 39 using a basic matrix product.

$$P_{kl}{}^c = F_l(-1)F_{kl}F_l(-1)F_{lk}F_l(-1)F_{kl} \qquad \text{[Expression 39]}$$

Note that a suffix "c" appended on the right shoulder of this primitive permutation $P_{kl}$ represents permutation regarding columns.

If this primitive permutation $P_{kl}$ is represented as a specific matrix, this is represented such as shown in the following Expression 40.

$$P_{kl} = \begin{pmatrix} 1 & 0 & & & & & & & 0 \\ 0 & \ddots & & & & & & & \\ & & 1 & & & & & & \\ & & & 0 & \cdots & 1 & & & \\ & & & & 1 & & & & \\ \vdots & & \vdots & & \ddots & & \vdots & & \vdots \\ & & & & & & 1 & & \\ & & & 1 & \cdots & 0 & & & \\ & & & & & & & 1 & \\ & & & & & & & \ddots & 0 \\ 0 & & \cdots & & & & & 0 & 1 \end{pmatrix} \qquad \text{[Expression 40]}$$

Here, of diagonal components, components having a value other than 1 include a component (k, k) and component (l, l), which have a value of zero respectively, but of non-diagonal components, components having a value other than zero include a component (k, l) and component (l, k), which have a value of 1 respectively.

By multiplying the primitive permutation $P_{kl}$ to the matrix M by from the right as shown in Expression 41 causes exchange between the k-th column and l-th column.

$$M \rightarrow M \cdot P_{kl}{}^c \qquad \text{[Expression 41]}$$

Similarly, the primitive permutation $P_{kl}$ corresponding to an exchange between rows is represented as shown in the following Expression 42 using a product of basic matrices.

$$P_{kl}{}^r = F_{lk}F_l(-1)F_{kl}F_l(-1)F_{lk}F_l(-1) \qquad \text{[Expression 42]}$$

Note that a suffix "r" appended on the right shoulder of this primitive permutation $P_{kl}$ represents permutation regarding rows.

By multiplying the primitive permutation $P_{kl}$ to the matrix M by from the left as shown in Expression 43 causes exchange between the k-th row and l-th row.

$$M \rightarrow P_{kl}{}^r \cdot M \qquad \text{[Expression 43]}$$

Since primitive permutation corresponding to an exchange between columns is represented by an arithmetic operation for multiplying the matrix M from the right, whereas primitive permutation corresponding to an exchange between rows is represented by an arithmetic operation for multiplying the matrix M from the left, these operations are commutative. Accordingly, either of a series of exchanges related to columns to be performed by combining primitive permutation or a series of exchanges related to rows to be performed by combining primitive permutation may be performed first.

Thus, although in the JEX coding in FIG. 5 the permutation of columns is performed first, followed by the permutation of rows, this order may be reversed.

On the other hand, in the aforementioned Step S24, in the event that determination has been made that the aforementioned conditions cannot be satisfied, 0 indicating that permutation regarding columns has not been performed is substituted for data Pc (Step S27).

Upon completing the process in the aforementioned Step S26 or Step S27, next, it is determined whether or not permutation of row data in an 8×8 pixel block needs to be performed. Specifically, determination is made whether or not the following Expression 44

$$sr(nr(0)) - sr(nr(7)) \geq Thr \times 8 \qquad \text{[Expression 44]}$$

using the threshold value Thr is satisfied, and also the following Expression 45 using a threshold value Nr (this threshold value Nr is normally set to the same value as the threshold value Nc related to columns)

$$Chr \geq Nr \qquad \text{[Expression 45]}$$

is satisfied (Step S28).

As described in the aforementioned Step S24 and this Step S28, four parameters calculated in correspondence with columns and rows, i.e., sc(nc(0))-sc(nc(7)), Chc, sr(nr(0))-sr(nr(7)), and Chr are compared with corresponding threshold values, so we can say that permutation is controlled depending on picture for each pixel block in an adaptive manner.

Note that, instead of deciding whether or not to perform permutation based on these four parameters and each corresponding threshold values, the decision may be made according to the following method instead: first, codes are obtained by actually subjecting a pixel block to permutation, DCT, quantization, and the Huffman coding. Further, codes are obtained by actually subjecting the pixel block to DCT, quantization, and the Huffman coding alone without permutation. Subsequently, the amounts of both obtained codes including the header informations are compared, and only in the event that the former is smaller than the latter, the results obtained with permutation are employed. In this method, 2-times encoding process is performed for each pixel block, so processing time becomes longer, but more reliable data compression effects can be obtained. Accordingly, with respect to the compression level setting to the encoding control unit 2, an arrangement may be conceived to make such measures selectable.

In Step S28, in the event that determination has been made that conditions are satisfied, 1 indicating that permutation regarding rows has been performed is substituted for data Pr (Step S29). This data Pr is also data to be recorded later in the header of an image file as the header information as well as the aforementioned data Pc.

Subsequently, row-wise permutation of the f(k, l) is actually performed such that data array of an 8×8 pixel block becomes f(k,nr(0)), f(k,nr(1)), ..., f(k,nr(7))

(Step S30).

On the other hand, in Step S28, in the event that determination has been made that the aforementioned conditions are not satisfied, 0 indicating that permutation regarding columns has not been performed is substituted for the data Pr (Step S31).

Upon the processing in Step S30 or Step S31 being completed, next, a header information Ph(n) to be written into the header of the image file is created (Step S32).

Figure 23:
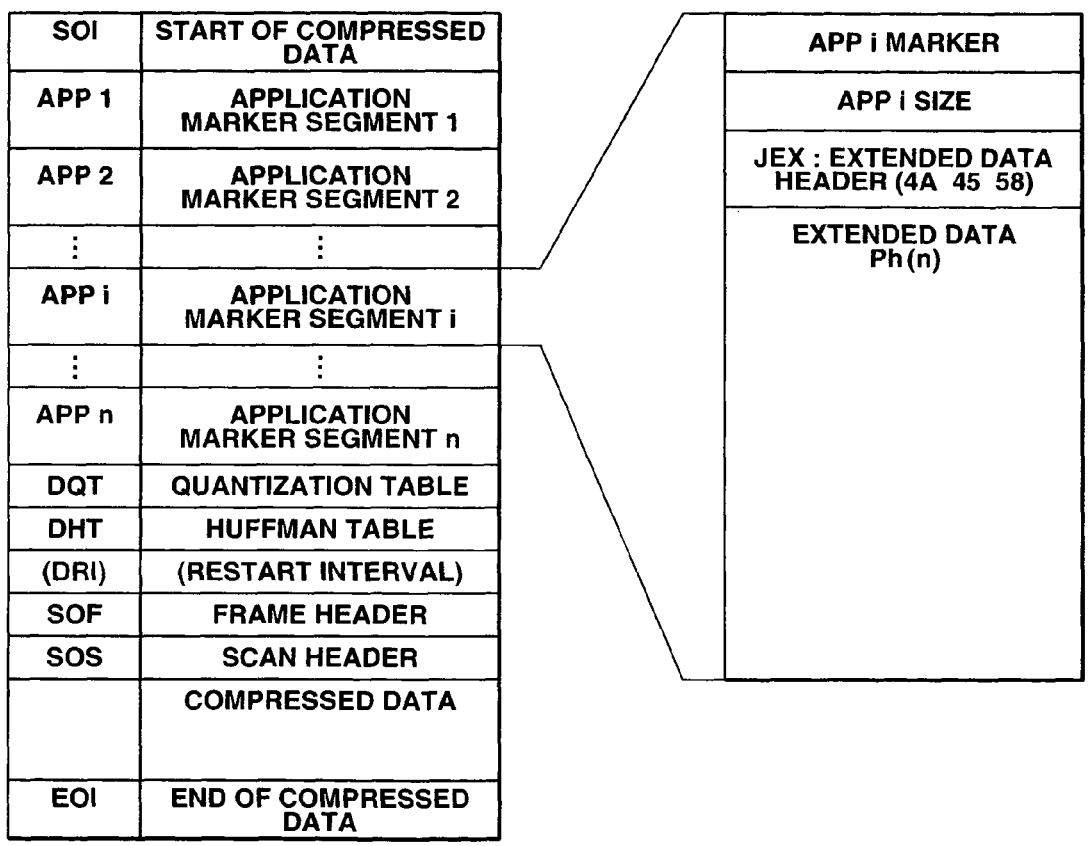
FIG. 23 is a diagram illustrating the basic configuration of an EXIF file storing JPEG compression data with the first embodiment of the present invention.

FIG. 23 is a diagram illustrating the basic configuration of an EXIF file storing JPEG compressed data.

This EXIF file basically comprises a marker SOI indicating a compressed data start position, application marker segments APP1 through APPn in which one or a plurality of information can be described, quantization table data of which description starts from a quantization table definition marker DQT, Huffman table data of which description starts from a Huffman table definition DHT, the definition of a restart marker insertion interval of which description starts from a restart interval DRI, a frame header of which description starts from a frame segment start marker SOF, a scan header of which description starts from a scan marker SOS, compressed data to be described following this scan header, and a marker EOI indicating a compressed data end position.

The application marker segments APP1 through APPn each of which size is stipulated so as to be 64 K bytes or less (K represents 1024), but the number of the segments is not restricted. For example, it can be conceived that information for Exif is described in the application marker segment APP1, information for Flashpix is described in the application marker segment APP2, and information for JEX is described from the application marker segment APP3.

The right side of FIG. 23 illustrates an example of the data configuration of the application marker segment APPi in which information for JEX is described.

As illustrated in the drawing, an APPi marker indicating that this is the i-th application marker segment is described at the top within a segment, following which the byte length of this application marker segment APPi, which is a variable length in increments of byte, is described. Subsequently, as a data header for the extended JPEG (JEX), binary values "4A 45 58" for example, are described, following which the aforementioned header information Ph(n) is described.

Now, the number of header information Ph(n) will be that of blocks obtained by dividing the image, but, as mentioned above, the segment size must be 64 K bytes or less including the description portion such as markers etc. Accordingly, in the event that the size of the JEX header information Ph(n) according to all of the blocks is greater than 64 K bytes, the header information Ph(n) is described straddling consecutive multiple application marker segments. That is to say, recording to the application marker segment APP3 sequentially starts from the header information Ph(1) according to the first pixel block, and at the point that the amount of recording reaches the upper limit of the application marker segment APP3, recording of the subsequent header information Ph is performed in the next application marker segment APP4. Note that each application marker segment size needs to be in increments of byte, but the header information Ph(n) is recorded in increments of bit in a packed manner, so the last data within a segment cannot be accommodated in increments of byte in some cases. In this case, a bit value 0 is padded as a filler so that the segment ends in increments of byte-size.

Note that with the above description, the JEX header information has been described in the application marker segment of the EXIF file, but a portion within the header where the JEX header information can be described is not restricted to this. For example, with a JPEG compressed data file, a comment can be described in the header thereof, and the amount of data is 64 K bytes. Accordingly, an arrangement may be made wherein the JEX header information is recorded using this comment header portion.

FIG. 24 is a diagram illustrating the basic configuration of a JPEG compressed data file in more detail.

As partially described with reference to FIG. 23, a JPEG compressed data file basically comprises a marker SOI indicating a compressed data start position (binary values shown in hexadecimal are "FF D8"), quantization table data of which description starts from a quantization table definition marker DQT (similarly, "FF DB"), Huffman table data of which description starts from a Huffman table definition DHT ("FF C4"), the definition of a restart marker insertion interval of which description starts from a restart interval DRI ("FF DD"), the number of vertical lines, the number of horizontal pixels, and quantization table specification, which indicate various types of parameter relating to a frame, of which description starts from a frame segment start marker SOF ("FF C0"), a scan header including various types of parameter relating to scan, of which description starts from a scan marker SOS ("FF DA"), data such as comments and so forth of which description starts from a comment marker COM ("FF FE"), compressed data of which description starts from a restart marker RST ("FF D0"), and a marker EOI ("FF D9") indicating a compressed data end position.

In the comment portion of these, following the comment marker COM ("FF FE"), a comment size in a range between 2 and 65535 bytes is described (i.e., this means a variable-length segment in increments of byte), following which a comment is described. Binary values "4A 45 58" for example are described in this comment portion as the extended JPEG (JEX) data header, following which the aforementioned header information Ph(n) is described.

FIG. 25 is a chart illustrating the configuration of the header information Ph(n) and a specific data example.

The JEX header information Ph(n) according to one pixel block basically comprises an indicator Ind indicating data start position, the aforementioned data Pc indicating whether or not permutation related to columns has been performed, the aforementioned Pr indicating whether or not permutation related to rows has been performed, permutations nc(0) through nc(6) related to columns, and permutations nr(0) through nc(6) related to rows.

Here, the indicator puts a 1 as bit value so as to distinguish the data start positions in increments of block from the filler described above. In other words, when the indicator Ind is not provided, in the event that two bits immediately following the header information Ph of a certain pixel block are "00", these bits cannot be distinguished whether these bits are fillers, or represent a pixel block of Pc=0 and also Pr=0. Therefore, a bit value 1 is always put at the top of the header information Ph(n) for each pixel block as the indicator Ind.

As illustrated in FIG. 5, the data Pc and Pr are described with 1 as a bit value in the event that permutation has been performed, and are described with 0 as a bit value in the event that permutation has not been performed. When Pc is 0, nc(0) through nc(6) are not described, on the other hand, when Pr is 0, nr(0) through nr(6) are not described.

Also, the amount of data of the nc(i) and nr(j) is each three bits in the case of using an 8×8 pixel block, so the necessary amount of data is 21 bits for nc(0) through nc(6), and also 21 bits for nr(0) through nr(6). The reason why nc(7) and nr(7) are not described in the header is that the permutation nc(0) through nc(7), and the permutation nr(0) through nr(7) are permutations of numbers 0 through 7, so nc(7) can be known by obtaining information of nc(0) through nc(6), and similarly, nr(7) can be known by obtaining information of nr(0) through nr(6). Accordingly, in the decoding process described later, calculations of nc(7) and nr(7) are performed.

In the example illustrated in FIG. 25, Pc is 1 and Pr is 0, so only nc(0) through nc(6) are described, whereas nr(0) through nr(6) are not described. Each column data in the example shown in FIG. 11 is described there.

Due to the aforementioned reason, the necessary amount of data of the header for one pixel block is any one of 3 bits, 24 bits, and 45 bits. Accordingly, for a VGA image made up of 640×480 pixels, the number of blocks is (640/8)×(480/8)=80×60=4800, so the maximum necessary amount of data is 27000 bytes (i.e., in the case that for all of the blocks, Pc=Pr=1 holds), i.e., around 26K bytes (here, calculation was done with K equal to 1024). In this case, since the amount of data can be accommodated within 64 K bytes serving as one segment size, the header information may be described in an application marker segment, or may be described in a comment segment. However, this is for the case of a monochrome image.

In the event of a color image, any one of several methods may be employed as a method for describing the header information.

First, a conceivable method is wherein pixel blocks are individually analyzed for each color of Y, Cb, and Cr, or each color of R, G, and B (specifically, for example, a process step wherein the sums of pixel values for each column or for each row is compared, a permutation sequence is obtained, and determination is made whether or not it is appropriate to perform permutation), and permutations are determined based on each analyzed result. Then, header information corresponding to permutation for each color is respectively generated, and is described in the header. In this case, since an optimum JEX is performed for each color, the amount of codes of image portion can be very much reduced. However, with regard to the header information, the amount of data needs to be triple that of a monochrome image. In this case, even a VGA image would require a data amount of 79K bytes, so this cannot be accommodated within one segment, and accordingly, multiple application marker segments must be used. Note that since it is not prohibited to provide multiple comment segments, the JEX header information may be described in multiple comment segments.

Also, another method is wherein permutation is determined based on analyzed results of the 8×8 pixel block of a color component having a large role in image quality, Y or G component, for example, and this permutation is applied to all of the pixel blocks of Y, Cb, and Cr, or the pixel blocks of G, R, and B. In this case, the necessary data amount of the header information is the same as for the case of a monochrome image, and the header information can be described within one segment for a VGA image. Generally, the sensitivity of human eye to luminance signal Y is higher than the sensitivity to color-difference signals Cb and Cr. Accordingly, an original image can be reproduced faithfully by performing JEX so as to give greater importance to reproducing the luminance signal while reducing the amount of information of the header information. This method, in particular, can have notable effects for a less colorful image.

For an image having a still greater number of pixels, the data amount will increase in accordance with the number of pixel blocks, so that description of information is performed using multiple segments as necessary.

Note that in the above description, for example, 21-bit data of nc(0) through nc(6) has been described when the data Pc is 1, but the amount of data may be further reduced. Since nc(0) through nc(7) represent any one of a permutation made up of a number 0 through 7, there are 8! ways that can be taken as a permutation. Since $$8! = (2^7) \times 315 < (2^7) \times 512 = (2^7) \times (2^9) = (2^{16})$$

holds, so that a description can be done as long as 16 bits of data amount is available. In this case, for example, a table having 8!=4032 elements, in which serial numbers 0 through 40319, and a permutation "01234567" through "76543210" corresponding to each serial number are described, is prepared beforehand. Subsequently, the serial number of the table is recorded in the header, and the original permutation data should be acquired using the same table at the time of decoding.

In this case, since the necessary amount of data of the header as to one pixel block is 3 bits, 19 bits, and 35 bits, the amount of header information can be reduced by 5 bits for a block of which one of Pc and Pr is 1, and the other is 0, and further, the amount of the header information can be reduced by 10 bits for a block for which Pc=Pr=1 is satisfied. In this case, the maximum amount of header information becomes 21000 bytes as to a VGA monochrome image, i.e., around 21K bytes.

For a further reduction of the amount of header information, we can think of compressing the header information Ph(n) not including the JEX extended header using an appropriate compression method. In this way, the size of an image file can be reduced, and also the header information according to image data having higher resolution can be accommodated in one segment (comment segment, for example). The aforementioned permutation algorithm changes depending on picture, so the calculated permutation has statistic peculiarities. In such a case, employing variable-length coding such as entropy coding or the like as a compression method enables compression to be performed more effectively.

Now the pixel data f(k,l) subjected to permutation, and the header information Ph(n) created in Step S32 are output (Step S33), and then the flow returns to the processing shown in FIG. 3 from this JEX coding.

Note that the process shown in FIG. 5 is performed on all pixel blocks, so in reality, the processes described above are performed by a loop process while changing n.

Figure 6:
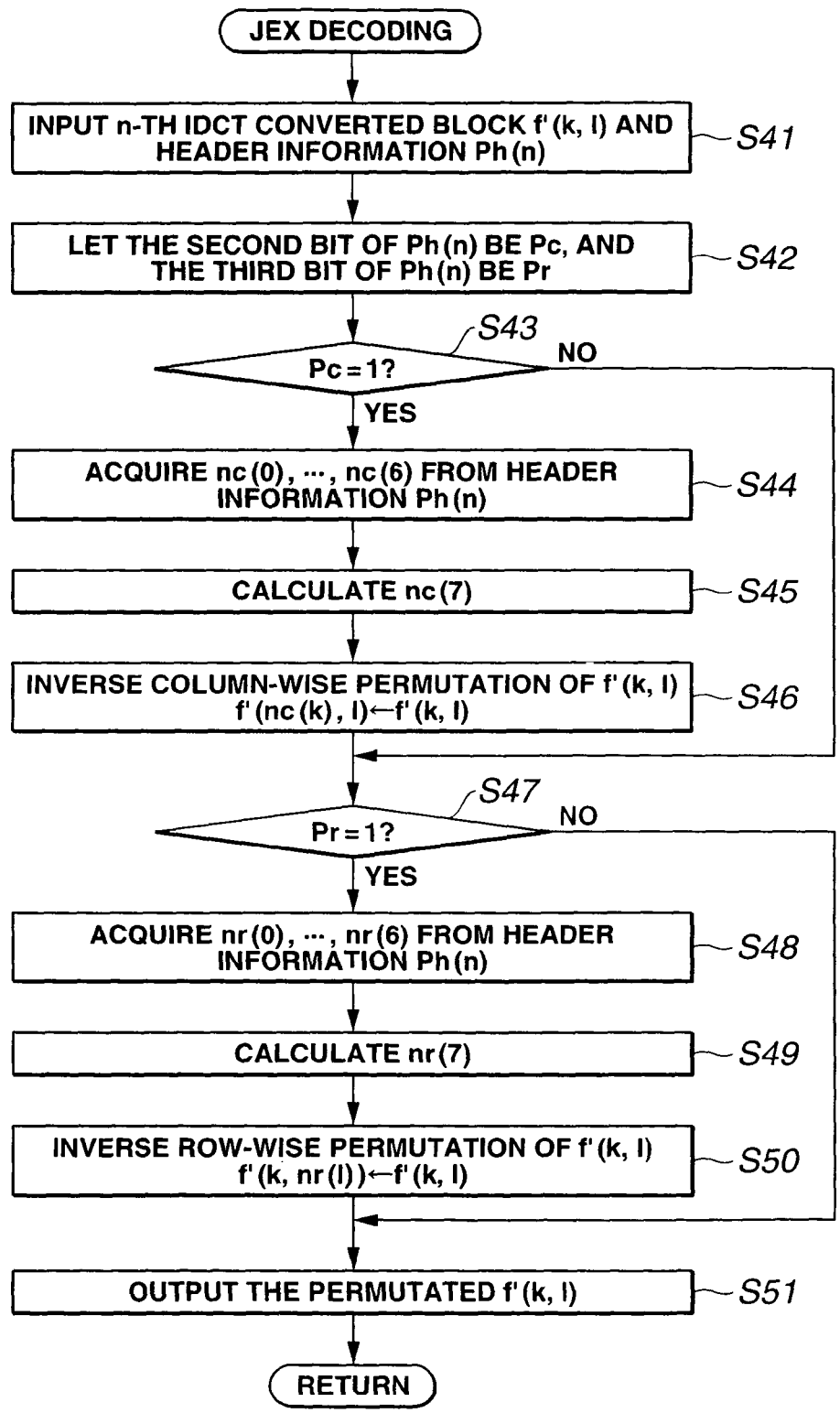
FIG. 6 is a flowchart illustrating JEX decoding process according to the first embodiment of the present invention.

Next, FIG. 6 is a flowchart illustrating the JEX decoding. FIG. 6 illustrates the details of the process to be performed in Step S16 in FIG. 4.

Upon this processing being started, the n-th inverse DCT (IDCT) transformation block f'(k,l) and the header information Ph(n) related to the n-th block are input (Step S41). Here, the reason why the block data following inverse DCT transformation is not set to f but set to f' is that when inverse quantization is performed using the inverse quantization unit 26 illustrated in FIG. 2, quantization errors occur, resulting in values different from the original block data f.

Next, the second bit of the header information Ph(n) is substituted as the value of the data Pc, and also the third bit is substituted as the value of the data Pr (Step S42).

Subsequently, it is determined whether or not the value of the data Pc is 1 (Step S43).

If Pc is 1, each data of nc(0) through nc(6) is obtained from the header information Ph(n) (Step S44), and nc(7) is calculated based on these (Step S45).

Subsequently, the columns of f'(k,l) are subjected to inverse permutation such as $$f'(nc(k),l) \leftarrow f'(k,l)$$

using these nc(0) through nc(7) (Step S46).

Upon completing this processing in Step S46, or in the event that Pc=0 in Step S43, next, it is judged whether or not the value of Pr is 1 (Step S47).

In the event that the value of the data Pr is 1, each data of the nr(0) through nr(6) is obtained from the header information Ph(n) (Step S48), and nr(7) is calculated based on these (Step S49).

Subsequently, the rows of the f'(k, l) are subjected to inverse permutation such as $$f'(k,nr(l)) \leftarrow f'(k,l)$$

using these nr(0) through nr(7) (Step S50).

Thus, the pixel data f'(k,l) subjected to permutation is output (Step S51), and then the flow returns to the processing shown in FIG. 4 from this JEX decoding process.

Note that the process shown in FIG. 6 is performed to all pixel blocks as with the processing shown in FIG. 5, so the processes described above are performed by a loop process while changing n in reality.

Also, an extended JPEG file generated by the JEX coding in FIG. 3 can be reproduced even with the conventional JPEG decoding process on such a level where an overview of the image can be grasped.

That is to say, the normal JPEG decoding process is equal to the decoding process in FIG. 4 of which the process in Step S15 and the process in Step S16 are omitted. Accordingly, permutation in the JEX decoding is not performed, so with regard to an image, the details within an 8×8 pixel block will not be always correctly reproduced, but the appearance of the image can be grasped as the entire image in increments of pixel block. In particular, permutation of pixels such as described above does not change the mean value of image data within a pixel block, so the overview of the entire image cannot be affected regardless of whether or not the JEX processing is performed.

Next, description will be made regarding situations wherein specific data is transformed by the processing described above with reference to FIG. 15 through FIG. 22.

FIG. 15 is a chart illustrating a data example of an original 8×8 pixel block extracted from image data.

This image data is an 8-bit gradation monochrome image, and takes a pixel value between 0 and 255.

FIG. 16 illustrates a situation wherein the sum in the row direction and the sum in the column direction of the 8×8 pixel block data have been calculated.

In Step S22 in FIG. 5, the sum data sc(i) of pixel values in the i-th column and the sum data sr(j) of pixel values in the j-th row are calculated.

Here, the maximum value of sc(i) is 1480, the minimum value of sc(i) is 807, and accordingly, the left side of the first decision expression in Step S24 becomes 673. On the other hand, the right side of the decision expression becomes 256 by multiplying $2^5$ of the Thc by 8. Consequently, it can be understood that the first decision expression is satisfied.

On the other hand, the maximum value of sr(j) is 1248, the minimum value of sr(j) is 1107, and accordingly, the left side of the first decision expression in Step S28 becomes 141. On the other hand, the right side of the decision expression is the same 256 as the right side of the first decision expression in Step S24. Consequently, the first decision expression in this Step S28 is not satisfied, determination is not necessary regarding the second decision expression, and the flow proceeds to Step S31, wherein Pr=0 is set.

On the other hand, the first decision expression is satisfied in Step S24, so the second decision expression must be determined as well. Here, the decision with regard to Expression 15 is done for the case where the weight is set to 1, and the threshold value Nc is set to the aforementioned typical value 4. With the block data examples shown in FIG. 15 and FIG. 16, the nc(i) to be calculated in Step S23 becomes such as shown in FIG. 11, and the Chc becomes 14 as described above. Accordingly, the second decision expression is also satisfied. The flow proceeds to Step S25, wherein Pc=1 is set.

The pixel block data becomes such as shown in FIG. 17 by performing the subsequent processing in Step S26. FIG. 17 is a chart illustrating pixel block data subjected to permutation. The nc(i) indicating column-wise permutation and inverse permutation sequence for restoring permutation to the original permutation are shown in the lower side of the pixel data subjected to permutation, and also the nr(j) indicating row-wise permutation and inverse permutation sequence for restoring permutation to the original permutation are shown in the right side of the pixel data subjected to permutation. However, as described above, since Pr=0, and row-wise permutation is not performed, so nr(j) is the same as the inverse thereof.

Note that as can be understood from the substitution expression in Step S26, the array of the nc(i) is interpreted as follows. The 0th column of the pixel block in FIG. 17 includes "4" as the nc(0). Accordingly, the 4th column of the original data shown in FIG. 15 enters in the 0th column after permutation. Similarly, the 1st column of the pixel block in FIG. 17 includes "2" as the nc(1). Accordingly, the 2nd column of the original data shown in FIG. 15 enters in the 1st column after permutation. The same applies to the others.

Subsequently, the data processed in Step S3 in FIG. 3 becomes such as shown in FIG. 18. FIG. 18 is a chart illustrating data subjected to level shift and DCT.

The results obtained by quantizing the data shown in FIG. 18 in Step S4 in FIG. 3 using a predetermined quantization table becomes such as shown in FIG. 19. FIG. 19 is a chart illustrating quantized 8×8 block.

Thus, most of high-frequency components are 0, whereby the subsequent entropy coding can be expected to compress the data with high-efficiency.

On the other hand, FIG. 20 illustrates data obtained by subjecting the quantized data in FIG. 19 to inverse quantization and inverse DCT (IDCT) in the decoding process shown in FIG. 4, performing level shift on the data, and a rounding-off into a range between 0 and 255.

FIG. 21 is a chart illustrating pixel block obtained by subjecting the data shown in FIG. 20 to inverse permutation.

Thereby, permutation with the inverse nc(i) shown in FIG. 17 is performed by processes, wherein the 4th column data in FIG. 20 becomes the 0th column data in FIG. 21, the 2nd column data in FIG. 20 becomes the 1st column data in FIG. 21, and the like.

FIG. 22 is a chart illustrating results obtained by subtracting the original pixel block data shown in FIG. 15 from the decoded pixel block data in FIG. 21.

FIG. 22 illustrates errors between the decoded pixel block data in FIG. 21 and the original pixel block data in FIG. 15. The total sum of absolute values of the errors for each pixel yields "756", and the square mean value of the errors is calculated to be "125".

On the other hand, for a normal JPEG file which is not subjected to the JEX coding, the processed results such as shown in FIG. 30 through FIG. 33 can be obtained. FIG. 30 is a chart illustrating the results of subjecting the original 8×8 pixel block data shown in FIG. 15 to DCT, FIG. 31 is a chart illustrating the results of quantizing the block data in FIG. 30, FIG. 32 is a chart illustrating the results obtained by subjecting the block data in FIG. 31 to inverse quantization and inverse DCT, level shift, and a rounding-off of the data into a range between 0 to 255, and FIG. 33 is a chart illustrating the results obtained by subtracting the original pixel block data shown in FIG. 15 from the decoded pixel block data in FIG. 32.

As described above, within the original image data shown in FIG. 15, only the columns are rearranged, but the rows are not. In such a case, the results after permutation and DCT as shown in FIG. 18, when compared with the conventional results subjected to DCT alone as shown in FIG. 30, the following can be said about DCT coefficients.

(1) $D^{00}$ is unchanged.

(2) (The absolute value of) $D^{10}$ increases.

(3) The absolute value of $D^{1v}$ increases for almost all vs.

$D^{00}$ is the so-called DC component, which is an amount proportional to the mean of pixel values within a pixel block. It is needless to say that $D^{00}$ remain unchanged even if permutation, which does not change the mean of pixel values, is performed.

Next, as shown in Expression 7, $D^{10}$ may be viewed as an inner product between the vector V (Expression 8) made up from a discrete function of k monotonously decreasing with increasing k, and the vector W (Expression 9) the components of which are the sums of pixel data in columns. Accordingly, it is clear that the inner product of these vectors V and W increases by performing permutation between columns in descending order of the sum of pixel data within a column.

Further, with regard to $D^{1v}$, although a simple conclusion cannot be drawn like the case of the $D^{10}$, in general, as the pixel values within each column increase, they will also increase, and accordingly, we can say that the possibility of increase improves by performing permutation between columns in descending order of the sum of pixel data within a column.

DCT is an orthogonal transform, so that inner products remain constant after transformation. Thus, the sum of squares of DCT coefficients is equal to the sum of squares of the pixel values of the original pixel block. Permutation does not change the sum of squares of the pixel values of a pixel block, and consequently, the sum of squares of the DCT coefficients of a permuted pixel block is equal to the sum of squares of the original DCT coefficients. Accordingly, when DCT coefficients concentrate in the low frequency region (0, 0), (0, 1), and (0, v), high-frequency coefficients will inevitably decrease.

In JPEG compression, after quantizing the DCT coefficients as described above, zigzag scan is performed, and the Huffman coding is performed based on run-length, which is the number of consecutive DCT coefficients of 0, and the values of the DCT coefficients following this run-length. Generally, in the event that there are a large number of high-frequency non-zero coefficients, much more long-bit-length codes (the longest code is 16 (run-length)+10 (AC coefficient)=26 bits) are created, and consequently, the amount of codes increases. Accordingly, decreasing high-frequency components of DCT is advantageous for reducing the amount of codes.

In FIG. 33, the sum of absolute values of errors in each pixel is "900", and the square mean value of the errors is "152".

Thus we see that the extended JPEG in FIG. 22 has less error, so that image quality has improved.

Also, the original 8×8 pixel block data shown in FIG. 15 becomes 432 bits long when encoding normal JPEG, whereas it becomes 368 bits when encoding with the extended JPEG. For the data example in FIG. 15, as described above, 24-bit header information is added to the header portion, but still, it was able to reduce 40 bits of data (i.e., almost 10% of the amount of encoded data in this case).

Further, even if data encoded with the extended JPEG is decoded using the normal JPEG, errors do not occur. Although it is not possible to obtain as excellent an image as when decoded with the extended JPEG, the overall picture in increments of blocks can still be grasped. For example, an image captured by an image capturing device of 5 million pixels has a resolution of 2500×2000 or so, and dividing this image into blocks creates around 313×250 blocks. Accordingly, even when decoded with the conventional JPEG, an image with sufficient overview can be obtained.

Figure 26:
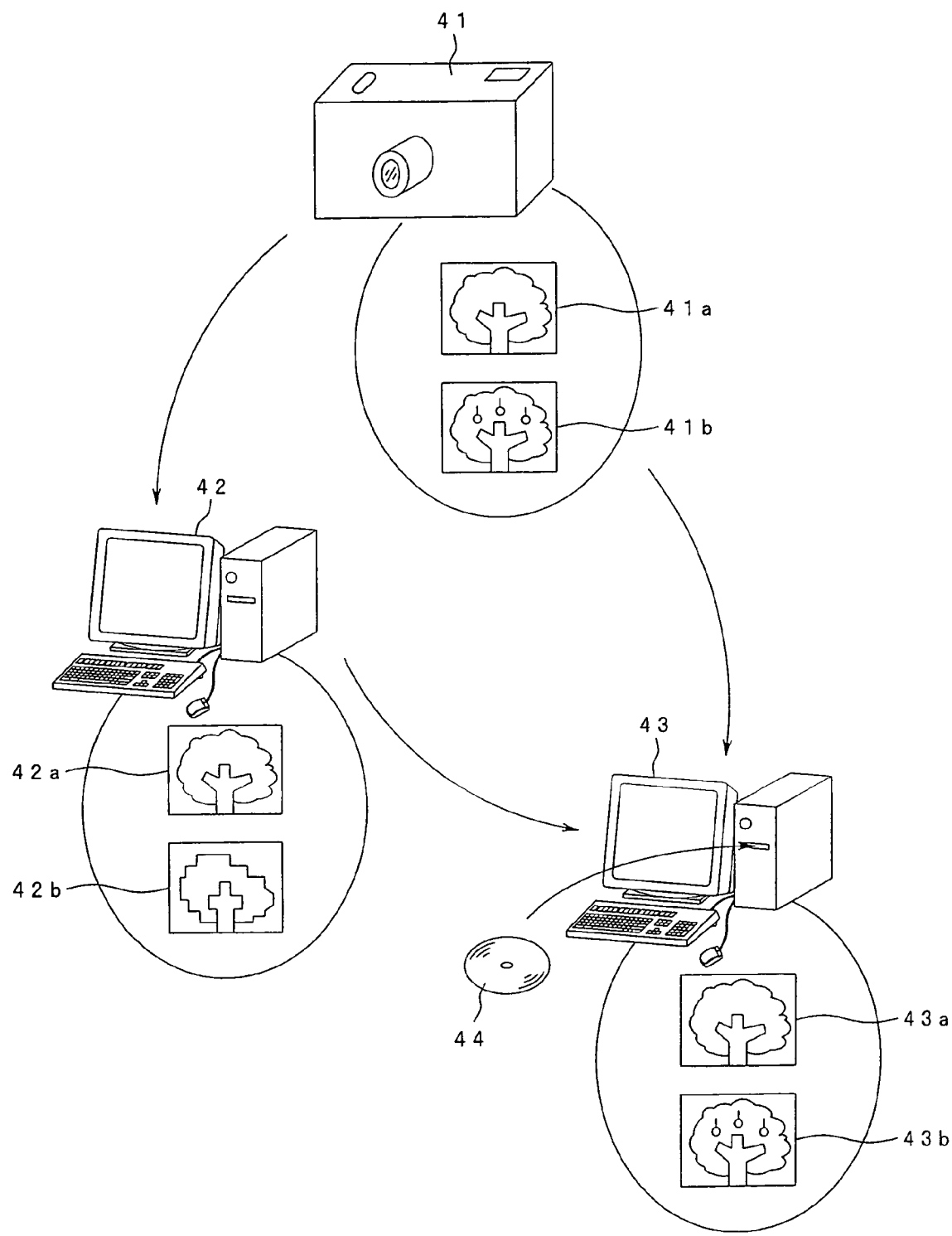
FIG. 26 is a diagram illustrating a system configuration wherein an apparatus capable of processing the extended JPEG and an apparatus capable of processing the conventional JPEG are combined with the first embodiment of the present invention.

FIG. 26 is a diagram illustrating a system configuration wherein an apparatus capable of processing the extended JPEG is combined with an apparatus capable of processing the conventional JPEG alone.

With the configuration example illustrated in this FIG. 26, a system combining a digital camera 41 capable of generating a JPEG image file 41a encoded with JPEG and a JEX image file 41b encoded with JEX, a personal computer (PC) 42 able to decode with JPEG only, and a PC 43 capable of both decoding using JPEG and decoding using JEX by installing a software 44 capable of decoding using JEX, is illustrated.

Let the digital camera 41 be configured such that both of the JPEG compression method and the JEX compression method or the requested one of them may be performed. According to this digital camera 41, an image obtained by capturing a subject and compressed using the JPEG method becomes the JPEG image file 41a, and an image obtained by capturing the same subject and compressed using the JEX method becomes JEX image file 41b. As described above, the error of an image according to the JEX image file 41b with respect to a RAW image output from the image capturing device of the digital camera 41 is smaller than that of an image according to the JPEG image file 41a, so that the JEX image is a high-quality image with precise reproduction of more details.

Suppose that the JPEG image file 41a and JEX image file 41b are transferred from the digital camera 41 to the PC 42 via a wireless LAN, USB cable, memory card, or the like. The PC 42 can perform the JPEG decoding, so can obtain a display image 42a subjected to decoding the JPEG image file 41a. On the other hand, with regard to the JEX image file 41b, decoding with the JPEG decoding instead with the JEX decoding can still be performed without an error occurring, which however results in a displayed image 42b wherein permutation within a pixel block is not restored to the original sequence, so this image becomes a state in which picture within a block is deformed and so-called block noise occurs.

However, the picture of the entire image is never deformed, and accordingly, the overview of the image can be grasped. In particular, a high-definition image having a great number of pixels increases the number of blocks to be generated, and accordingly, it is possible to grasp the situation of the entire image more easily.

Next, assume that the JPEG image file 41*a* and JEX image file 41*b* are transferred from the digital camera 41 to the PC 43. This PC 43 can perform decoding using JEX by installing the software 44 to be supplied via CD-ROM, DVD, or a communication line, for example. Accordingly, the JPEG image file 41*a* can be decoded as the normal display image 43*a*, and also the JEX image file 41*b* is reproduced as the display image 43*b* having higher image quality than this JPEG image file 41*a*.

Also, even with regard to the display image 42*b* displayed in such a state that block noise occurs in the PC 42, by transferring the JEX image file 41*b* corresponding to the display image 42*b* to the PC 43, a high quality display image 43*b* can be decoded.

Thus, while improving image quality, reducing the amount of data, and moreover, an image file subjected to encoding using the extended JPEG can be reproduced in a certain level of image quality even with the conventional JPEG decoding processing, thereby providing an excellent image compression method.

Note that with the above description, a digital camera is shown as an example of a device for generating extended JPEG files, but it is not restricted to this, of course. As an example for a device for generating extended JPEG files, an image capturing apparatus may be mentioned. The image capturing apparatus includes a device or system for acquiring image data by capturing an optical subject image using an electronic image capturing device or the like. Examples of the image capturing apparatus include, for example, electronic still cameras, video cameras, cellular phones with a camera, camera-mounted-type PCs, medical instruments such as endoscopes (gastro cameras, for example) and the like, indoor/outdoor surveillance cameras and monitor systems for obtaining image data by subjecting signals obtained from these cameras to signal processing in another place, scanners for capturing printed images and so forth electronically, film scanners for capturing film images electronically, and so forth. Also, as for devices other than the image capturing apparatus for generating extended JPEG files, computers such as PCs and so forth can be shown as an example. That is, in this case, images to be processed with the extended JPEG processing are not restricted to natural images obtained by photographing, but rather widely include computer graphics generated in a computer or the like, character data rendered to bitmap or the like, image data obtained by synthesizing or processing various types of image data, and so forth. Accordingly, devices capable of generating such image data widely become targets for a device for generating extended JPEG files.

Also, computers such as PCs or the like can become a device capable of performing the JEX processing in a software manner by installing and executing JEX coding/decoding software, but on the other hand, can become a device capable of performing the JEX processing in a hardware manner by mounting an expansion board or the like for performing the JEX coding/decoding.

Note that the term JEX includes a broad definition and a narrow definition. With the broad definition, the entire processing including both the JPEG processing, and processing not included in JPEG such as permutation of image data and the like, is referred to as JEX. That is to say, the broad JEX includes JPEG. On the other hand, the narrow JEX indicates difference between the broad JEX and conventional JPEG. In this case, only a portion corresponding to processing such as permutation of image data or the like is referred to as JEX.

These definitions relate to a providing method of software and hardware for performing the JEX coding/decoding processing.

Specifically, the JEX coding software or JEX decoding software corresponding to the broad definition can perform both JPEG image processing and JEX image processing by installing stand-alone software to a PC or the like.

On the other hand, the JEX coding software or JEX decoding software corresponding to the narrow definition can perform the JEX image processing in addition to the JPEG image processing by additionally installing the JEX coding software or JEX decoding software as peripheral software, or an add-on type module or the like to a PC or the like in which the conventional JPEG encoding software (basic encoding processing program) or JPEG decoding software (basic decoding processing program) has been already installed.

These can be selectively used and coexist as a providing method of software. For example, as to users having no JPEG coding/decoding software, by providing the JEX coding/decoding software corresponding to the broad definition to the users, the users can have an advantage wherein the users do not need to perform 2-times installation, and can process JPEG images and JEX images immediately. On the other hand, as to users having the JPEG coding/decoding software, by providing the JEX coding/decoding software corresponding to the narrow definition to the users, the users can have an advantage wherein the users can perform the JEX image processing by extending the existing software.

A problem with such a new standard is the difficulty to popularize. On the other hand, JEX proposed by the present applicant is upper-compatible including JPEG currently in widespread use, which is advantageous for popularizing JEX in that JEX has versatility.

Further, it can be conceived to realize widespread use in a short period by introducing a business method wherein the JEX coding software is provided with charge, but the JEX decoding software is distributed for free, for example.

Also, as for hardware, it can be conceived that JEX coding/decoding expansion boards corresponding to the broad definition are provided, or JEX coding/decoding expansion boards corresponding to the narrow definition are provided to users already having a JPEG coding/decoding expansion board (basic encoding/decoding device), for example.

Figure 34:
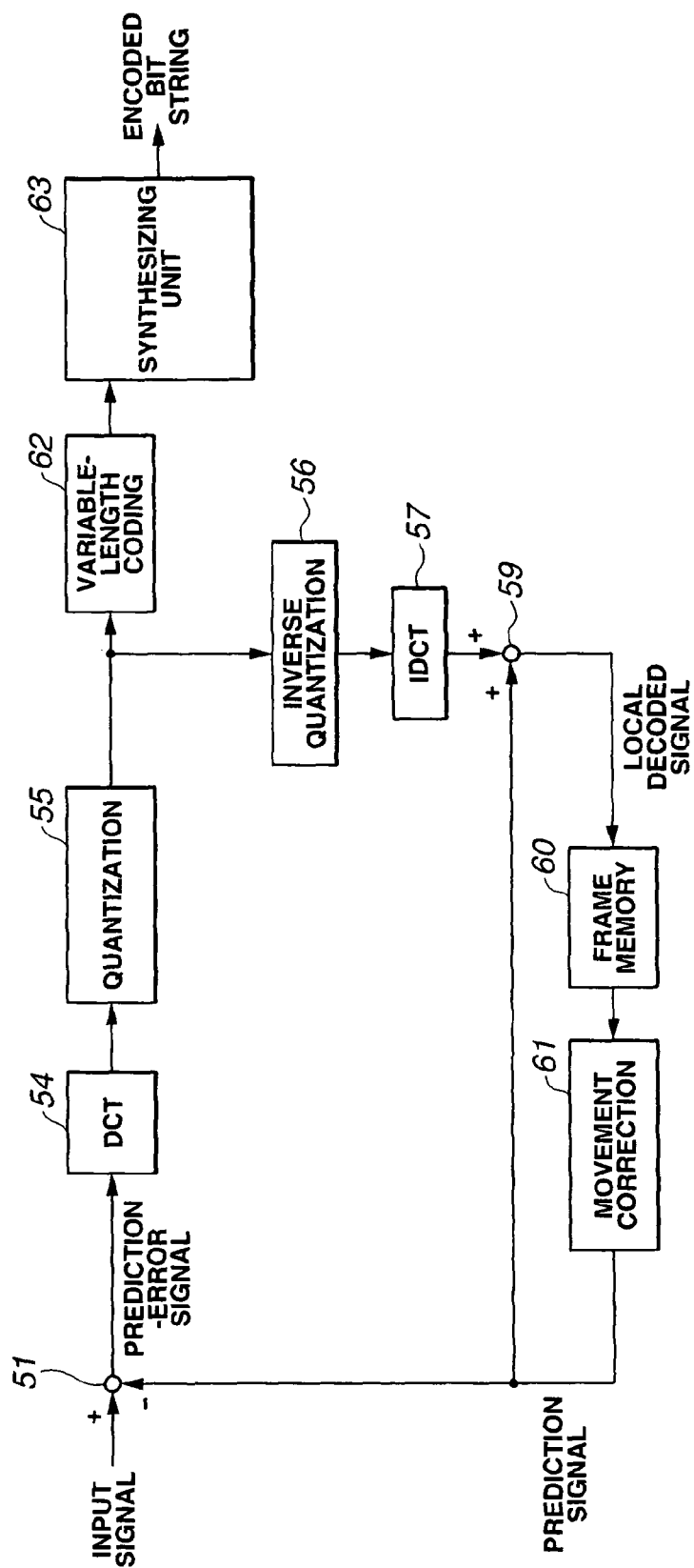
FIG. 34 is a block diagram illustrating the configuration of a conventional moving-image encoder.

FIG. 27 is a block diagram illustrating the configuration of an encoder which can apply JEX to moving-images, and FIG. 34 is a block diagram illustrating the configuration of a conventional moving-image encoder.

This encoder comprises a subtractor 51, JEX processing unit 52, header information memory 53, DCT unit 54, quantization unit 55, inverse quantization unit 56, IDCT unit 57, inverse JEX processing unit 58, adder 59, frame memory 60, movement correction unit 61, variable-length coding unit 62, and synthesizing unit 63.

Thus, the moving-image encoder which can apply JEX is an encoder obtained by adding the JEX processing unit 52, header information memory 53, and inverse JEX processing unit 58 to the conventional moving-image encoder illustrated in FIG. 34. Also, the synthesizing unit 63 illustrated in FIG. 34 is for adding information such as markers and so forth, but the synthesizer 63 illustrated in this FIG. 27 is for further adding the JEX header information.

The subtractor 51 is for subtracting a later-described prediction signal from an input signal, and outputting it as a prediction-error signal.

The JEX processing unit 52 is for performing permutation of columns and permutation of rows within a pixel block in the same way as was the case for the processing in JPEG.

The header information memory 53 is for storing the JEX header information generated by the JEX processing unit 53.

The DCT 54 is for subjecting a pixel block output from the JEX processing unit 52 to spatial frequency transformation using DCT.

The quantization unit 55 is for subjecting block data output from the DCT 54 to quantization.

The subsequent inverse quantization unit 56 through the movement correction unit 61 are processing units for generating a prediction signal based on block data subjected to quantization.

The inverse quantization unit 56 is for subjecting block data output from the quantization unit 55 to inverse quantization.

The IDCT 57 is for performing inverse spatial frequency transformation by subjecting block data output from the inverse quantization unit 56 to inverse DCT transformation.

The inverse JEX processing unit 58 is for reading out the JEX header information stored in the header information memory 53, and performing inverse permutation of columns and inverse permutation of rows within a pixel block output from the IDCT 57.

The adder 59 is for adding data output from the inverse JEX processing unit 58 and a prediction signal output from the movement correction unit 61, and outputting the result as a local decoded signal.

The frame memory 60 is for storing a local decoded signal output from the adder 59.

The movement correction unit 61 is for subjecting a local decoded signal stored in the frame memory 60 to movement correction. A prediction signal output from this movement correction unit 61 is output to the subtractor 51 and adder 59 respectively.

The variable-length coding unit 62 is for subjecting block data output from the quantization unit 55 to processing such as zigzag scan, Huffman coding, and the like.

The synthesizing unit 63 is for synthesizing information such as markers and the like, encoding data output from the variable-length coding unit 62, and JEX header information read out from the header information memory 53, and outputting the result as a encoded bit string.

Note that when decoding a moving-image, in almost the same way, inverse JEX processing should be performed using the JEX header information, so detailed description thereof will be omitted.

Now, for example, an MPEG file comprises an I-picture serving as an intra-frame encoding image (image data), a P-picture serving as an inter-frame forward-direction prediction encoding image (difference image data), and a B-picture serving as a bi-directional prediction encoding image (difference image data).

With such a moving-image configuration, various types of methods are available regarding how permutation such as described above is applied to which picture.

For example, a method can be conceived wherein the I-picture alone is compressed by encoding using permutation, and the other P-picture and B-picture are compressed by conventional encoding using no permutation. In this case, pre-processing parameters such as described in the case of JPEG need to be described in the header portion of the I-picture. Employing this method can reduce particularly the amount of codes of the I-picture.

Another method can be conceived wherein the I-picture is compressed by encoding using permutation obtained by analyzing the I-picture, and the other P-picture and B-picture are subjected to pre-processing using the same permutation as that applied to the pixel block corresponding to the I-picture. Employing this method can markedly reduce the amount of codes.

Further, the difference signal pixel block of the P-picture and B-picture may be subjected to pre-processing instead of subjecting the I-picture to pre-processing, and this is a very effective method. This is because in the difference signal pixel block, almost all the signals become a small value close to 0, and only the portions including movement become a large signal value. Therefore, for example, entries having a large signal value can be readily concentrated on one place by re-arraying only columns or rows including entries having a large signal value, the high-frequency components of DCT coefficients can be reduced, and the amount of codes can be reduced. Also, the P-picture and B-picture include pixel blocks of which all of the difference signals are close to 0, for which no spatial frequency transformation like DCT are applied at all. Accordingly, permutation serving as pre-processing of spatial frequency transformation is also not performed as to these blocks. Further, with moving-image compression such as MPEG 4 and the like, the header information such as comments, user data, and the like is not described for each picture, but is written for each group ("Group of Video Object Plane") including several I-, P-, and B-pictures. Accordingly, with respect to the parameters according to the first embodiment, the pre-processing parameters for a multiplicity of pictures will be collectively written into the header portion of the group.

Note that in the event that compressed moving-image data subjected to permutation processing is played back using conventional MPEG, picture deformation is too prominent to disregard. Accordingly, in the event of subjecting moving-image compression to permutation pre-processing, decoding should be premised not by a conventional MPEG decoder but by an extended MPEG decoder using permutation processing. For example, it is preferable to enable selection of compression mode at the time of moving-image compression, and to select, at the time of compression mode selection, whether permutation process is performed to achieve a high-compression ratio (setting spatial transformation mode), or not performed by assuming that decoding be done by the conventional MPEG (not setting spatial transformation mode).

According to such a configuration, moving-image data having better image quality and a high-compression ratio can be obtained by performing JEX processing at the time of encoding related with moving images.

Note that with the above description, permutation of pixels of 8×8 pixel block data was performed by combining permutation of rows and columns. In this case, there are 8!×8! pixel placements available after transformation. On the other hand, there exit 64! ways of putting 64 pixels into 64 pixel positions. Accordingly, there exist pixel placements that cannot be covered by a combination of permutations of rows and columns, and consequently, it can be understood that a pixel placement having the highest-compression ratio is not always obtained. Theoretically, it is possible to express an 8×8 pixel block as a 64-D vector, to sort the components of this vector in descending (or ascending) order by permutation for example, placing the thus sorted results in an 8×8 block from its upper left corner in a zigzag manner using the same method performed by the zigzag scan unit 11, and finally to achieve a pixel displacement with higher compression ratio. However, in this case, it can be conceived that the JEX header information to be described in the header portion becomes large in size, and consequently, the total of image file size becomes large.

According to the first embodiment as such, image space is subjected to image space transformation within the image space prior to spatial frequency transformation, and thus, high-frequency coefficients after performing spatial frequency transformation can be suppressed, so that encoding with a high-compression ratio becomes possible, and also encoding with high quality and reduced image deterioration.

Thereby, linear invertible mapping is employed as spatial transformation, so that image can be restored without causing loss of data due to the spatial transformation at the time of decoding.

Also, among linear reversible mappings, linear invertible permutation is employed in particular, so that arithmetic processing can be performed at a high speed, and also the mean value and statistic values and the like of pixels do not change.

A further advantage is that an image file encoded using the extended JPEG (JEX) can also be decoded by conventional JPEG decoding process, and that, even though in this case noise in increments of block occur, the image can still be reproduced on such a level that an overview of the image may be grasped without difficulty.

Second Embodiment

Figure 35:
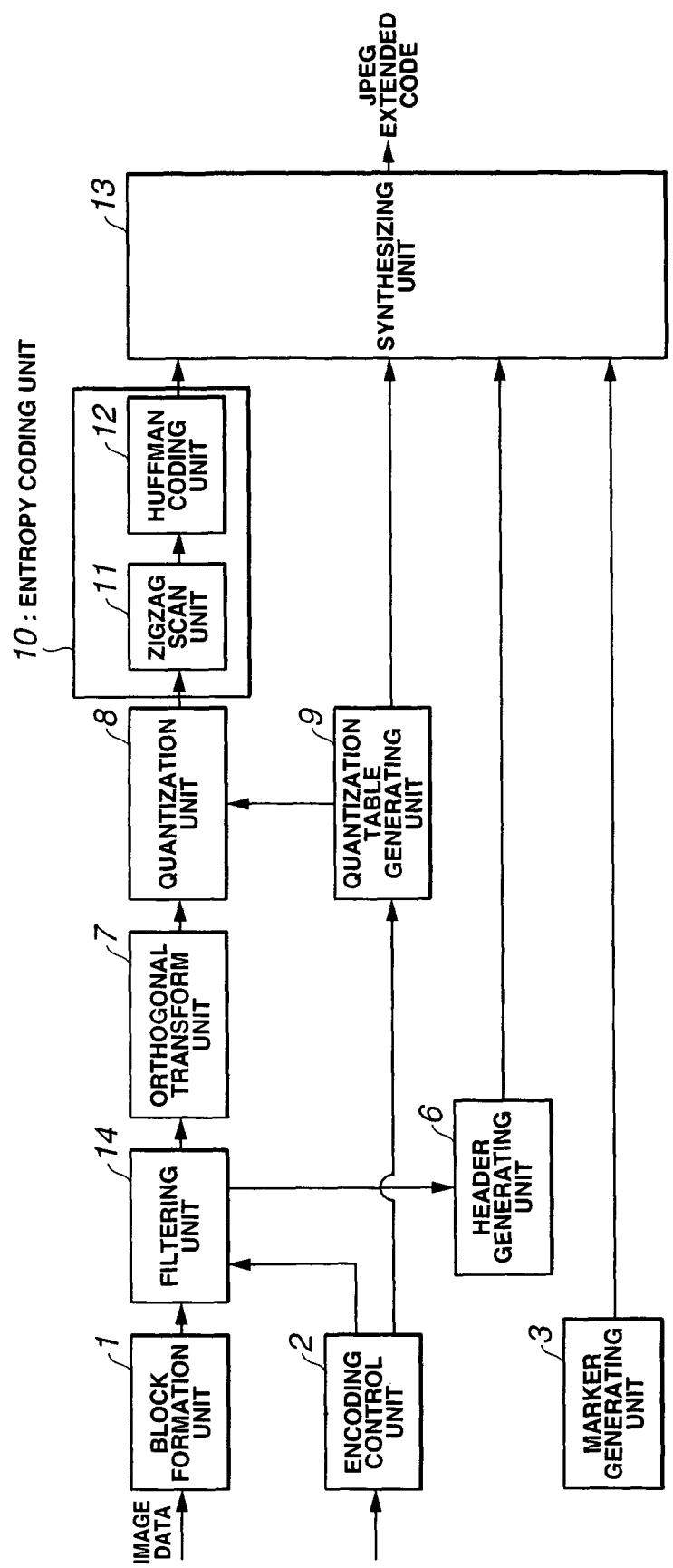
FIG. 35 is a block diagram illustrating the configuration of an extended JPEG encoder according to a second embodiment of the present invention.

FIG. 35 through FIG. 59 illustrate a second embodiment of the present invention, and FIG. 35 is a block diagram illustrating the configuration of an extended JPEG encoder.

With this second embodiment, the same portions as the above first embodiment are appended with the same reference characters, and description thereof will be omitted. Description will be made principally regarding different points alone.

The extended JPEG encoder according to the above first embodiment performed permutation as pre-processing of the normal JPEG encoding processing, but the extended JPEG encoder according to this second embodiment performs invertible low-pass filter (LPF) processing (which is also an invertible image space transformation) as pre-processing of the normal JPEG encoding processing.

Specifically, the extended JPEG encoder according to this second embodiment is an encoder obtained by removing the column-operation determining unit 4 and row-operation determining unit 5 in the configuration illustrated in FIG. 1 in the first embodiment, and providing a filtering unit 14 serving as spatial transformation means instead of these. Control parameters and the like necessary for controlling encoding are input to this filtering unit 14 from the encoding control unit 2.

Also, a later-described scale factor SF and the like for controlling the quantization table generated by the quantization table generating unit 9 are input from the encoding control unit 2. This scale factor SF is also input to the synthesizing unit 13 via the quantization table generating unit 9, and is added to the header information.

Figure 36:
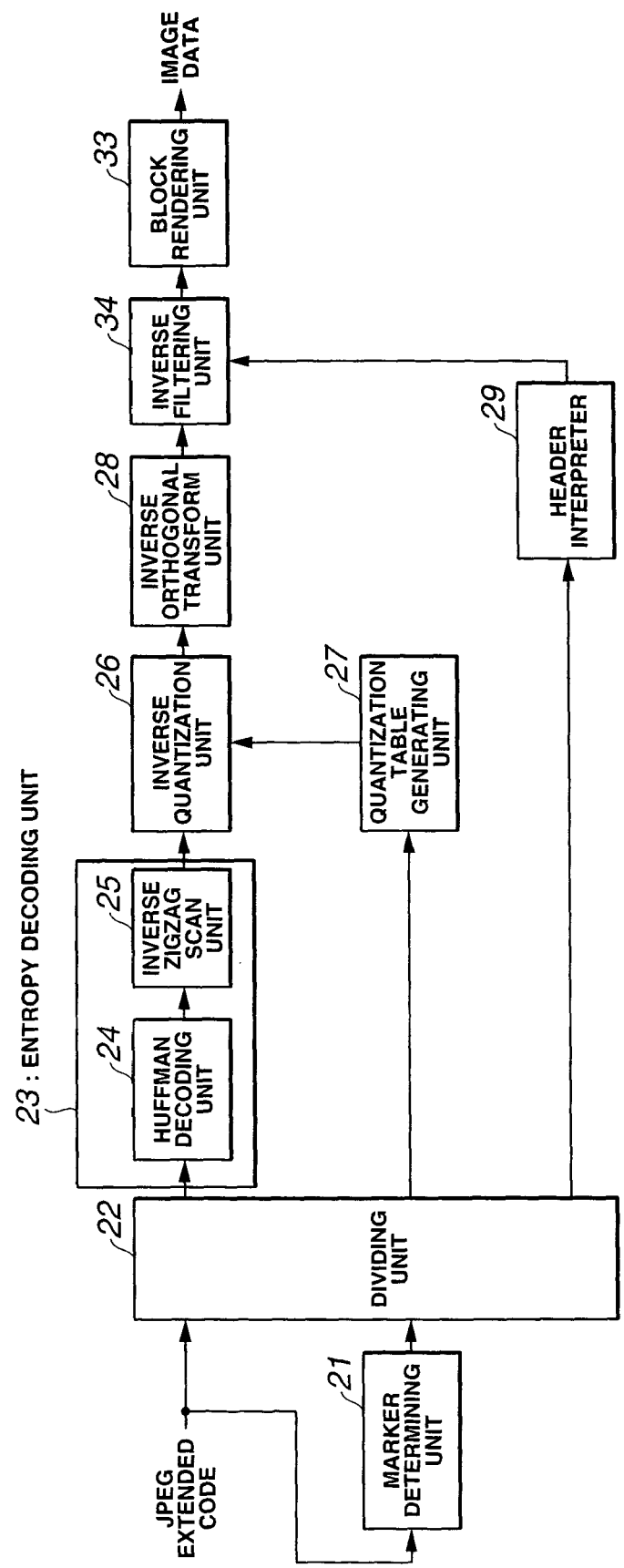
FIG. 36 is a block diagram illustrating the configuration of an extended JPEG decoder according to the second embodiment of the present invention.

FIG. 36 is a block diagram illustrating the configuration of an extended JPEG decoder.

The extended JPEG decoder illustrated in FIG. 36 is for decoding image data encoded by the extended JPEG encoder illustrated in FIG. 35.

Specifically, the extended JPEG decoder according to this second embodiment is an decoder obtained by removing the row operating unit 31 and column operating unit 32 and the decoding control unit 30 in the configuration illustrated in FIG. 2 in the first embodiment, and providing an inverse filtering unit 34 serving as inverse spatial transformation means instead of these. Control parameters and the like necessary for controlling decoding from the header interpreter 29 are input to this inverse filtering unit 34.

The flow of the entire JEX processing in the broad meaning in this second embodiment is the same as that illustrated in FIG. 3 in the first embodiment.

Figure 37:
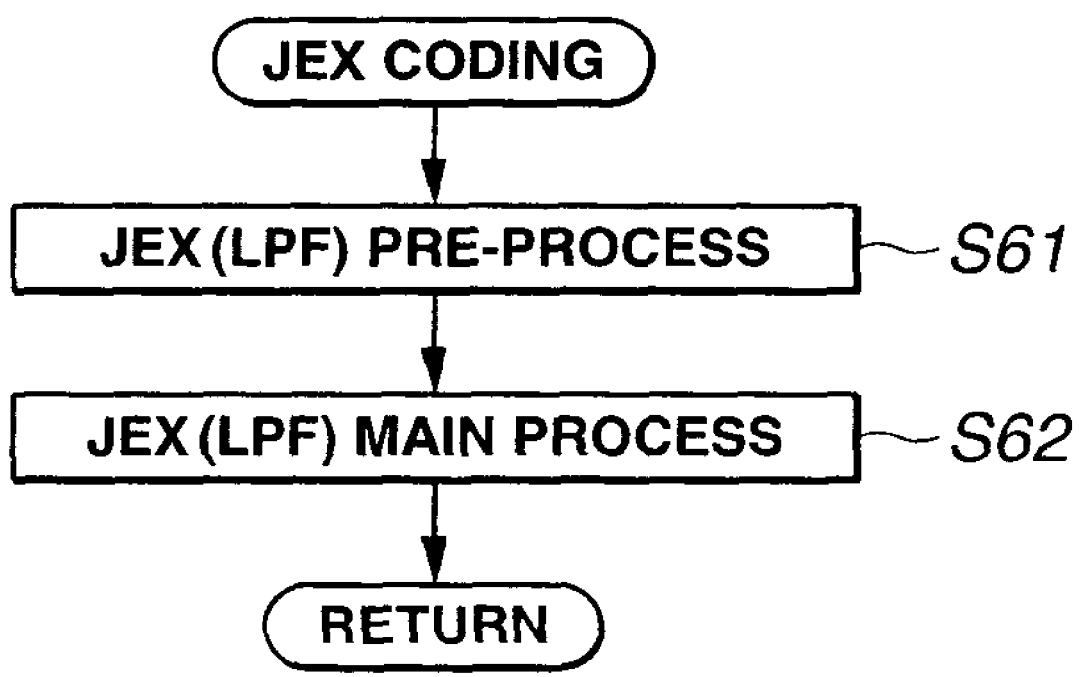
FIG. 37 is a flowchart illustrating the outline of JEX code processing according to the second embodiment of the present invention.

FIG. 37 is a flowchart illustrating an outline of the JEX coding process with respect to Step S2 in FIG. 3.

This JEX coding process in the second embodiment is performed in two stages: a JEX (LPF) pre-processing (Step S61) performed for determining control parameters necessary for low-pass filtering, and a JEX (LPF) main process (Step S62) for applying low-pass filtering based on the determined control parameters to the image.

Figure 38:
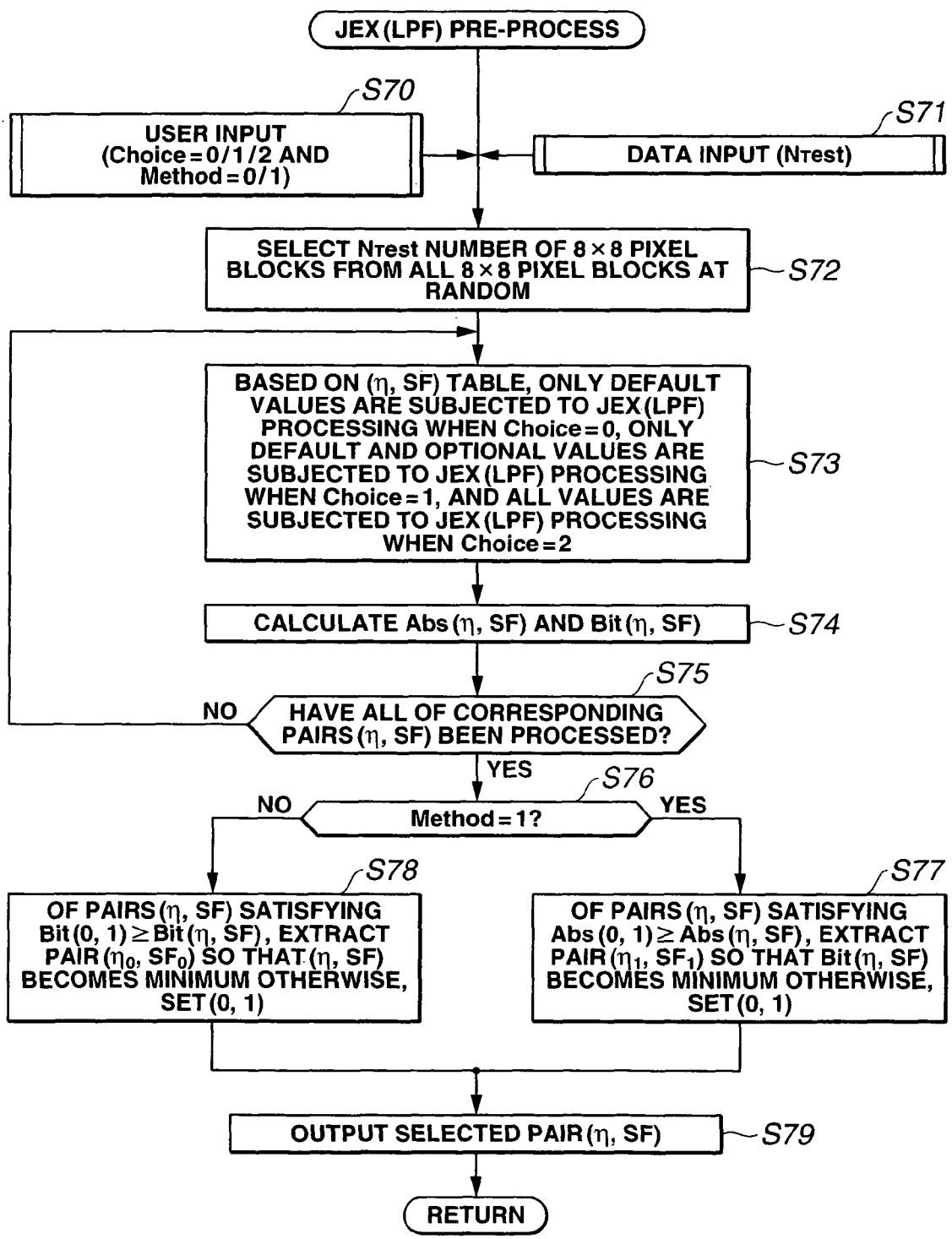
FIG. 38 is a flowchart illustrating the details of the JEX (LPF) pre-processing in Step S61 in FIG. 37.

FIG. 38 is a flowchart illustrating the details of the JEX (LPF) pre-process in Step S61 in FIG. 37.

Upon starting this process, user input (Step S70) and data input (Step S71) are performed. Items to be input by user setting include a setting item called "Choice" and a setting item called "Method".

The latter setting item Method is an item for selecting between the low-pass filter process in the narrow sense of JEX coding is performed with focus on improving the compression ratio, or on improving image quality. Here, Method=1 is set when high compression ratio is selected, and Method=0 is set when high image quality is selected.

The former setting item Choice represents a level indicating how far the high compression ratio or high image quality selected at the item Method is to be pursued. A predetermined standard level is set when Choice=0 is selected, a higher level than the standard level is set when Choice=1 is selected, and the highest level is set when Choice=2 is selected.

On the other hand, with the data input, the number of reference blocks $N_{Test}$ stored in the encoding control unit 2 beforehand is input, for example. Images are processed in increments of 8×8 pixel block as described above, and in the case of a VGA image made up of 640×480 pixels, 80×60=4800 becomes the total number of blocks $N_{Total}$. An appropriate number is set to the number of reference blocks $N_{Test}$ in a range up to such total number of blocks $N_{Total}$.

A method for determining this number of reference blocks $N_{Test}$ in dependence on $N_{Test}$ is illustrated in the following Expression 46.

$$N_{Test} = \begin{cases} N_{Total} & (N_{Total} \le 8) \\ \max\left(8, \left[\frac{1}{4}\sqrt{N_{Total}}\right]\right) & (N_{Total} > 8) \end{cases} \quad \text{[Expression 46]}$$

Here, the square bracket in Expression 46 represents the maximum integer not exceeding the value within the bracket, max(A,B) means the greater value of A and B.

When employing this Expression 46, the number of reference blocks $N_{Test}$ becomes 17 for the example of the above VGA image.

Note that this Expression 46 is an example, and the number of reference blocks $N_{Test}$ may be determined by other means, of course.

Next, among all of the 8×8 pixel blocks making up an image, 8×8 pixel blocks of the number of reference blocks $N_{Test}$ input in Step S71 are selected at random (Step S72). Note that selection is made from all of the pixel blocks at random, but it is not necessary to restrict to this, and rather pixel blocks at appropriate positions may be selected. For example, if there is a principal subject in the center of an image, and we want to optimize the process with respect to the principal subject, it can be conceived that pixel blocks to be selected are disposed near the center of the image at high rates.

Figure 39:
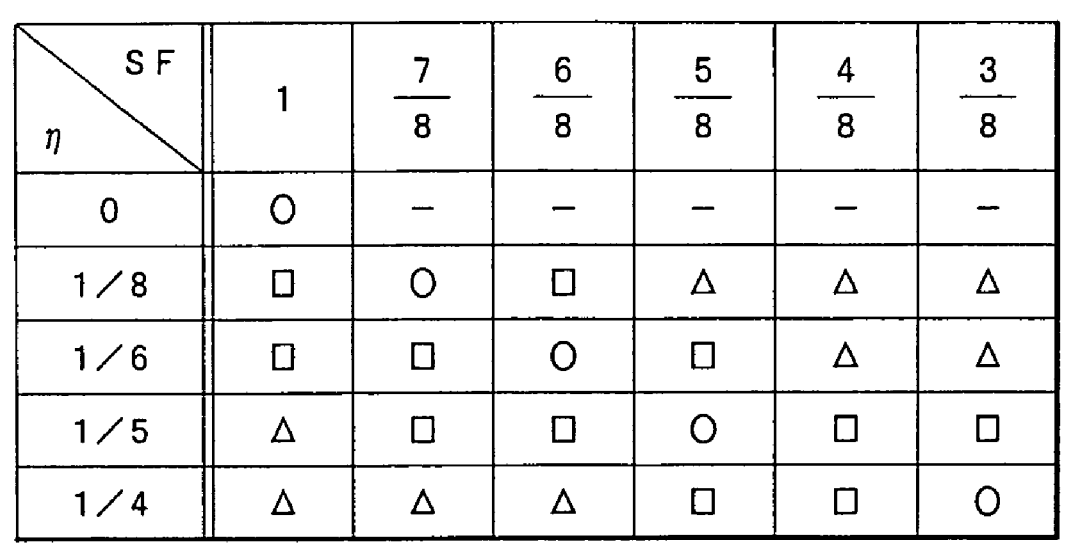

Subsequently, each 8×8 pixel block image data selected in Step S72 is subjected to the broad JEX coding process including the low-pass filter process based on a (η,SF) table such as shown in FIG. 39 (Step S73).

FIG. 39 is a chart illustrating pair (η,SF) of the control parameters to be selected according to the setting item Choice. η of the control parameters shown in this FIG. 39 is a parameter for setting the strength of the low-pass filter. That is to say, with this second embodiment, when 8×8 pixel block image data f(k,l) is represented as a matrix of 8 rows and 8 columns, the low-pass filter processing is performed by multiplying an LPF matrix L(k,η) such as shown in the following Expression 47.

$$L(k, \eta) = \begin{pmatrix} 1 & 0 & & & & & \cdots & & 0 \\ 0 & \ddots & \ddots & & & & & & \\ & \ddots & 1 & 0 & & & 0 & & \\ & & 0 & 1-\eta & \eta & & & & \vdots \\ \vdots & & & \eta & 1-\eta & 0 & & & \\ & & 0 & & 0 & 1 & \ddots & & \\ & & & & & & \ddots & \ddots & 0 \\ 0 & & & & & & & 0 & 1 \end{pmatrix}$$ [Expression 47]

In this Expression 47, when diagonal elements are viewed in the direction from the upper left to the lower right, the first emerging 1−η is disposed in the k-th row k-th column (k=0, . . . , 6). Here, η can take a value in a range of (½)>η≧0. Note that η=(½) is excluded since an inverse matrix does not exist (non-invertible), as can be understood from the later-described Expression 48. Also, η>(½) is excluded since otherwise, pixel data in another pixel position would be added to pixel data in a certain pixel position at higher a ratio than itself, resulting in excessive low-pass filtering.

With regard to this η, the matrix L(k,η) becomes a unit matrix and low-pass filter effects become 0 when η is 0, the low-pass filter effects become small when η is close to 0, and the low-pass filter effects become greater as η approaches (½).

Note that vertical filtering operation (arithmetic operation for reducing the gap between adjacent rows) is performed when multiplying the pixel data f(k,l) by the LPF matrix L(k,η) from the left, and horizontal filtering operation (arithmetic operation for reducing the gap between adjacent columns) is performed when multiplying the pixel data f(k,l) by the LPF matrix L(k,η) from the right. Now, suppose that the element of the k-th column in a certain row of the pixel data f(k,l) is a, the element of the (k+1)-th column is b, and that this is multiplied by the LPF matrix L(k,η) from the right. Then, the element of the k-th column of the same row after the arithmetic operation becomes (1−η)a+ηb, and the element of the (k+1)-th column of the same row after the arithmetic operation becomes ηa+(1−η)b. Accordingly, the gap in the horizontal direction after the arithmetic operation becomes (1−2η)|a−b| compared to the gap |a−b| in the horizontal direction prior to the arithmetic operation. Therefore, keeping the aforementioned range that η can take, 1≧(1−2η)>0, in mind, we readily see that the gap in the horizontal direction is suppressed. Note that in the event of multiplying by the LPF matrix L(k,η) from the left, similar arguments apply, so that the gap in the vertical direction is suppressed.

The DC coefficient after a DCT transform is left unchanged by this low-pass filter.

Also, a matrix for performing an inverse LPF arithmetic operation is represented with Expression 48.

$$L(k, \eta)^{-1} = \begin{pmatrix} 1 & 0 & & & & & \cdots & & 0 \\ 0 & \ddots & \ddots & & & & & & \\ & \ddots & 1 & 0 & & & 0 & & \\ & & 0 & \frac{1-\eta}{1-2\eta} & \frac{-\eta}{1-2\eta} & & & & \vdots \\ \vdots & & & \frac{-\eta}{1-2\eta} & \frac{1-\eta}{1-2\eta} & 0 & & & \\ & & 0 & & 0 & 1 & \ddots & & \\ & & & & & & \ddots & \ddots & 0 \\ 0 & & & & & & & 0 & 1 \end{pmatrix}$$ [Expression 48]

With this Expression 48 which is the inverse matrix of Expression 47, when the diagonal elements are viewed in the direction from the upper left to the lower right, the first emerging factor of (1−η)/(1−2η) is found in the k-th row k-th column (k=0, . . . , 6).

Note that the matrices shown in these Expression 47 and Expression 48 are shown as an example of a matrix for performing LPF and inverse LPF, and are not restricted to these.

With the example shown in FIG. 39, there are five values for η: namely 0, (⅛), (⅙), (⅕), and (¼). These are set in light of practical use, but of course these are an example, and other values may be taken as η.

On the other hand, the SF within the control parameters illustrated in FIG. 39 is a parameter for controlling the quantization step by multiplying the quantization table (Q table). With the example shown in FIG. 39, values to be taken as the SF are the six types of 1, (⅞), (6/8), (⅝), (4/8), and (⅜). Here, SF=1 indicates that the original quantization table is employed as it is. With regard to this scale factor SF, an arrangement may be made wherein other values can be set as the SF.

With the table shown in FIG. 39, pairs (η,SF) shown with ○ are default values to be selected when the setting item Choice=0. Also, pairs (η,SF) shown with □ are optional values to be additionally selected as to the pairs (η,SF) shown with ○ when the setting item Choice=1. Further, pairs (η,SF) shown with Δ are values to be additionally selected as to the pairs (η, SF) shown with □ and ○ when the setting item Choice=2.

Thus, each of $N_{Test}$ 8×8 pixel blocks $n_i$ (variable $n_i$ is a variable running over all reference 8×8 pixel blocks) selected in Step S72 is subjected to the broad JEX coding process including the low-pass filtering using the combinations of (η,SF) selected according to the value of the setting item Choice. Through this, image data subjected to the low-pass filter process, DCT, and Huffman coding is obtained for each reference 8×8 pixel block data f(k,l).

Subsequently, the encoded image data is decoded using the JEX decoding in the broad sense, so that 8×8 pixel block data f'(k,l) subjected to the Huffman decoding, inverse DCT, and inverse low-pass filter process are obtained. Then, the 8×8 pixel block data f'(k,l) subjected to encoding and decoding is subtracted from the 8×8 pixel block data f(k,l) prior to encoding, and the sum of the absolute values according to each pixel is obtained. In this way, a sum of absolute values of differences, $Abs(n_i,\eta,SF)$, is obtained.

Additionally, Bit($n_i$,η,SF) are calculated by adding the code lengths of the Huffman codes obtained by the broad sense JEX coding process and the bit lengths of the header informations according to the 8×8 pixel blocks (Step S74).

Image quality evaluation value Abs(η,SF) and code-length evaluation value Bit(η,SF) corresponding to all of the reference 8×8 pixel block $n_i$ are calculated using Abs($n_i$,η,SF) and Bit($n_i$,η,SF) thus obtained in a manner shown in the following Expression 49 and Expression 50.

$$\text{Abs}(\eta, SF) := \sum_{n_i} \text{Abs}(n_i, \eta, SF) \qquad \text{[Expression 49]}$$

$$\text{Bit}(\eta, SF) := \sum_{n_i} \text{Bit}(n_i, \eta, SF) \qquad \text{[Expression 50]}$$

Here, a symbol ":=" means substitution.

The image quality evaluation value Abs(η,SF) indicates that the smaller a value thereof is, the higher image quality is, and the code-length evaluation value Bit(η,SF) indicates that the smaller a value thereof is, the higher the compression ratio.

Subsequently, it is determined if the processes with respect to all pairs (η,SE) selected from the (η,SF) table according to the value of the Choice has been performed (Step S75), and, if an unprocessed pair (η,SF) exists, the flow returns to Step S73, wherein the process is performed with respect to the next pair (η,SF).

Thus, in Step S75, in the event that determination is made that the processes of all the pairs (η,SF) have been performed, it is further determined whether or not the item Method is 1 (Step S76).

Here, in the case Method=1, meaning that a high compression ratio has been selected, from all pairs (η,SF) satisfying Abs(0,1)≧Abs(η,SF), that pair (η1,SF1) is selected, which causes Bit(η,SF) to be minimum. The imposed condition Abs(0,1)≧Abs(η,SF) is a necessary condition that the image quality must not deteriorate when compared to the image processed with normal JPEG. Note that in the event that there are two or more pairs (η1,SF1) causing Bit(η,SF) to be minimum, the pair (η1,SF1) with the smaller value of Abs(η,SF) is selected, thereby improving not only the compression ratio but also image quality. On the other hand, if there is no pair (η,SF) satisfying Abs(0,1)≧Abs(η,SF), then (0,1) indicating that the low-pass filter process is not performed is automatically taken (Step S77).

Also, in Step S76, if it is determined that Method=1 is not satisfied (i.e., Method=0 at this time), meaning that high quality has been selected, from all pairs (η,SF) satisfying Bit(0,1)≧Bit(η,SF), that pair (η0,SF0) is selected, which causes Abs(η,SF) to be minimum. The imposed condition Bit(0,1)≧Bit(η,SF) is a necessary condition that the data size must not exceed the size of data compressed with normal JPEG. Note that in the event that the number of the pair (η0,SF0) causing the Abs(η,SF) to be the minimum exceeds 1, the pair (η0,SF0) with the smaller Bit(η,SF) will be selected, thereby improving not only image quality but also compression ratio. On the other hand, in the event that there are no pair (η,SF) satisfying Bit(0,1)≧Bit(η,SF), the pair (0,1) indicating that the low-pass filter processing is not performed is automatically taken (Step S78).

Upon the completion of Step S77 or Step S78, the selected pair (η,SF) is output (Step S79), and then this JEX (LPF) process ends.

Figure 40:
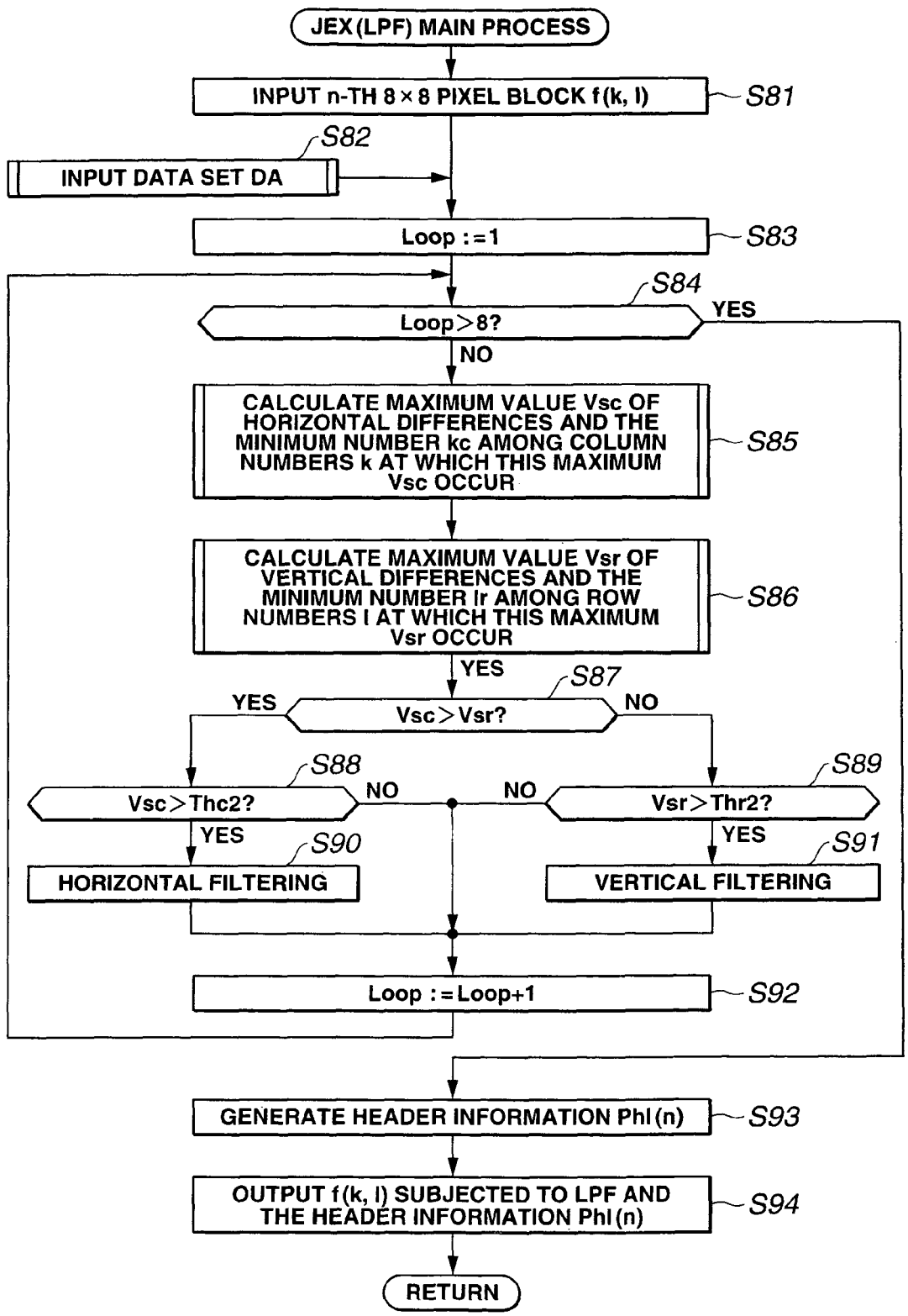
FIG. 40 is a flowchart illustrating the details of the JEX (LPF) main processing in Step S62 in FIG. 37.

FIG. 40 is a flowchart illustrating the details of the JEX (LPF) main process in Step S62 in FIG. 37.

This JEX (LPF) main process is for subjecting the entire image to the low-pass filter process based on the pair (η,SF) set in the JEX (LPF) pre-process illustrated in FIG. 38.

Upon this processing being started, the n-th (n=1, . . . , $N_{Total}$) 8×8 pixel block f(k,l) is input (Step S81).

Subsequently, a data set DA is input (Step S82). This data set DA is a data set including the aforementioned η, Thc2, Thr2, Mode vector, and Pos vector. Here, Thc2 is a threshold value for determining whether or not the later-described maximum value $V_{sc}$ of difference in the horizontal direction is large enough to justify an application of a horizontal filtering operation. Similarly, Thr2 is a threshold value for determining whether or not the later-described maximum value $V_{sr}$ of difference in the vertical direction is large enough to justify an application of a vertical filtering operation. The Mode vector is an 8-D vector here, and is set to a value indicating whether either the vertical filtering or horizontal filtering has been performed. As an example, "1" is a value indicating the vertical filtering operation, and "2" is a value indicating the horizontal filtering operation, respectively. Note that the dimension 8 of the vector indicates that the low-pass filter operation made up of vertical filtering operation or horizontal filtering operation is performed up to a maximum of 8 times in total. If the low-pass filter process is repeatedly performed many times, the image is gradually planarized, so the upper limit is determined as 8 times to prevent excessive planarization here. Note that this upper limit is not restricted to 8 times in general, of course. The Pos vector is a vector in which the row number or column number of the 8×8 pixel block to be subjected to the vertical filtering operation or horizontal filtering operation is recorded. Description will be made later regarding a specific example of these Mode vector and Pos vector with reference to FIG. 55.

Next, 1 is substituted for the loop count variable Loop (Step S83). Here, ":=" means substitution as described above.

Subsequently, determination is made whether or not the Loop is greater than 8 (Step S84), and in the event that the Loop is not greater than 8, the maximum value $V_{sc}$ of differences in the horizontal direction and the minimum kc among column numbers k providing this maximum value $V_{sc}$ are calculated (Step S85).

Subsequently, the maximum value $V_{sr}$ of differences in the vertical direction and the minimum lr among row numbers l providing this maximum value $V_{sr}$ are calculated (Step S86).

It is checked whether or not the maximum value $V_{sc}$ thus calculated is greater than the maximum value $V_{sr}$ (Step S87), and if the maximum value $V_{sc}$ is greater than the maximum value $V_{sr}$, it is further determined whether or not the maximum value $V_{sc}$ is greater than the threshold value Thc2 (Step S88). If $V_{sc}$ is greater than the threshold Thc2, the horizontal filtering operation is carried out as shown in the following Expression 51, and Mode(Loop):=1 and Pos(Loop):=kc are set (Step S90).

$$f(k,l) \leftarrow [f^* L(kr,\eta)]_{k,l} \qquad \text{[Expression 51]}$$

On the other hand, in Step S87, if the maximum value $V_{sc}$ is equal to or less than the maximum value $V_{sr}$, it is further checked whether or not the maximum value $V_{sr}$ is greater than the threshold value Thr2 (Step S89). If the maximum value $V_{sr}$ is greater than the threshold Thr2, the vertical filtering operation is carried out as shown in the following Expression 52, and Mode (Loop):=2 and Pos (Loop):=lr are set (Step S91).

$$f(k,l) \leftarrow [L(kr,\eta)^* f]_{k,l} \qquad \text{[Expression 52]}$$

When Step S90 or Step S91 is completed, if the maximum value $V_{sc}$ is equal to or less than the threshold Thc2 in Step S88, or if the maximum value $V_{sr}$ is equal to or less than the threshold Thr2 in Step S89, the variable Loop is incremented (Step S92), and the flow returns to Step S84, wherein the process described above is repeatedly performed.

Thus, when the variable Loop is confirmed to be greater than 8 in Step S84, the header information Phl(n) is generated (Step S93), the f(k,l) subjected to LPF and the header information Phl(n) are output (Step S94), and then this JEX (LPF) main processing ends.

Note that FIG. 40 describes the process for one (the n-th) 8×8 pixel block. Needless to say, such process is performed regarding $N_{Total}$ 8×8 pixel blocks in real process.

Figure 41:
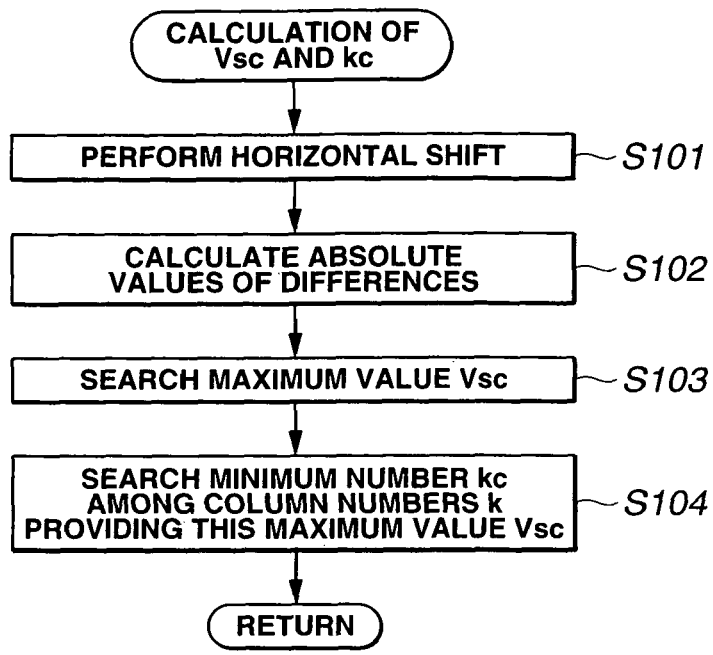
FIG. 41 is a flowchart illustrating the details of the $V_{sc}$ and kc calculation processing in Step S85 in FIG. 40.

FIG. 41 is a flowchart illustrating the details of calculation processing of the $V_{sc}$ and kc in Step S85 in FIG. 40.

When the process starts, data obtained by shifting the 8×8 pixel block f(k,l) horizontally is calculated (Step S101).

Subsequently, absolute values of differences are calculated by subtracting the horizontally shifted (left-shifted) data from the original data f(k,l), and taking absolute values of the differences (Step S102). However, whereas the original data was made up of 8 columns k=0, . . . , 7, the horizontally shifted data is made up of 7 columns k=0, . . . , 6, so that calculation is done for the 7 columns k=0, . . . , 6, and the number of calculated absolute values of differences is 7×8=56.

Of the calculated absolute values of differences, the maximum value $V_{sc}$ is searched (Step S103). The process for searching this maximum value $V_{sc}$ can be represented with an expression as shown in the following Expression 53.

$$Vsc = \max_{\substack{l=0,\ldots,7 \\ k=0,\ldots,6}} |f(k,l) - f(k+1,l)| \qquad \text{[Expression 53]}$$

Subsequently, the minimum kc within the column number k proving the maximum value $V_{sc}$ is searched (Step S104), and then this processing ends. Note that the processing in Step S104 functions only when there are two or more column numbers k providing the maximum value $V_{sc}$, and the column number k is selected without searching when there is only one column number k.

Figure 42:
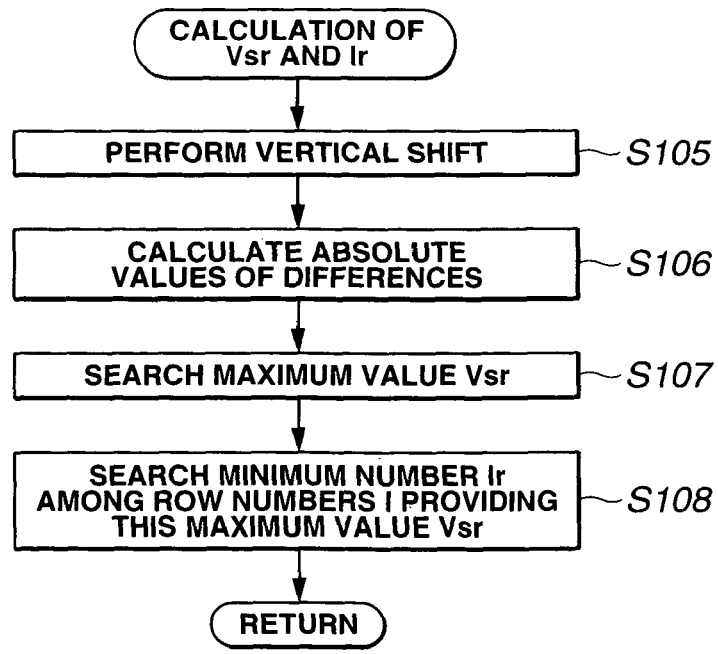
FIG. 42 is a flowchart illustrating the details of the $V_{sr}$ and lr calculation processing in Step S86 in FIG. 40.

FIG. 42 is a flowchart illustrating the details of calculation process of the $V_{sr}$ and lr in Step S86 in FIG. 40.

When the process starts, data obtained by shifting the 8×8 pixel block f(k,l) vertically is calculated (Step S105).

Subsequently, absolute values of differences are calculated by subtracting the vertically shifted (upward-shifted) data from the original data f(k,l), and taking absolute values of the differences (Step S106). However, whereas the original data was made up of 8 rows k=0, . . . , 7, the vertically shifted data is made up of 7 rows k=0, . . . , 6, so that calculation is done for the 7 rows k=0, . . . , 6, and the number of calculated absolute values of differences is 7×8=56.

Of the calculated absolute values of differences, the maximum value $V_{sr}$ is searched (Step S107). The process for searching this maximum value $V_{sr}$ can be represented with an expression as shown in the following Expression 54.

$$Vsr = \max_{\substack{l=0,\ldots,6 \\ k=0,\ldots,7}} |f(k,l) - f(k,l+1)| \qquad \text{[Expression 54]}$$

Subsequently, the minimum lr within the row number l proving the maximum value $V_{sr}$ is searched (Step S108), and then this processing ends. Note that the processing in Step S108 functions only when there are two or more row numbers l providing the maximum value $V_{sr}$, and the row number l is selected without searching when there is only one row number l.

Figure 43:
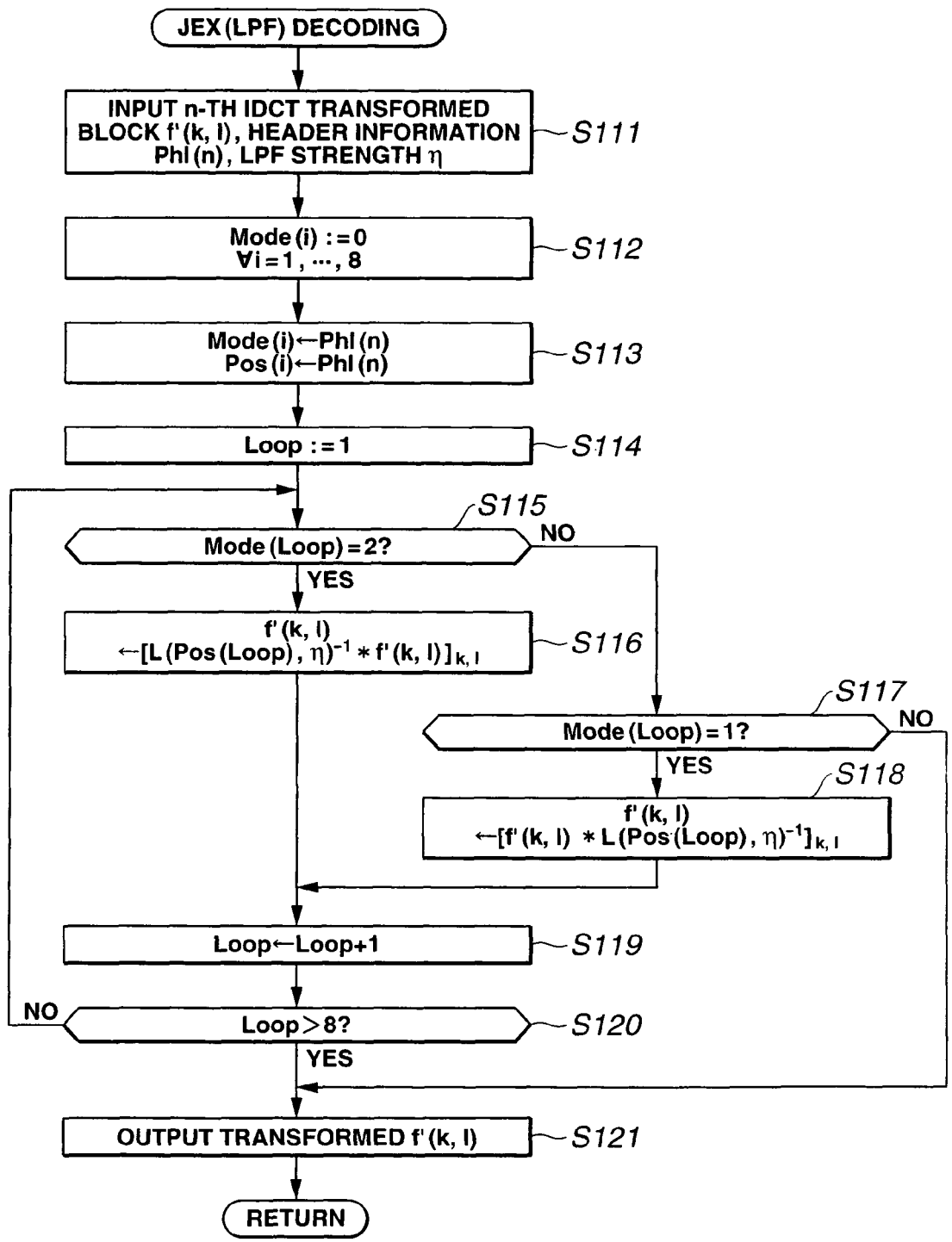
FIG. 43 is a flowchart illustrating JEX (LPF) decoding process according to the second embodiment of the present invention.

FIG. 43 is a flowchart illustrating the JEX (LPF) decoding processing.

Upon this processing being started, the n-th IDCT transformation block f'(k,l), header information Phl(n), and the parameter η indicating the strength of the LPF are input (Step S111).

The 8-D vector Mode is initialized by substituting 0 for all of the Mode (1), . . . , Mode (8) (Step S112). Note that in FIG. 43, the symbol appended in front of i, which turns "A" upside down, is a symbol indicating an arbitrary i.

Subsequently, the bit information from the second bit of the header information Phl(n) until the separator "000" are substituted into Mode(1), Mode(2), . . . in this order in increments of 2 bits, and also the bit information from the separator "000" until the last bit are substituted for Pos(1), Pos(2), . . . , in this order in increments of 3 bits (see FIG. 44, FIG. 45, etc.) (Step S113).

Subsequently, 1 is substituted for the variable Loop indicating loop count (Step S114).

Next, it is determined whether or not the mode vector component Mode(Loop) corresponding to the loop count is 2 (Step S115). If Mode(Loop) is 2, an inverse vertical filtering operation is performed using the following Expression 55 (Step S116).

$$f'(k,l) \leftarrow [L(Pos(Loop),\eta)^{-1} * f'(k,l)]_{k,l} \qquad \text{[Expression 55]}$$

On the other hand, in the event that Mode(Loop) is not 2 in Step S115, then it is determined whether or not Mode(Loop) is 1 (Step S117).

If Mode(Loop) is 1, an inverse horizontal filtering arithmetic operation is performed using the following Expression 56 (Step S118).

$$f'(k,l) \leftarrow [f'(k,l) * L(Pos(Loop),\eta)^{-1}]_{k,l} \qquad \text{[Expression 56]}$$

In the event that Step S116 or Step S118 is completed, the variable Loop is incremented (Step S119), and then determination is made whether or not the variable Loop is greater than 8 (Step S120).

In the event that the variable Loop is 8 or less, the flow returns to Step S115, wherein the processing such as described above is repeatedly performed.

On the other hand, if the variable Loop is greater than 8, or if Mode (Loop) is not 1 in Step S117, the transformed f'(k,l) is output (Step S121), ending this JEX (LPF) decoding.

Note that in FIG. 43, the process for one (the n-th) IDCT transformation block has been illustrated, but it is needless to say that such process is performed for $N_{Total}$ IDCT transformation blocks in real processing.

FIG. 44 is a chart illustrating an example of the Mode vector and Pos vector.

The example shown in this FIG. 44 is an example wherein one 8×8 pixel block is subjected to the LPF processing 8 times. In this example, Mode(i)=2 holds only when i=4 or 8, indicating that the vertical filtering operation has been performed, and all of the other cases indicate that the horizontal filtering operation has been performed. This Mode(i) is made up of each two bits. A row number or column number where the filter arithmetic operation has been performed for each i is represented as Pos(i), and also the bit representation thereof is shown. k and l are in a range between 0 and 7, so each of them is represented as a 3-bit value.

Note that the LPF processing is performed 8 times at the maximum, but is sometimes performed less than 8 times. For example, assuming that the LPF processing is performed j ($7 \geqq j$) times, a separator is recorded after Mode(j), and Pos(i), . . . , Pos(j) are recorded after the separator.

FIG. 45 is a chart illustrating an example of the header information Phl(n).

As shown in the drawing, the header information Phl(n) for the n-th 8×8 pixel block comprises the indicator Ind, Mode(i), separator, and Pos(i).

The indicator Ind is a one bit data for indicating data start position so as to distinguish this from a filler, and 1 is set as to all of the 8×8 pixel blocks.

Mode(i) is a portion in which data "1" or "2" shown in FIG. 44 are recorded as 2-bit value.

The separator is for distinguishing the Mode(i) from the Pos(i), and is 0 represented with a 3-bit value (i.e., "000" in bit representation).

Pos(i) is a portion in which data in bit representation shown in FIG. 44 is recorded in order.

If no LPF process has been performed at all, Phl(n) becomes "100".

FIG. 46 is a chart illustrating an example of the global header for the entire image.

This global header is recorded in, for example, the comment COM portion shown in FIG. 24, or application marker segment in the EXIF file, and so forth, as with the above first embodiment.

The global header comprises "JEX" recorded as a binary (ASCII data), a category recorded as a 4-bit value, a global parameter recorded as a value including 3 8-bit values (i.e., 24-bit values in total), and a header Phl(n) for all blocks, and further, fillers are added as necessary.

FIG. 47 is a chart illustrating an example of bit values to be recorded in the category of the global header.

With this example, the category is shown as a 4-bit value. First, a category "0000" shows that the narrow JEX processing is not performed, and in this case, the broad JEX processing is identical to the normal JPEG processing.

Next, category "0001" shows that permutation such as described in the first embodiment is performed as the narrow JEX processing.

A category "0010" shows that reversible LPF processing such as described in the second embodiment is performed as the narrow JEX processing.

A category "0011" shows that permutation and reversible LPF processing are employed together as the narrow JEX processing. Regarding this case, description will be made later as a third embodiment.

Note that the other bit values assignable as the category are reserved regions for other JEX processings.

FIG. 48 is a chart illustrating an example of the first 8-bit value of the global parameter shown in FIG. 46.

Here, a bit value corresponding to the parameter η as the first 8-bit value of the global parameter is recorded. For example, with regard to each value of the η such as shown in FIG. 39, "00000000" when η=0, "00000001" when η=(⅛), "00000010" when η=(⅙), "00000011" when T=(⅕), and "00000100" when η=(¼) are recorded as a bit value respectively.

FIG. 49 is a chart illustrating an example of the second 8-bit value of the global parameter shown in FIG. 46.

Here, a bit value corresponding to the scale factor SF as the second 8-bit value of the global parameter. For example, with regard to each value of the SF such as shown in FIG. 39, "00000000" when SF=1, "00000001" when SF=(⅞), "00000010" when SF=(⁶⁄₈), "00000011" when SF=(⅝), "00000100" when SF=(⁴⁄₈), and "00000101" when SF=(⅜) are recorded as a bit value respectively.

Note that the third 8-bit value of the global parameter shown in FIG. 46 is a reserved region.

FIG. 50 is a diagram illustrating a data example of an original 8×8 pixel block extracted from image data.

The image data illustrated in this FIG. 50 is divided into regions for a pixel value "10", and regions for a pixel value "222". It is an image data having relatively strong contrast such as character data, or the like.

First, description will be made regarding the case in which the image data shown in FIG. 50 is processed with the normal JPEG with reference to FIG. 51 through FIG. 54.

FIG. 51 is a chart illustrating the results of subjecting the original 8×8 pixel block data shown in FIG. 50 to level shift and DCT.

Also, FIG. 52 is a chart illustrating the results of the block data shown in FIG. 51 after quantization.

Further, FIG. 53 is a chart illustrating the results of subjecting the block data shown in FIG. 52 to inverse quantization, inverse DCT, and level shift in order, and rounding-off to data in a range between 0 to 255.

FIG. 54 is a chart illustrating the results of subtracting the original pixel block data shown in FIG. 50 from the pixel block data subjected to decoding shown in FIG. 53.

The sum of the absolute values of differences shown in FIG. 54 becomes 685, and the code length after JPEG encoding becomes 193 bits.

On the other hand, FIG. 55 through FIG. 59 illustrate an example when the JEX processing is performed using reversible LPF.

First, FIG. 55 is a chart illustrating an example of the mode information and filter position information extracted from the header information. The example shown in this FIG. 55 corresponds to the example shown in FIG. 44.

Distinction can be made regarding whether an arithmetic operation is the vertical filtering arithmetic operation or horizontal filtering arithmetic operation based on the mode information to be extracted from the Mode vector of the header information, and also determination can be made regarding which position a filter arithmetic operation is performed based on information of the filter positions kc and lr to be extracted from the Pos vector.

Next, FIG. 56 is a chart illustrating the results of subjecting the original 8×8 pixel block data shown in FIG. 50 to 8-times low-pass filter processing such as shown in FIG. 55. It can be found from the results shown in this FIG. 56 that there are less pixels having a pixel value of "10", and that high-frequency parts are reduced as a whole. Note that as can be understood from FIG. 56, the pixel values following the low-pass filter processing become values having decimal points, but this is because floating point arithmetic operations are performed to do the low-pass filter process mixing up pixel values with a high degree of accuracy.

Subsequently, FIG. 57 is a chart illustrating the results of subjecting the 8×8 pixel block data subjected to the low-pass filtering shown in FIG. 56 to level shift and DCT. As can be understood if this FIG. 57 is compared with FIG. 51, the DC component is kept unchanged as "116" by the inverse low-pass filter. Moreover, it is recognized that high-frequency coefficients are obviously reduced.

Subsequently, FIG. 58 is a chart showing the results of quantizing the block data shown in FIG. 57.

In this example, quantization is performed with the scale factor SF set to "1", i.e., using the original quantization table as it is. We see that, when the results shown in this FIG. 58 are compared with the results shown in FIG. 52 the portion with "0" (zero) high-frequency coefficients has increased. Consequently, it can be expected to achieve a higher compression ratio.

Further, FIG. 59 is a chart illustrating the results of subjecting the block data shown in FIG. 58 to inverse quantization, inverse DCT, and level shift, and performing inverse LPF, and rounding-off to data in a range between 0 to 255.

The original pixel block data shown in FIG. 50 is subtracted from the pixel block data subjected to decoding shown in this FIG. 59, and totaling the absolute values thereof results in 522. This clearly shows that image quality improves compared to the results (the total of differential absolute values is 685) of the JPEG decoding shown in FIG. 53.

Also, the code length following the JEX coding is 125 bits, and the bit length of the header information shown in FIG. 45 is 44 bits, resulting in 169 bits in total. This is smaller than 193 bits of the code length of the conventional JPEX encoding, even including the header information portion, so the compression ratio is improved.

According to the second embodiment as such, generally the same advantages as those of the above first embodiment can be provided even by performing the invertible low-pass filter process as the invertible image space transformation.

Third Embodiment

Figure 60:
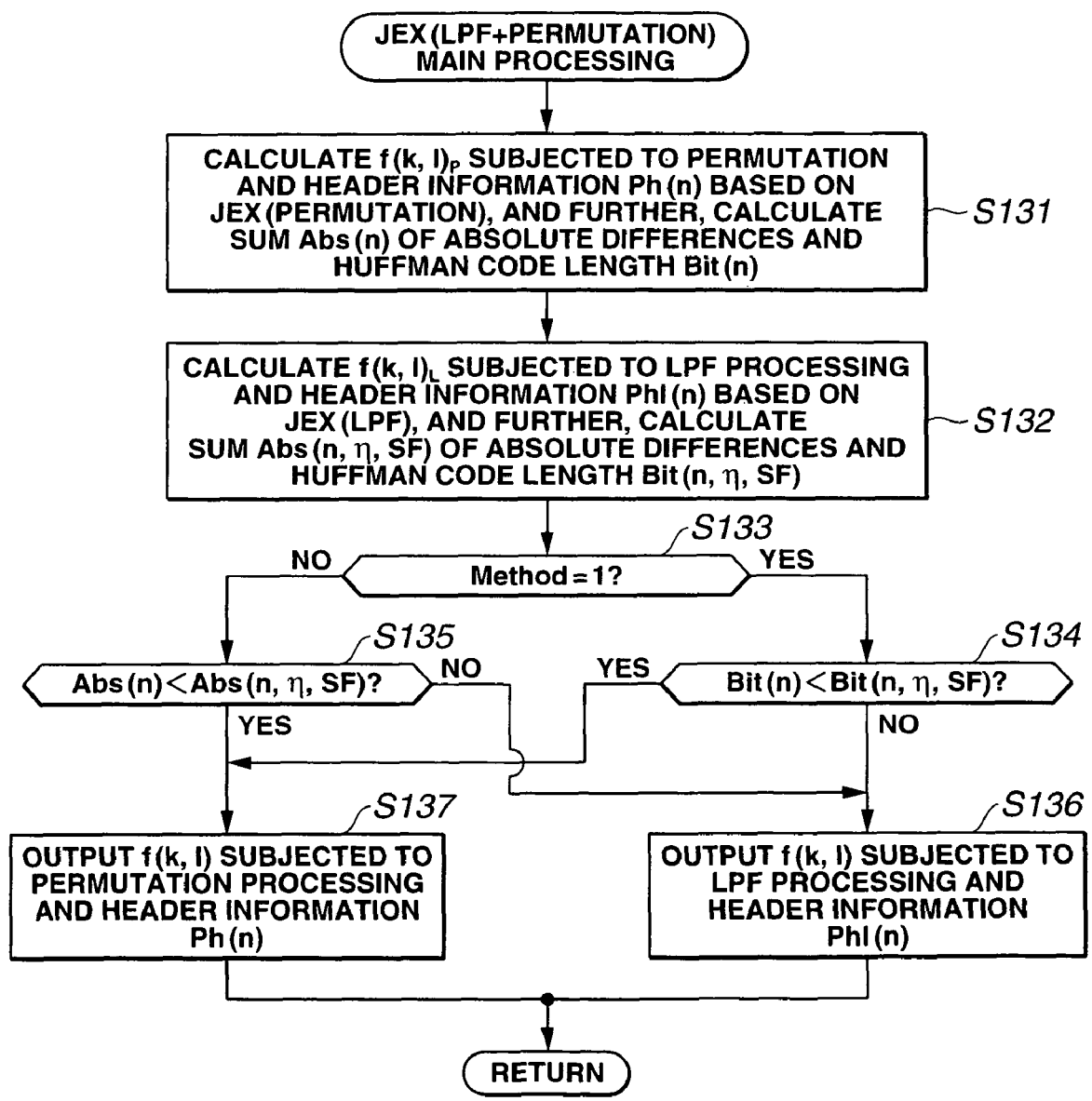
FIG. 60 is a flowchart illustrating an example of JEX main processing wherein a low-pass filter and permutation are combined with a third embodiment of the present invention.

FIG. 60 through FIG. 63 illustrate the third embodiment of the present invention, and FIG. 60 is a flowchart illustrating an example of the JEX main process that combines a low-pass filter with permutation. With this third embodiment, portions same as the above embodiments 1 and 2 are appended with the same reference characters, and description thereof will be omitted. Description will be made principally regarding different points alone.

With this third embodiment, an arrangement is made wherein any advantageous one of permutation such as described in the first embodiment and low-pass filter processing such as described in second embodiment can be selectively performed. Accordingly, this means that, within one image data, some 8×8 pixel block is subjected to permutation, and other 8×8 pixel block is subjected to low-pass filter processing.

Note that the JEX (LPF+permutation) main process shown in this FIG. 60 is performed instead of the JEX (LPF) main processing in Step S62 shown in FIG. 37 of the above second embodiment. Accordingly, when this JEX (LPF+permutation) main processing is performed, it is a precondition that the JEX (LPF) pre-processing has been already completed.

Upon this processing being started, $f(k,l)_p$ subjected to permutation based on JEX (permutation) and the header information Ph(n) are calculated, and further, the sum-of-absolute-difference Abs(n) and Huffman code-length Bit(n) are calculated (Step S131).

Next, $f(k,l)_L$ subjected to LPF processing based on JEX (LPF) and the header information Phl(n) are calculated, and further, the sum-of-absolute-difference Abs(n,η,SF) and Huffman code-length Bit(n,η,SF) are calculated (Step S132).

Subsequently, it is determined whether Method is 1 (Step S133). If Method is 1 (i.e., a high compression ratio is selected), determination is made whether or not the Huffman code-length Bit(n) of permutation is smaller than the Huffman code-length Bit(n,η,SF) of LPF (Step S134).

Also, in Step S133, in the event that the Method is not 1 (i.e., high image quality is selected), determination is made whether or not the sum-of-absolute-difference Abs(n) of permutation is smaller than the sum-of-absolute-difference Abs(n,η,SF) of LPF (Step S135).

If the Huffman code-length Bit(n) of permutation is equal to or greater than the Huffman code-length Bit(n,η,SF) of LPF in Step S134, or if the sum-of-absolute-difference Abs (n) of permutation is equal to or greater than the sum-of-absolute-difference Abs(n,η,SF) of LPF in Step S135, LPF-processed f(k,l) and header information Phl(n) are output (Step S136).

On the other hand, if the Huffman code-length Bit(n) of permutation is smaller than the Huffman code-length Bit(n, η,SF) of LPF in Step S134, or if the sum-of-absolute-difference Abs(n) of permutation is smaller than the sum-of-absolute-difference Abs(n,η,SF) of LPF in Step S135, the permutated f(k,l) and header information Ph (n) are output (Step S137).

Thus, upon Step S136 or Step S137 being performed, this JEX (LPF+permutation) main processing ends.

Note that processing such as shown in FIG. 60 is performed for each 8×8 pixel block, as described above.

Next, FIG. 61 is a chart illustrating an example of the header information to be generated in Step S137 in FIG. 60, and FIG. 62 is a chart illustrating an example of the header information to be generated in Step S136 in FIG. 60.

The header information Ph(n) to be generated when permutation is performed is the same as the header information Ph(n) shown in FIG. 25 of the first embodiment, and the header information Phl(n) to be generated when the LPF is performed is the same as the header information Phl(n) shown in FIG. 45 of the second embodiment, except that in both cases a category Cat is recorded immediately after the indicator Ind. With the examples shown in FIG. 61 and FIG. 62, the category Cat is recorded as one-bit information, "0" is recorded as a bit value when the permutation processing is performed, and "1" is recorded as a bit value when the LPF processing is performed, respectively.

Note that in the above descriptions, the LPF matrix L(k,η) such as shown in Expression 47 was employed, which, when applied upon f(k,l) represented as a matrix has a low-pass filter effect on the specific row or specific column of f(k,l). However, a matrix to be employed as LPF is not restricted to such a matrix, and an LPF matrix $L_T(\chi)$ such as shown in the following Expression 57 can be employed, for example.

$$L_T(\chi) = \begin{pmatrix} \xi & \chi & 0 & \cdots & & & & 0 \\ \chi & \xi & \chi & & & & & \\ 0 & \chi & \xi & \chi & \ddots & & & \vdots \\ & & \chi & \xi & \chi & & & \\ \vdots & & \ddots & \chi & \xi & \chi & & \\ & & & & \chi & \xi & \chi & 0 \\ & & & & & \chi & \xi & \chi \\ 0 & \cdots & & & & 0 & \chi & \xi \end{pmatrix} \quad \text{[Expression 57]}$$

Here, $\chi$ is a parameter indicating filter strength, and $\xi = 1 - 2\chi$. Further, a condition of $(1/3) > \chi \geq 0$ is imposed upon the parameter $\chi$.

This LPF matrix $L_T(\chi)$ has a low-pass filter effect on the entire 8×8 pixel block. It has an LPF effect between rows by performing matrix operation from the left on f(k,l), and has an LPF effect between columns by performing matrix operation from the right of f(k,l). Also, examples of the typical value for $\chi$ include (1/8), (1/6), (1/4), and the like. The $L_T(\chi)$ is invertible by restricting $\chi$ to be greater or equal to 0 and smaller than (1/3). Note that in the event of employing this $L_T(\chi)$, the DC coefficient is no more constant, but changes somewhat.

FIG. 63 is a chart illustrating an example of the header information when employing the above low-pass filter.

As for the header information Phm(n) when multiplying total LPF using the above LPF matrix $L_T(\chi)$, a field for a data Mode may be provided immediately after the indicator Ind (=1) and category Cat (=1), and "11" is recorded as a bit value thereof, for example.

Also, the parameter $\chi$ is recorded as the global parameter, so is not included in the header information Phm(n) for each block. Accordingly, this example is configured such that filter strength is constant over the entire image, and does not change from block to block.

According to the third embodiment described, the same advantages as those of the embodiments 1 and 2 can be provided. Additionally, since the more suitable process of the JEX permutation and JEX LPF can be selected for each block, a higher image quality and a higher compression ratio can be realized.

Also, by employing a matrix for low-pass filtering the entire image, fewer arithmetic operations need to be performed for the process. This enables faster processing and also reduces arithmetic operation load needed for processing.

Note that the present invention is not restricted to the above embodiments, and it is needless to say that various modifications and applications can be made without departing from the spirit and scope of the invention.

What is claimed is:

1. An image encoding method comprising:
applying a spatial frequency transformation to an image data to obtain transform coefficients having, in general, low-frequency transforms coefficients and high-frequency transform coefficients;
encoding the transform coefficients as coded data;
generating a header portion of the coded data comprising information related to the image data;
wherein, prior to applying the spatial frequency transformation, applying to the image data a reversible spatial transformation which is adapted to the image data and suppresses generally high-frequency transform coefficients; and
adding to the header portion header information for inverse transforming the reversible spatial transformation.

2. The image encoding method according to claim 1, wherein the encoding of the transform coefficients reduces, in general, a data amount of high-frequency transform coefficients greater than a data amount of low-frequency transform coefficients; and
wherein the reversible spatial transformation generally suppresses the high-frequency transform coefficients.

3. The image encoding method according to claim 2, wherein the encoding of the transform coefficients applies, in general, larger quantization steps for quantizing the high-frequency transform coefficients than for quantizing the low-frequency transform coefficients; and
the reversible spatial transformation is selected adaptively in response to the image data so as to suppress values of the high-frequency coefficients.

4. The image encoding method according to claim 1, wherein the image data is partitioned into or comprises a plurality of image blocks; and wherein
the reversible spatial transformation and the spatial frequency transformation are applied to at least one of the image blocks.

5. The image encoding method according to claim 4, wherein the reversible spatial transformation includes a plurality of block-wise reversible spatial transformations, each of which is applied to a respective one of the image blocks;
the spatial frequency transformation is applied to the image blocks;
the added header information includes information for inverse transforming the block-wise reversible spatial transformations; and wherein
the block-wise reversible spatial transformations are adapted to the respective image blocks.

6. The image encoding method according to claim 5, wherein, prior to applying a block-wise reversible spatial transformation to a respective image block, deciding whether the block-wise reversible spatial transformation is to be applied to the respective image block; and
applying, if the decision is affirmative, the block-wise reversible spatial transformation to the image block.

7. The image encoding method according to claim 4, wherein the at least one of the image blocks is expressible as a matrix M, and wherein
the reversible spatial transformation is expressible as an operation including at least one of row-wise and column-wise permutations of the matrix M.

8. The image encoding method according to claim 4, wherein the at least one of the image blocks is expressible as a matrix M, and wherein
the reversible spatial transformation is expressible as a linear matrix operation $$M \rightarrow AMB,$$

where A and B represent invertible matrices.

9. The image encoding method according to claim 8, wherein one of the matrix A and matrix B is a matrix for performing row-wise permutation of the matrix M by matrix operation, and the other is a matrix for performing column-wise permutation of the matrix M by matrix operation.

10. The image encoding method according to claim 7, wherein the row-wise permutation is characterized in that rows of the matrix M will be permuted such that sums of values of matrix elements in respective rows are arranged in descending or ascending order in a column direction; and
wherein the column-wise permutation is characterized in that columns of the matrix M will be permuted such that sums of values of matrix elements in respective columns are arranged in descending or ascending order in a row direction.

11. The image encoding method according to claim 4, wherein the transform coefficients include a DC coefficient in proportion to a mean value of the at least one of the image blocks, and
whereby the reversible spatial transformation keeps the DC coefficient unchanged.

12. An image encoding method according to claim 5, wherein the image blocks are expressible as matrices;
the block-wise reversible spatial transformation to be applied to the at least one of the image blocks is selected from a plurality of operations comprising a permutation operation and a reversible low-pass filtering operation; and wherein
the added header information includes information necessary for deciding which of the operations has been selected for the at least one of the image blocks.

13. An image encoding method applicable to a JPEG encoding process, which includes
  a) partitioning of an image into a plurality of 8×8 image blocks;
  b) applying a discrete cosine transform (DCT) to each of the 8×8 image blocks to thereby obtain DCT coefficients including: a DC coefficient indicative of a mean value of the 8×8 image block, low-frequency AC coefficients and high-frequency AC coefficients;
  c) quantizing the DCT coefficients using a quantization table;
  d) encoding the quantized DCT coefficients using run-length coding and a subsequent Huffman coding; and
  e) generating a header portion,
  the method further comprising:
  applying a reversible spatial transformation to at least one 8×8 image block prior to applying the discrete cosine transform (DCT), whereby the reversible spatial transformation is selected adaptively in response to the at least one 8×8 image block and suppresses generally high-frequency AC coefficients;
  extracting spatial transformation parameters necessary for inversely transforming the spatial transformation; and
  adding header information indicative of the spatial transformation parameters to the header portion.

14. The image encoding method according to claim 13,
  wherein the adaptively selected reversible spatial transformation is characterized in that
  the DC coefficient remains unchanged whether or not the reversible spatial transformation is applied; and
  amplitudes of at least some of the low-frequency AC coefficients are increased by applying the reversible spatial transformation.

15. An image decoding method for decoding encoded image data, which comprises a header portion and a coded data portion, comprising:
  reading the header portion of the encoded image data to extract information related to an image data;
  decoding the coded data to obtain transform coefficients in a spatial frequency domain having, in general, low-frequency transform coefficients and high-frequency coefficients; and
  applying an inverse spatial frequency transformation to the transform coefficients to thereby obtain a second image data;
  the decoding method further comprising:
  extracting information for inverse transforming a reversible spatial transformation; and
  applying the inverse transformation of the reversible spatial transformation to the second image data to obtain the first-mentioned image data,
  wherein the reversible spatial transformation is adapted to the image data and suppresses generally high-frequency transform coefficients.

16. The image decoding method according to claim 15, further comprising:
  identifying, prior to the extracting step, whether or not the information for inverse transforming is present in the header portion; and
  if the information is present, applying the inverse transformation to the second image data to obtain the first-mentioned image data; and
  if the information is not present, outputting the second image data without performing inverse transformation as the first-mentioned image data.

17. A moving-image compression method for encoding moving image data comprising image frames in a time-series-like relation using intra-frame compression based on image data within one image frame and inter-frame compression based on multiple image frames,
  wherein the intra-frame compression includes partitioning an image frame into image blocks; applying a spatial frequency transformation to the image blocks to obtain transform coefficients; and generating a header portion comprising information related to the image frame, the intra-frame compression further comprising:
  applying a reversible spatial transformation to at least one of the image blocks prior to applying the spatial frequency transformation; and
  adding into the header portion header information comprising spatial transformation parameters necessary for inverse transforming the reversible spatial transformation.

18. The moving-image compression method according to claim 17, further comprising:
  deciding, prior to applying the reversible spatial transformation, whether or not the reversible spatial transformation is performed.

19. A moving-image compression method for encoding moving image data comprising image frames in a time-series-like relation using intra-frame compression based on image data within one image frame and inter-frame compression based on multiple image frames,
  wherein the inter-frame compression includes partitioning an image frame into pixel blocks; generating an image block by obtaining difference between at least one of the pixel blocks and a corresponding pixel block related to an image frame to be compared with; applying a spatial frequency transformation to the image block to obtain transform coefficients; and generating a header portion comprising information related to the image frame, the inter-frame compression further comprising:
  applying a reversible spatial transformation to at least one of the image blocks prior to applying the spatial frequency transformation; and
  adding into the header portion header information comprising spatial transformation parameters necessary for inverse transforming the reversible spatial transformation.

20. The moving-image compression method according to claim 19, further comprising:
  deciding, prior to applying the reversible spatial transformation, whether or not the reversible spatial transformation is performed.

21. The moving-image compression method according to claim 19,
  wherein the header portion comprises information related to a group including multiple image frames;
  and wherein the header information comprises the spatial transformation parameters related to a plurality of image frames from the group.

22. A moving-image decoding method for decoding encoded moving-image data, which comprises a header portion and a coded data portion, to obtain a moving-image data comprising:
  reading out the header portion to extract information related to an image data related to an image frame;
  decoding the coded data portion to obtain transform coefficients related to the image frame;
  applying an inverse spatial frequency transformation to the transform coefficients to thereby obtain a second image data;

the decoding method further comprising:

extracting header information necessary for inverse transforming a reversible spatial transformation from the header portion;

applying the inverse transformation of the reversible spatial transformation to the second image data to obtain the image data related to the image frame.

23. A non-transitory computer-readable medium with an executable image encoding program stored therein, which instructs a computing device to perform the steps of:

applying a spatial frequency transformation to an image data to obtain transform coefficients having, in general, low-frequency transform coefficients and high-frequency transform coefficients;

encoding the transform coefficients as coded data;

generating a header portion of the coded data comprising information related to the image data;

wherein, prior to applying the spatial frequency transformation, applying to the image data a reversible spatial transformation which is adapted to the image and suppresses generally high-frequency transform coefficients; and adding into the header portion header information for inverse transforming the reversible spatial transformation.

24. A non-transitory computer-readable storage medium with an executable image decoding program for decoding encoded image data comprising a header portion and a coded data portion, wherein the program instructs a computing device to perform the steps of:

reading the header portion of the encoded image data to extract information related to image data;

decoding the coded data to obtain transform coefficients having, in general, low-frequency transform coefficients and high-frequency transform coefficients;

applying an inverse spatial frequency transformation to the transform coefficients to thereby obtain second image data;

the decoding program further comprising operation instructions for:

extracting information necessary for inverse transforming a reversible spatial transformation; and applying the inverse transformation of the reversible spatial transformation to the second image data to obtain the image data;

wherein the spatial transformation is adapted to the image data and suppresses generally high-frequency transform coefficients.

25. An image encoding device comprising:

a spatial transforming unit for applying to image data a reversible spatial transformation adapted to the image data;

a spatial frequency transformation unit for applying a spatial frequency transformation to the image data to thereby obtain transform coefficients having, in general, low-frequency transform coefficients and high-frequency transform coefficients;

a header portion generator for creating a header portion comprising information related to the image data; and a header information addition unit for adding to the header portion information comprising spatial transformation parameters necessary for inverse transforming the spatial transformation, wherein the spatial transformation suppresses generally high-frequency transform coefficients.

26. An image decoding device for decoding encoded image data comprising a header portion and a coded data portion comprising:

an inverse spatial frequency transformation unit for applying to transform coefficients having, in general, low-frequency transform coefficients and high-frequency transform coefficients resulting from the encoded image data an inverse spatial frequency transformation to thereby obtain second image data;

a header interpreter for reading out spatial transformation parameters from the header portion; and an inverse spatial transformation unit for applying to the second image data an inverse spatial transformation based on the spatial transformation parameters to thereby obtain an image data, wherein the inverse spatial transformation is adapted to the encoded image data and suppresses generally high-frequency transform coefficients.

27. An image encoding-decoding system comprising:

an image encoding device comprising a spatial transforming unit for applying to image data a reversible spatial transformation adapted to the image data, a spatial frequency transformation unit for applying a spatial frequency transformation to the image data to thereby obtain transform coefficients having, in general, low-frequency transform coefficients and high-frequency transform coefficients, a header portion generator for creating a header portion comprising information related to the image data, and a header information addition unit for adding to the header portion information comprising spatial transformation parameters for inverse transforming the spatial transformation; and an image decoding device for decoding encoded image data comprising a header portion and a coded data portion comprising an inverse spatial frequency transformation unit for applying to transform coefficients resulting from the encoded image data an inverse spatial frequency transformation to thereby obtain second image data, a header interpreter for reading out spatial transformation parameters from the header portion, and an inverse spatial transformation unit for applying to the second image data an inverse spatial transformation based on the spatial transformation parameters to thereby obtain image data;

wherein the image decoding device is configured to decode an encoded image data encoded via the image encoding device, and wherein the inverse spatial transformation unit suppresses generally high-frequency transform coefficients.

28. An image encoding-decoding system comprising:

a first image encoding device comprising:

1a) a dividing unit for partitioning original image data into image blocks;

1b) a spatial frequency transformation unit for acquiring transform coefficients by applying to the image blocks a spatial frequency transformation;

1c) a quantizer for quantizing the transform coefficients to generate integral values of transform coefficients;

1d) an encoder for encoding the integral values of transform coefficients; and 1e) an encoded image file generating unit for generating a first encoded image file by combining a header portion with data obtained based on results of the encoder;

a second image encoding device for generating a second encoded image file obtained by adding to the first image encoding device:

2a) a spatial transformation unit for applying a reversible spatial transformation identifiable with spatial transformation parameters to at least one of the image blocks prior to the spatial frequency transformation being performed; and 2b) a header information adding unit for adding the spatial transformation parameters to the header portion;

a first image decoding device comprising:

3a) a header reader for reading out the header portion from the first encoded image file;

3b) a decoder for acquiring integral values of transform coefficients by decoding codes obtained from the first encoded image file;

3c) an inverse quantizer for de-quantizing the integral values of transform coefficients generated by the decoder to thereby obtain transform coefficients;

3d) an inverse spatial frequency transformation unit for acquiring image data in units of image blocks by applying inverse spatial frequency transformation to the transform coefficients from the inverse quantizer; and 3e) a rendering unit for generating the original image data from the units of image blocks;

and a second image decoding device for acquiring the original image data from the second encoded image file obtained by adding to the first image decoding device:

4a) an additional header information reader for reading out the spatial transformation parameters from the header portion; and 4b) an inverse spatial transformation unit for inverse transforming the spatial transformation based on the spatial transformation parameters read out by said additional header information reader;

wherein, in a case that an encoded image file to be decoded is the second encoded image file, the first image decoding device is able, without error, to restore data different from the original image data by ignoring spatial transformation parameters described in the header portion of the second compressed image file; and wherein, in a case that spatial transformation parameters cannot be read out from the header portion by the additional header information reader, the second image decoding device restores original image data by processing decoding by a portion given by the first image decoding device alone without processing by the inverse spatial transformation unit.

29. The image encoding-decoding system according to claim 28, further comprising:

the second image encoding device being provided with an image capturing device.

30. The image encoding method according to claim 1, wherein the reversible spatial transformation is adjustable with at least one adjustment parameter; and wherein the header information comprises the adjustment parameter.

31. The image encoding method according to claim 30, wherein the image data is partitioned into or comprises a plurality of image blocks; and wherein the reversible spatial transformation and the spatial frequency transformation are applied to at least one of the image blocks.

32. The image encoding method according to claim 31, wherein the at least one of the image blocks is expressible as a matrix M, and wherein the reversible spatial transformation is expressible as one of linear matrix operations $M \rightarrow AM,$ $M \rightarrow MB,$ and $M \rightarrow AMB,$ where A and B represent invertible matrices.

33. The image encoding method according to claim 32, wherein the matrix A and matrix B are matrices for effecting spatial low-pass filtering to the image block represented by the matrix M.

34. The image encoding method according to claim 30, wherein the reversible spatial transformation effects spatial low-pass filtering to the image data; and wherein the adjustment parameter includes a filter adjustment parameter for adjusting a filter strength of the spatial low-pass filtering.

35. The image encoding method according to claim 34, further comprising:

quantizing the transform coefficients using a quantization parameter, which is included into the header portion, wherein:

the quantization parameter is adjusted in response to the filter adjustment parameter.

36. The image encoding method according to claim 30, wherein the transform coefficients include a DC coefficient in proportion to a mean value of the image data, and whereby the reversible spatial transformation keeps the DC coefficient unchanged.

37. An image encoding method according to claim 30, further comprising:

selecting, prior to encoding, encoding modes; and selecting the adjustment parameter based on criteria corresponding to a selected one of the encoding modes.

38. An image encoding method according to claim 35, further comprising:

selecting, prior to encoding, encoding modes; and selecting both the adjustment parameter and the quantization parameter based on criteria corresponding to a selected one of the encoding modes.

39. An image encoding method according to claim 38, wherein the encoding modes include a high compression mode and a high quality mode.

40. An image encoding method according to claim 34, wherein the reversible spatial transformation effects spatial low-pass filtering having a selectable directional feature; and the header information further comprises information related to the directional feature, which has been actually selected.

41. The image encoding-decoding system according to claim 28, further comprising:

a computer configured to perform the functions of the first image decoding device.

* * * * *